United States Patent
Okamoto et al.

(10) Patent No.: US 7,161,285 B2
(45) Date of Patent: Jan. 9, 2007

(54) CNT FILM AND FIELD-EMISSION COLD CATHODE COMPRISING THE SAME

(75) Inventors: Akihiko Okamoto, Tokyo (JP); Kazuo Konuma, Tokyo (JP); Yoshinori Tomihari, Tokyo (JP); Fuminori Ito, Tokyo (JP); Yuko Okada, Tokyo (JP)

(73) Assignee: NEC Corporation, Tokyo (JP)

( * ) Notice: Subject to any disclaimer, the term of this patent is extended or adjusted under 35 U.S.C. 154(b) by 253 days.

(21) Appl. No.: 10/432,126

(22) PCT Filed: Nov. 19, 2001

(86) PCT No.: PCT/JP01/10094

§ 371 (c)(1),
(2), (4) Date: Dec. 22, 2003

(87) PCT Pub. No.: WO02/41348

PCT Pub. Date: May 23, 2002

(65) Prior Publication Data

US 2004/0104660 A1    Jun. 3, 2004

(30) Foreign Application Priority Data

Nov. 20, 2000  (JP)  ............... 2000-352983
Nov. 29, 2000  (JP)  ............... 2000-362396
Dec. 20, 2000  (JP)  ............... 2000-386669

(51) Int. Cl.
H01J 1/14   (2006.01)
H01J 1/146  (2006.01)
D01F 9/12   (2006.01)
H01J 9/04   (2006.01)

(52) U.S. Cl. ............ 313/311; 313/309; 313/310; 313/351; 445/50; 445/51; 423/447.1; 423/447.2; 977/742; 977/753; 977/842; 977/844; 977/939

(58) Field of Classification Search ........ 313/309–311; 445/49–51
See application file for complete search history.

(56) References Cited

U.S. PATENT DOCUMENTS

| | | | | |
|---|---|---|---|---|
| 6,057,637 A | * | 5/2000 | Zettl et al. | 313/310 |
| 6,149,775 A | * | 11/2000 | Tsuboi et al. | 423/445 B |
| 6,250,984 B1 | * | 6/2001 | Jin et al. | 445/51 |
| 6,616,495 B1 | * | 9/2003 | Tsuboi | 445/24 |

FOREIGN PATENT DOCUMENTS

| | | |
|---|---|---|
| EP | 1020888 A1 | 7/2000 |
| JP | 6-162919 | 6/1994 |
| JP | 8-264109 | 10/1996 |
| JP | 2000-86216 | 3/2000 |
| JP | 2000-90809 | 3/2000 |
| JP | 2000-311578 | 11/2000 |
| JP | 2001-35362 | 2/2001 |
| JP | 2001-319560 | 11/2001 |

* cited by examiner

*Primary Examiner*—Mariceli Santiago
(74) *Attorney, Agent, or Firm*—Muirhead and Saturnelli, LLC

(57) ABSTRACT

A fabrication method for an emitter includes the steps of forming on a glass substrate a CNT film which contains a plurality of carbon nanotubes (CNTs) and constitutes an emitter electrode, forming a gate electrode via an insulating film on the CNT film, forming a plurality of gate openings in the gate electrode and the insulating film, and aligning upright the CNTs in the gate opening. The upright alignment generates a stable uniform emission current and provides excellent emission characteristics.

30 Claims, 29 Drawing Sheets

CNT FILM AND FIELD-EMISSION COLD CATHODE COMPRISING THE SAME

TECHNICAL FIELD

The present invention relates to a method for fabricating an field emission cold cathode used in a flat display device (flat image display device) such as a field emission display (hereinafter also referred to as a "FED"), and more particularly to a fabrication method for easily fabricating an emitter, that can make use of excellent emission characteristics, upon using carbon nanotubes (hereinafter also referred to as "CNTs") as film-shaped emitters. The present invention also relates to a CNT film for use with such a field emission cold cathode and a method for fabricating the same.

BACKGROUND ART

In recent years, a carbon nanotube or a new carbon material is prospective particularly in the application as an emitter material such as for a field emission cold cathode. A CNT has the shape of a hollow cylinder of a graphene sheet which has regularly arranged carbon atoms and which is formed in a tubular shape, and is a very high aspect ratio microscopic material which has an outer diameter of the order of nanometers (nm) and a length of 0.5 to tens of micrometers. The CNT having such a shape readily provides an electric field concentration at its tip portion, and can be expected to provide a high emission current density. Furthermore, the CNT has highly stable chemical and physical characteristics, and is therefore expected to be stable against such as adsorption of residual gases in a working vacuum or ion bombardments.

There exist two types of CNTs: a single-layer nanotube and a multi-layer nanotube. The single-layer nanotube is a tube having the thickness of a monoatomic layer and one sheet of graphene (hexagonal carbon mesh plane of a monoatomic layer) closed in a cylindrical shape, being about 2 nm in diameter. The multi-layer nanotube has a stack of multiple layers of cylindrical graphenes, being 5 to 50 nm in its outer diameter and 3 to 10 nm in diameter of the central cavity. The single-layer nanotube, which is frequently used as an emitter, can be produced by arch discharge with carbon bars employed as the electrodes. This production method is described in a literature such as Nature, Vol. 354 (1991), pp56–58, in which a description can be found which recites that arch discharge is performed in a helium or argon gas environment at 66,500 Pa (500 Torr) using carbon bar electrodes doped with iron, cobalt, or nickel as a catalytic metal.

On the other hand, a transfer method for depositing CNTs in the shape of film is described, for example, in Science, Vol. 268 (1995), P. 845, and in Science, Vol. 270 (1995), P. 1179. In this transfer method, a CNT slurry having CNTs scattered in the solution is filtered with a ceramic filter having a pore size of 0.2 μm, and then the reverse side of a film of CNTs remaining on the filter is pressed onto a substrate, only the filter being stripped away thereafter. This allows a thin film containing CNTs to be formed on the substrate.

To apply the CNT film formed as described above to a display, the CNT film is used for the cathode (emitter) serving as an electron source. In a diode structure with an anode electrode and a phosphor disposed in close proximity thereto, as described in Appl. Phys. Letters, Volume 72, p. 2912, 1998, for example, a voltage of 300V is applied between the anode electrode and the emitter which oppose each other, and the electrons emitted from the emitter hit and excite the phosphor on the anode electrode side to emit light, thereby allowing characters or the like to appear on the display.

By way of example, a FED of a triode structure is shown in FIG. 28A. In the triode structure, an emitter 112b using CNTs is employed as a field emission cold cathode, with a gate electrode 125 disposed between the emitter 112b and an anode electrode 124. A conductive substrate or a conductive layer 111 is formed on a glass substrate 110, a CNT film 112 is deposited on the conductive layer 111, and the gate electrode 125 is formed on the CNT film 112 via an insulating film 23.

Furthermore, a gate opening 117 penetrating the gate electrode 125 and the insulating film 123 allows a portion of the CNT film 112 to be exposed, thereby forming the emitter 112b. The anode electrode 124 is disposed above and spaced a predetermined distance from the glass substrate 110 containing such as the CNT film 112 and the gate electrode 125, with the space therebetween being maintained under vacuum. In such a triode structure, a negative potential is applied to the CNT film 112 while positive potentials are applied to the anode electrode 124 and the gate electrode 125, respectively, thereby making it possible to emit electrons from the emitter 112b exposed within the gate opening 117 toward the anode electrode 124.

To fabricate a flat image display device such as FEDs using the aforementioned triode structure, an insulating film is formed on a CNT film and an opening is then formed in the insulating film using an etching solution or an etching gas or the like, wherein those CNTs that stand upright near the surface of the CNT film may disappear due to the influence of the etching solution or the etching gas, thereby impairing excellent characteristics of electric field concentration.

A CNT film fabricated according to a prior art fabrication method is shown in FIG. 28B. In this fabrication method, a liquid mixture having CNTs 112a scattered in a binder solution is coated onto the conductive layer 111 on the surface of the substrate 110, and the CNT film 112 is formed while the adhesion between the substrate 110 side and the CNTs 112a is being enhanced. With this method, for example, most CNTs 112a on the CNT film surface lie down toward the substrate surface due to the viscosity and the surface tension of the binder solution or are buried in the binder, thereby impairing their upright states and making it extremely difficult to implement uniform emission characteristics at low voltages.

The binder is often composed mainly of an insulating material such as resist, water glass, and acrylic resin. When the surface of the CNT film 112 is coated with this insulating material, the surface barrier of electrons is substantially increased upon emission of the electrons, thereby significantly reducing the emission efficiency. This may enhance the adhesive strength between the substrate 110 and the CNT film 112; however, an emitter having CNTs 112a not aligned upright cannot make full use of the advantage of being provided with the CNT film.

DISCLOSURE OF THE INVENTION

In view of the foregoing, it is the object of the present invention to provide a method for fabricating an emitter which can generate uniform and stable emission current using a CNT film to obtain excellent emission characteristics as well as to provide a field emission cold cathode and an image display device, which have such an emitter.

It is another object of the present invention to provide a CNT film which can eliminate a complicated CNT refining process that may cause impurities other than nanotubes to be removed more than necessary and which can mitigate deterioration in electron emission characteristics caused by an increase in diameter of bundles as well as to provide a method for fabricating a CNT film having excellent electron emission characteristics.

It is still another object of the present invention to provide a field emission cold cathode which has a sufficiently flattened gate insulating layer and gate electrode layer, and stable electron emission characteristics that never cause damage to the device for a long period of time, as well as to provide an image display device including such a field emission cold cathode.

In a first aspect, the present invention provides a CNT film containing carbon nanotubes (CNTs) and particulate impurities, the CNT film being characterized in that the area ratio between the CNTs and the particulate impurities in cross section and surface structure is set within the range of 0.5:99.5 to 40:60.

For example, when CNTs are produced by the arc discharge method or the like, particulate impurities are present in the soot adhered to the inner walls of the chamber in conjunction with the CNTs. The particulate impurities exhibit the range of 500 nanometers or less and sub-nanometers or more. The inventor et al made intensive studies to develop the present invention while paying attention to the point that the operational effects were to be obtained which the particulate impurities that were discarded as unnecessary upon the formation of a CNT film could be used as a filling material and thereby provide a dense filling state with gaps between CNTs being filled therewith to ensure the strength of the film without depending only on the conventional organic binder material, while even when the organic binder material having another binder material added thereto was used, a small amount of organic binder components would result in an extremely low possibility of impairing the degree of vacuum due to their emission gases. Since the aforementioned soot is formed in the vacuum apparatus through the high energy process in which a carbon raw material recombines its atomic arrangement into a CNT structure, the particulate impurities contained in the soot already emit gases in the formation process and are thus in a state of hardly emitting gasses thereafter. Not discarding but using the particulate impurities that are already in a state of hardly emitting gases would present an effect of providing a filling material, which emits only a trace amount of gases, without an additional process.

In the CNT film according to the first aspect of the present invention, since the particulate impurities were allowed to fill mutual gaps between the CNTs at the aforementioned area ratio, it is possible to ensure a mechanical film strength without depending only on the organic binder while readily providing a flat shape which traps no air bubbles in the film. It is also made possible to eliminate a complicated CNT refining process that may cause impurities other than nanotubes to be removed more than necessary and to mitigate deterioration in electron emission characteristics caused by an increase in diameter of bundles.

Here, it is preferable that the particulate impurities include impurities obtained in conjunction with the CNTs upon fabricating the CNTs. In this case, produced are the effects of simplifying the processes and being able to form a CNT film having a high adhesion to the substrate and excellent emission characteristics.

Furthermore, it is also a preferable form that the particulate impurities serve as a binder material for filling mutual gaps between CNTs, and another binder material other than the aforementioned binder material is further added. In this case, it is possible to form a CNT film which has a further enhanced adhesion to the substrate and excellent emission characteristics.

The binder material is preferably made of an organic substance. This allows for baking at low temperatures and further produces an effect of facilitating the patterning of CNTs.

More specifically, the organic substance can be made of a material containing at least one of acrylic, nitrocellulose, and polyimide resin. In this case, it is possible to further ensure the adhesion state of CNTs to the substrate.

Furthermore, it is desirable that the particulate impurities filling the mutual gaps between the CNTs have a filling rate of 70% or more. In this case, produced are the effects that gases will not remain inside due to the dense CNT film and an excellent insulating layer can be formed on the CNT film.

It is preferable that the CNT film is formed of a stacked film of two layers or more stacked in sequence, and the CNTs, particulate impurities, and binder material are set at a separate content ratio in each layer of the stacked film, respectively. For example, in a case of a stacked film of three layers, optimum states can be formed in the lowermost layer requiring mainly a function of adhering to the substrate, the intermediate layer requiring a function of filling mutual gaps between the CNTs, and the uppermost layer requiring CNTs as standing upright from the CNT film, respectively.

In particular, it is desirable that, of the CNTs, particulate impurities, and another binder material, the percentage of CNT content is higher in upper layers while content percentages of the particulate impurities and another binder material are higher in lower layers. More particularly, the percentage of CNT content in the uppermost layer can be set at 80 to 90% and the content percentage of other than the CNTs in layers below the uppermost layer can be set at 70 to 80%, while the content percentage of the another binder material can be set at 60 to 70% in the lowermost layer, respectively.

Here, a field emission cold cathode is preferably formed using the CNT film. In this case, since a uniform insulating layer having a high adhesive strength between the CNT film and the substrate can be formed, it is possible to obtain a field emission cold cathode having stable and long-life emission characteristics.

In a second aspect, the present invention provides a fabrication method for fabricating the CNT film according to the first aspect of the present invention, the CNT film fabrication method being characterized by making a binder material of the particulate impurities and/or the another binder material from a material having an etching rate higher than that of CNTs to pattern the CNT film.

In the CNT film fabrication method according to the second aspect of the present invention, upon patterning the CNT film, the step of removing the CNT film is significantly facilitated because the binder material and/or another binder material have a higher etching rate than that of the CNTs. Furthermore, upon allowing the CNTs in a desired region to remain and removing the CNT film outside the region, when the binder material in the remaining region and/or another binder material are also allowed to remain, it is possible to keep the CNT film securely adhered to the substrate even after the process.

Here, it is preferable to use the CNTs and particulate impurities which are obtained mutually in the same step at the same time. This provides an effect of being able to form secure CNTs with a simplified process. Alternatively, in place thereof, it is also a preferable form to use the CNTs and particulate impurities, which have are in mutually different steps. In this case, it is possible to control more precisely the mixture ratio of the CNTs and particulate impurities.

Furthermore; in a third aspect, the present invention provides a fabrication method for performing arc discharge using a pair of carbon bars opposed to each other in a chamber, depositing CNTs and particulate impurities on each of a top plate, side plates, and a bottom plate within the chamber, and using the deposits to fabricate a CNT film, the CNT film fabrication method being characterized by collecting a top plate deposit and a side plate deposit which are deposited on the top plate and side plates within the chamber, producing a mixed material by mixing both the collected top plate deposit and side plate deposit at a predetermined weight ratio, and using the particulate impurities in the mixed material as a material for filling mutual gaps between CNTs in the mixed material.

In the method for fabricating the CNT film according to the third aspect of the present invention, since the top plate deposit and side plate deposit which are collected from the top plate and side plates are mixed at a predetermined weight ratio and the particulate impurities in the mixed material are further used as a material for filling mutual gaps between CNTs in the mixed material, it is possible to ensure a mechanical film strength without depending only on the organic binder while readily providing a flat CNT film which traps no air bubbles in the film. Furthermore, since a complicated CNT refining process that may cause impurities other than nanotubes to be removed more than necessary can be eliminated, it is possible to mitigate deterioration in electron emission characteristics caused by an increase in diameter of bundles.

More particularly, using the side plate deposit and the top plate deposit, it is possible to adjust CNT and particulate impurity contents such that the area ratio between CNTs and particulate impurities in cross section and surface structure is satisfied within the range of 0.5:99.5 to 40:60. In this case, the area ratio between CNTs and particulate impurities is set within the range of 0.5:99.5 to 40:60 to fill the mutual gaps between the CNTs, thereby making it possible to ensure a mechanical film strength without depending only on the organic binder while readily providing a flat shape which traps no air bubbles in the film.

Here, since using the CNT film fabricated by the method for fabricating the CNT film makes it possible to form a uniform insulating layer having a high adhesive strength between the CNT film and the substrate, a field emission cold cathode having stable and long-life emission characteristics can be obtained. In this case, the CNT film can constitute an electron emitting surface containing the CNTs and particulate impurities, and the electron emitting surface can be constructed so as not to contain particulate impurities having a particle diameter of more than 500 nm. On the other hand, particulate impurities having a particle diameter of 500 nm or less used for the electron emitting surface provides a flat surface, thereby making it possible to obtain a field emission cold cathode that produces an excellent emission effect.

Furthermore, forming a CNT film having a mixture ratio of 50% or less of the top plate deposit to the side plate deposit makes it possible to provide a field emission cold cathode that can be preferably used in a field emission image display device (flat image display device). A field emission image display device incorporating such an electron emitting cold cathode can display high-quality uniform images and provide improved yields as well.

In a fourth aspect, the present invention provides a fabrication method for an emitter, the method being characterized by forming on a substrate a CNT film constituting the emitter containing a plurality of carbon nanotubes (CNTs) to align upright the CNTs on a surface of the CNT film.

The term "upright" as used herein means that the tip portion of the CNTs in the CNT film is at an angle of 50 degrees or less to a normal to the substrate. Incidentally, although the upright alignment is enhanced due to an electrostatic force resulting from the application of electric field, the "upright alignment" as referred to herein is a "state after the enhancement." On the other hand, the term "horizontal alignment" as used herein means a state of arrangement of CNTs lying down along the substrate due to the surface tension of a liquid or the like.

In the method for fabricating the emitter according to the fourth aspect of the present invention, since CNTs are aligned upright, full use is made of the advantages of the CNT film provided, and thus stable uniform emission current can be produced to provide excellent emission characteristics. On the other hand, in the step of aligning the CNTs upright, it is preferable to adhere an adhesive sheet onto the CNT film and then peel off the adhesive sheet to thereby align CNTs upright. This makes it possible to obtain the upright alignment of CNTs in an extremely simple step using an adhesive sheet.

A preferred fabrication method for the emitter according to the fourth aspect of the present invention is characterized by including the steps, prior to the step of aligning the CNTs upright, of forming an electrode on the CNT film via an insulating film and forming a plurality of openings in the electrode and insulating film, wherein CNTs in the opening are aligned upright in the step of aligning the CNTs upright.

In this case, since CNTs are aligned upright in the opening, full use is made of the advantages of the CNT film provided, and thus stable uniform emission current can be produced to provide excellent emission characteristics.

It is also preferable that the upright alignment step includes the steps of allowing an adhesive sheet to go into the opening and then peeling off the adhesive sheet. In particular, even with a small hole diameter of the electrode opening, this allows CNTs to be easily aligned upright simply by pressing an adhesive sheet placed on the electrode so that its adhering portion goes into the opening, and then peeling off the adhesive sheet with the adhering portion in contact with the CNT film surface.

It is also a preferable form to have the steps, prior to the step of forming the insulating film and electrode, of aligning upright CNTs on the CNT film surface, and forming a cover film containing fine particles on the CNT film, wherein the upright alignment step includes the step of allowing an adhesive sheet to go into the opening and then peeling off the adhesive sheet to remove at least part of the cover film. Even with a small hole diameter of the electrode opening, this allows for removing part of the exposed portion of the cover film to obtain upright aligned CNTs simply by pressing the adhesive sheet placed on the electrode so that its adhering portion goes into the opening, and then peeling it off after the adhering portion is brought into contact with the surface of the cover film.

It is also preferable that the step of upright alignment using the adhesive sheet is performed under a reduced pressure. In this case, the adhesive sheet can be penetrated easily without difficulty into the opening, thereby further facilitating the upright alignment processing on the CNTs on the CNT film surface in the opening.

Furthermore, even with the adhesive sheet having a breathable property, it is possible to easily penetrate the adhesive sheet into the opening.

It is preferable that adhesive projected portions to be allowed into the plurality of openings are formed on a surface of the adhesive sheet. In this case, the adhesive sheet can be pressed against the electrode with a roller or the like, thereby allowing the adhesive projected portion to be easily penetrated into the corresponding opening and the upright alignment processing to be performed on the CNT film surface in the opening particularly toward its circumferential surface. Furthermore, the adhesive projected portion so arranged as to be smaller than the plurality of openings would further ensure the penetration of the adhesive projected portion into the opening.

The adhesive strength of the adhesive sheet is preferably lower than the adhesive strength of the emitter to the substrate, in the case of which no damage will be given to the emitter when the pressed adhesive projected portion is peeled off. More particularly, the adhesive sheet can be set at an adhesive strength of more than 0.002 N/mm and below 0.2 N/mm.

In a fifth aspect, the present invention provides a method for fabricating an emitter, the method being characterized by forming on a substrate a CNT film constituting the emitter containing a plurality of carbon nanotubes (CNTs), aligning CNTs of the CNT film upright to form a protective metal film on the upright aligned CNT film, and removing the protective metal film by soaking the entire substrate containing the protective metal film in an etching solution.

In the method for fabricating the emitter according to the fifth aspect of the present invention, since the protective metal film holds CNTs as in the upright alignment state, the subsequent deposition processing of an insulating film and electrode is facilitated, and the CNTs in the upright alignment state are allowed to appear simply by removing the protective metal film in the etching solution and thereby can be formed into the emitter.

A preferred method for fabricating the emitter according to the fifth aspect of the present invention is characterized by including the steps, prior to the step of removing the protective metal film, of forming an electrode on the protective metal film via an insulating film and forming a plurality of openings on the electrode and insulating film, wherein the protective metal film in the opening is removed by etching in the step of removing the protective metal film. In this case, even in the structure with emitters formed in a plurality of openings, the protective metal film holds CNTs as in the upright alignment state, thereby making it possible to obtain the CNTs in the upright alignment state simply through the step of removing the protective metal film by etching while facilitating the subsequent deposition processing of the insulating film and electrode.

Alternatively, in place of the foregoing, it is also a preferred form to have the steps, subsequent to the step of removing the protective metal film, of replacing the etching solution with water while the CNT film exposed in the opening is maintained under a liquid level and drying upright aligned CNTs in the CNT film after the water is frozen and then allowed to sublime. In this case, even when the hole diameter of the electrode opening is too small to use an adhesive sheet, the protective metal film is removed by etching after the formation of the opening and then the water is allowed to sublime without passing through the liquid phase to dry the CNT film, thereby making it possible for the standing CNTs not to be horizontally aligned due to the surface tension of water but to be exposed in the opening as in the upright state. Additionally, since the etching solution is replaced with water while the CNT film exposed from the opening is maintained under a liquid level, it is possible to move on to the subsequent process without causing the exposed CNTs to contact with air.

Alternatively, in place of the foregoing, it is also a preferred form to have the steps, subsequent to the step of removing the protective metal film, of replacing the etching solution with a super critical fluid while the CNT film exposed in the opening is maintained under a liquid level and drying the CNT film after the super critical fluid is transferred to a super critical state and then removed.

In this case, even when the hole diameter of the electrode opening is extremely small, since the protective metal film is removed by etching after the formation of the opening and then the super critical fluid is transferred to a super critical state and then removed to dry the CNT film, it is possible for the exposed CNTs in a standing state not to be horizontally aligned due to surface tension but to be exposed in the opening as in the upright state. Incidentally, as the super critical fluid, it is possible to employ at least one of liquid state $CO_2$, $N_2$, $N_2O$, xenon, and $SF_6$.

Alternatively, it is also a preferred form, subsequent to the step of removing the protective metal film, to replace the etching solution with a solution having less surface tension than that of the etching solution while the CNT film exposed in the opening is maintained under a liquid level, and then dry the CNT film.

Thus, even when the hole diameter of the electrode opening is extremely small, since the protective metal film is removed by etching after the formation of the opening and then the solution having less surface tension than that of the etching solution is removed to dry the CNT film, it is possible for the standing CNTs not to be horizontally aligned due to surface tension but to be exposed in the opening.

The drying step is preferably performed under a constant pressure and/or at a constant temperature. In this case, the CNT film can be dried without varying the excellent upright alignment state of the CNTs.

In a sixth aspect, the present invention provides a fabrication method for fabricating an electrode using a CNT film containing a plurality of carbon nanotubes (CNTs), the fabrication method for fabricating an emitter being characterized by wetting the CNT film with a predetermined solution to horizontally align CNTs and then forming a predetermined film on the CNT film.

Suppose that CNTs of a few micrometers or less are aligned upright on the CNT film surface and deposited on the CNT film in the subsequent step. In this case, for example, even when coated with a solvent containing a binder, the CNT film may not accept the solvent and cannot be well coated across the entire surface. On the other hand, even when the entire surface can be successfully coated, fine air bubbles may be dissolved therein, thereby causing air bubbles in a binder layer baked after the binder solvent is removed or irregularities on the surface thereof. However, by the method for fabricating the emitter according to the sixth aspect of the present invention, since the CNTs in the CNT film are horizontally aligned at least while the predetermined subsequent film formation process is performed, excellent deposition processing on the CNT film is realized.

Furthermore, a structure having excellent emission characteristics is obtained by applying an emitter fabricated by the fabrication method for the emitter to a field emission cold cathode. Still furthermore, it is possible to obtain a flat image display device having excellent emission characteristics by applying such a field emission cold cathode to a flat image display device.

In a seventh aspect, the present invention provides a flat image display device having an area S ($cm^2$) of one pixel, the flat image display device being characterized in that a count density of upright aligned CNTs is 1/S (pieces/$cm^2$) or more.

The flat image display device according to the seventh aspect of the present invention makes it possible to provide a uniform high-resolution display device structure using upright aligned CNTs.

In an eighth aspect, the present invention provides a field emission cold cathode including a CNT layer which is formed on a substrate and contains a plurality of carbon nanotubes (CNTs) to constitute an emitter, and a gate insulating layer and a gate electrode layer each of which is formed sequentially on the CNT layer and exposes a surface of the CNT layer from an opening penetrating both the layers, wherein a voltage is applied to each of the emitter and the gate electrode layer to allow electrons to be emitted from a surface of the emitter, the field emission cold cathode characterized in that the gate insulating layer is made up of a multi-layered insulating layer having two layers or more stacked in sequence.

In the field emission cold cathode according to the eighth aspect of the present invention, since the gate insulating layer is made up of a multi-layered insulating layer of two or more layers having different compositions, the gate insulating layer and the gate electrode layer are sufficiently flattened and an excellent insulation can be ensured between the gate electrode layer and the CNT layer, thereby making it possible to provide stable electron emission characteristics that never cause damage to the device for a long period of time.

Here, an intermediate layer is preferably further formed between the CNT layer and the gate insulating layer. In this case, the intermediate layer can enhance the wettability with and the adhesive strength to the insulating layer.

Furthermore, it is also a preferred form that an insulating layer immediately above the CNT layer has a thickness of 0.2 μm or more and 2 μm or less. In this case, it is possible to realize flatness without introducing deficiencies into the insulating layer.

Preferably, the opening of at least one layer in the multi-layered insulating layer has a diameter greater than a diameter of the opening in the gate electrode layer. In this case, it is possible to provide an improved insulation property between the CNT layer and the gate electrode, thereby suppressing an electrical breakdown.

In a ninth aspect, the present invention provides a flat image display device characterized by using the field emission cold cathode. In this case, it is possible to obtain a flat image display device having excellent emission characteristics.

In a tenth aspect, the present invention provides a fabrication method for a field emission cold cathode, characterized by forming a conductive layer, a CNT layer containing a plurality of carbon nanotubes (CNTs), a gate insulating layer made up of at least two or more insulating layers stacked sequentially, and a gate electrode layer, on a substrate in that order, and removing by etching the gate electrode layer and the gate insulating layer to form an opening and exposing a surface of the CNT layer from the opening to form an emitter.

By the fabrication method for the field emission cold cathode according to the tenth aspect of the present invention, since the gate insulating layer is made up of a stacked insulating layer of two or more layers, the insulating layer and the gate electrode layer are sufficiently flattened, thereby making it possible to provide a field emission cold cathode having stable electron emission characteristics that never cause damage to the device for a long period of time.

Furthermore, it is preferable to further include the step of forming an intermediate layer between the CNT layer and gate insulating layer. In this case, the intermediate layer can enhance the wettability with and the adhesive strength to the insulating layer.

More specifically, an insulating layer immediately above the CNT layer can be made up of a coated film having a thickness of 0.2 μm or more and 2 μm or less. In this case, it is possible to realize flatness without introducing deficiencies into the insulating layer.

Furthermore, the coated film is preferably formed of SOG (Spin on Glass). In this case, it is possible to form an insulating layer, having a low viscosity and an excellent wettability to the CNTs, immediately above the CNT layer.

Furthermore, an opening diameter of at least one insulating layer in the gate insulating layer is preferably formed to be larger than an opening diameter of the gate electrode layer. In this case, it is possible to provide an improved insulation property between the CNT layer and the gate electrode, thereby suppressing an electrical breakdown.

In an eleventh aspect, the present invention provides a flat image display device characterized by including a field emission cold cathode formed by the fabrication method for the field emission cold cathode.

Since the field emission cold cathode formed as described above is applied to the flat image display device according to the eleventh aspect, the present invention can provide excellent emission characteristics.

BEST MODE FOR CARRYING OUT THE INVENTION

The present invention will be explained below in more detail with reference to the drawings in accordance with the embodiments of the present invention.

Figure 1:
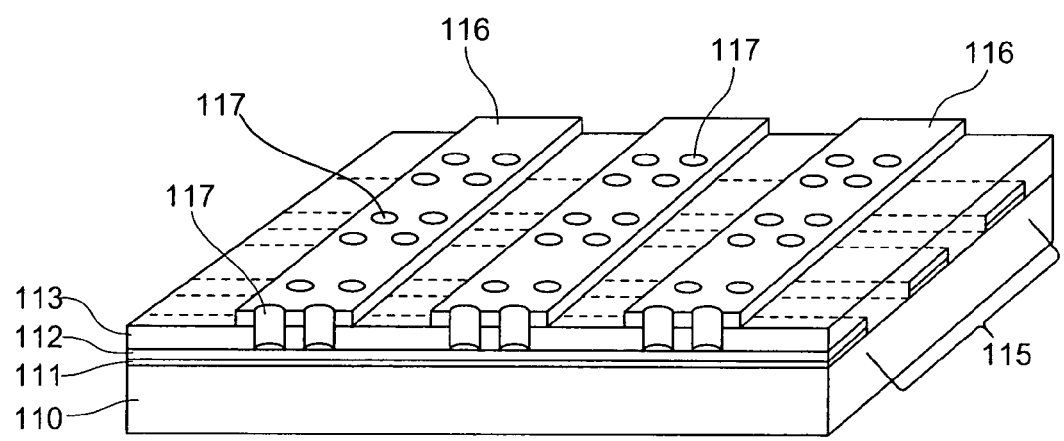
FIG. 1 is a perspective view illustrating a flat image display device having a FED with an emitter to which applied is a CNT film fabricated by a fabrication method according to a first embodiment of the present invention.

FIG. 1 is a perspective view illustrating a flat image display device such as a FED with an emitter to which applied is a CNT film fabricated by a fabrication method according to a first embodiment of the present invention.

The flat image display device has on a glass substrate 110 a plurality of stripe-shaped conductive layers 111 which extend in the right to left direction of FIG. 1 in parallel to each other. Each of the conductive layers 111 has a CNT film 112 of the same width deposited thereon, respectively, to form cathode (emitter) lines 115. Additionally, SOG (Spin On Glass), polyimide, acrylic resin or the like is dispensed and coated (spin coated) so as to cover the entire surface of the glass substrate 110 containing the CNT film 112, thereby forming a gate insulating film 113.

On the gate insulating film 113, stripe-shaped gate electrodes 116 extend in parallel to each other and perpendicular to the cathode lines 115 to form gate lines. At the intersections of the cathode lines 115 and the gate lines, formed are gate openings 117 which have a predetermined diameter and constitute electron emitting portions, allowing the CNT film 112 exposed to the gate openings 117 to constitute emitters.

Above the aforementioned glass substrate 110 on which the electron emitting portions are formed, an anode panel (124 shown in FIG. 28) onto which RGB (red, green, and blue) phosphors are coated is disposed opposite to the glass substrate 110 separated therefrom by a predetermined distance. This allows a flat image display device to be constituted which provides display operations by selectively applying voltages to the cathode lines 115 and the gate lines. On the other hand, the space between the glass substrate 110 and the anode panel is maintained under vacuum.

Figure 2A:
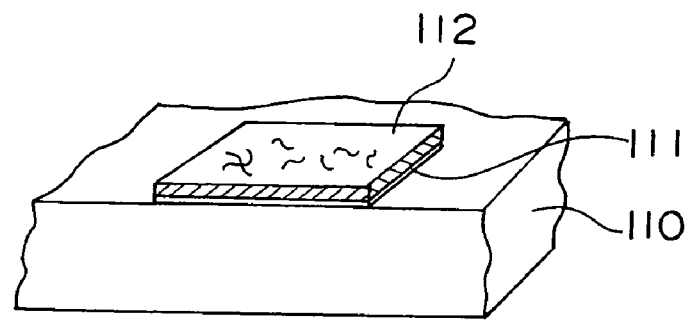
FIGS. 2A to 2D are partially sectional perspective views each sequentially illustrating a process procedure of the FED fabrication process of the first embodiment.
Figure 2B:
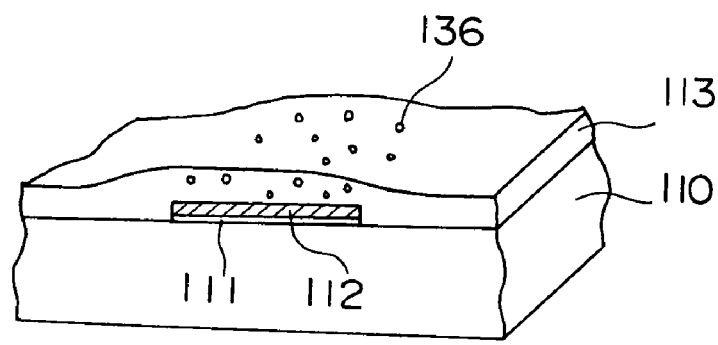
Figure 2C:
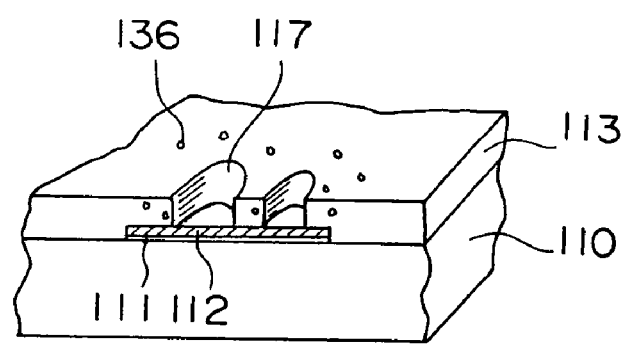
Figure 2D:
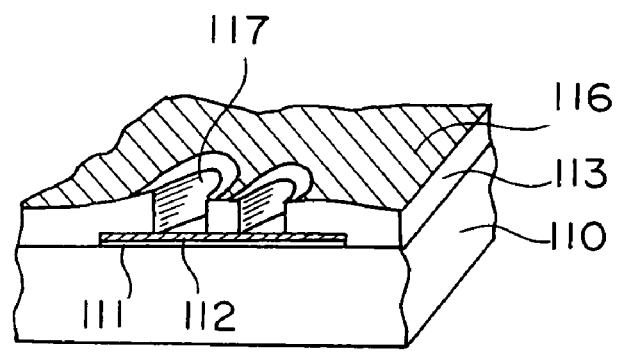
Figure 3:
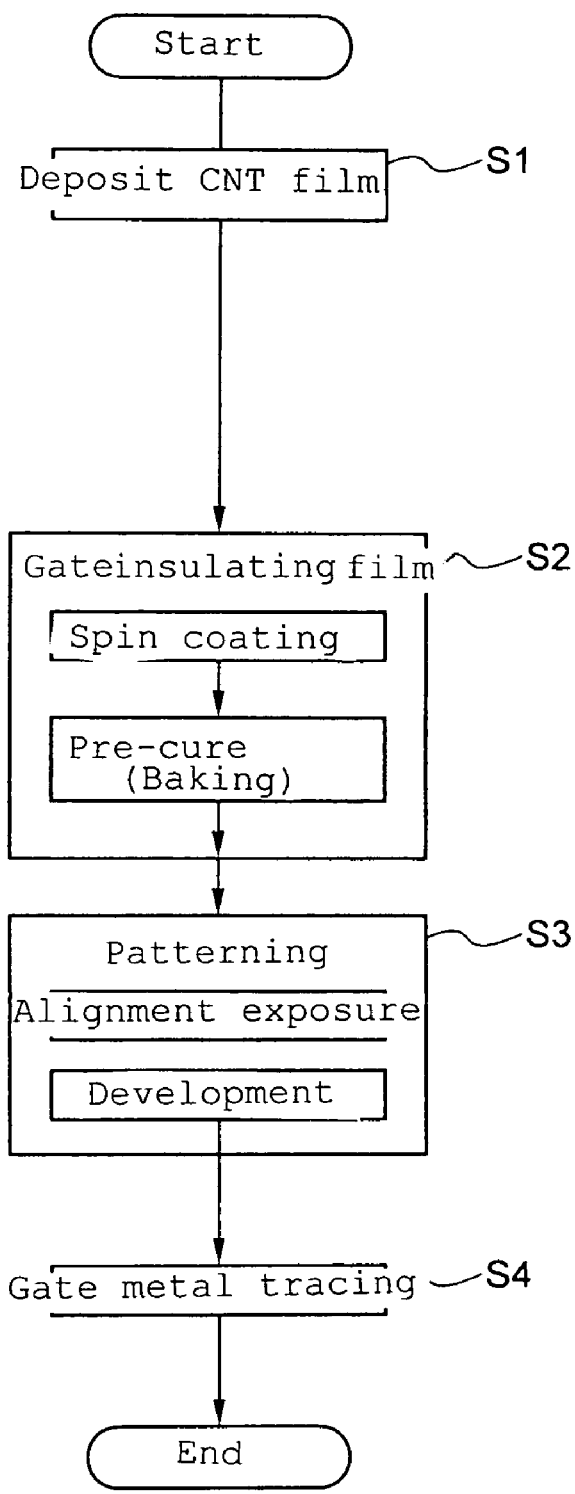
FIG. 3 is a flowchart illustrating the fabrication process of FIG. 2.

FIGS. 2A to 2D illustrate the fabrication process for the FED according to the first embodiment of the present invention, FIG. 3 showing the flowchart of the fabrication method.

First, in step S1, the CNT film 112 is deposited on the glass substrate 110 via the conductive layer 111 (FIG. 2A). Then, in step S2, an insulating film forming liquid is spin coated onto the CNT film 112 and then baked to form the gate insulating film 113 (FIG. 2B).

Subsequently, in step S3, by the patterning for performing alignment exposure and development, the gate openings (emitter holes) 117 are formed (FIG. 2C). Furthermore, in step S4, metal traces are provided on the gate insulating film 113 on which the gate openings 117 are formed, thereby forming the gate electrodes 116 (FIG. 2D). This provides a completed field emission cold cathode (cathode panel) for a FED using a CNT film.

In a case where the CNT film 112 has irregularities or many gaps are present between the CNTs in FIG. 2A, the following problems may occur in the spin coating process shown in FIG. 2B. An irregularly formed surface of the gate insulating film 113 would not allow an insulating film liquid material being spin coated not to extend uniformly, resulting in a nonuniform film thickness of the gate insulating film 113 when completed. This also causes air bubbles 136 to remain in the irregularities of the surface or the gaps between the CNTs and diffuse into the insulating film liquid material, resulting in the gate insulating film 113 containing the air bubbles 136. In this case, the excellent insulating characteristics are to be impaired and the mechanical strength is to be reduced.

Furthermore, upon forming the CNT film 112 on the conductive layer 111, it is not possible to ensure a sufficient strength of the CNT film 112 unless an organic binder is contained, however, in the case of which gases emitted from the organic binder may impair the degree of vacuum in the completed FED. Furthermore, upon securing the CNT film to the glass substrate by performing baking, the baking causes the organic binder components impregnated in the CNT film to be burned out and not remain as the film component, a reduction in volume caused by which in turn raises problems such as of making the surface of the CNT film 112 irregular or creating gaps between the CNTs, thus making it difficult to form a flat CNT film.

Figure 4:
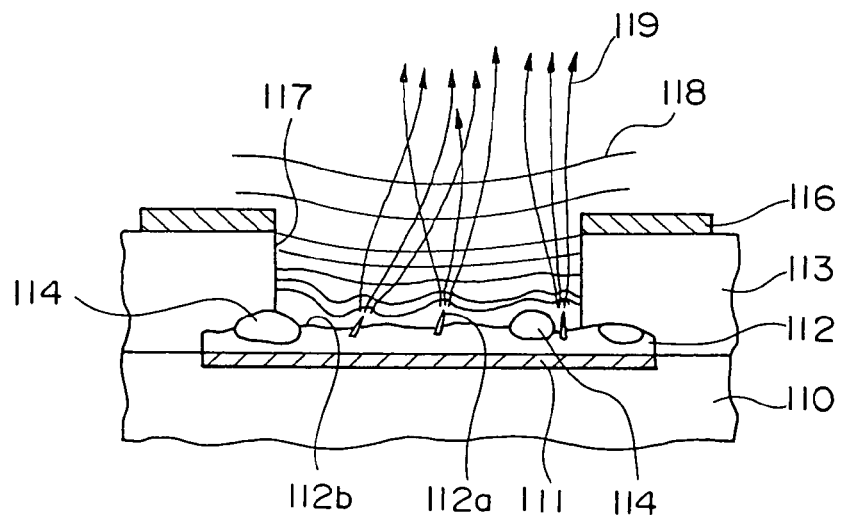
FIG. 4 is a sectional view illustrating a sectional structure of the FED in greater detail.

A sectional structure of the FED is illustrated in greater detail in FIG. 4. On the glass substrate 110, the FED has the conductive layer 111 (cathode electrode) and the CNT film 112 serving as an electron emitting source in that order. Above the CNT film 112, formed are the gate electrodes 116 via the gate insulating film 113 having a thickness of the order of 20 μm. The gate opening 117 is formed which cylindrically penetrates the gate electrode 116 and the gate insulating film 113 in a predetermined etching process. There exist CNTs 112a, which are aligned upright, on the surface of the CNT film 112 at the bottom surface of the gate opening 117, and the CNTs 112a emit electrons. Here, the "upright alignment" shows the state in which the tip portion of the CNTs 112a in the CNT film 112 is aligned at an angle of 50 degrees or less relative to the normal to the glass substrate 110.

The following problems will occur when large particulate impurities 114 are mixed into the CNT film 112 upon forming the CNTs. The large particulate impurities 114 having particle diameters more than several micrometers would result in an irregular surface of the CNT film 112. When this irregular shape appears in the gate opening 117, the potential distribution on the surface of the CNT film 112 is distorted.

For example, when a voltage of 30V is applied to the gate electrode 116, 0V is applied to the emitter 112 containing the conductive layer 111, and 1 KV is applied to the anode electrode provided on the gate electrode 116, respectively, as shown in FIG. 4, equipotential planes 118 are generated. At this time, the equipotential plane 118 is significantly distorted on the surface of the CNT film 112 on the surface of which the large particulate impurities 114 are present.

On the left end side in the gate opening 117 in FIG. 4, the presence of the large particulate impurities 114 causes the gate insulating film 113 to be thinner by that amount or a phenomenon to occur in which electric fields are extraordinarily concentrated due to the projected shape of the large particulate impurities 114, resulting in a reduced dielectric resistance between the gate electrode 116 and the conductive layer 111. For the gate electrode 116 configured to be lifted due to the effects of the large particulate impurities 114, there will be raised a problem that the gate electrode 116 is unnecessarily distant from the CNTs 112a aligned upright, thereby making it difficult to emit electrons and causing electron trajectories 119 to be distorted. Although the FED is expected to uniformly emit electrons from each electron emitting structure, the uniformity may be lost due to the presence of the large particulate impurities 114.

A description is provided to an arc discharge apparatus for generating CNTs of the CNT film according to this embodiment to solve the aforementioned problems.

Figure 5:
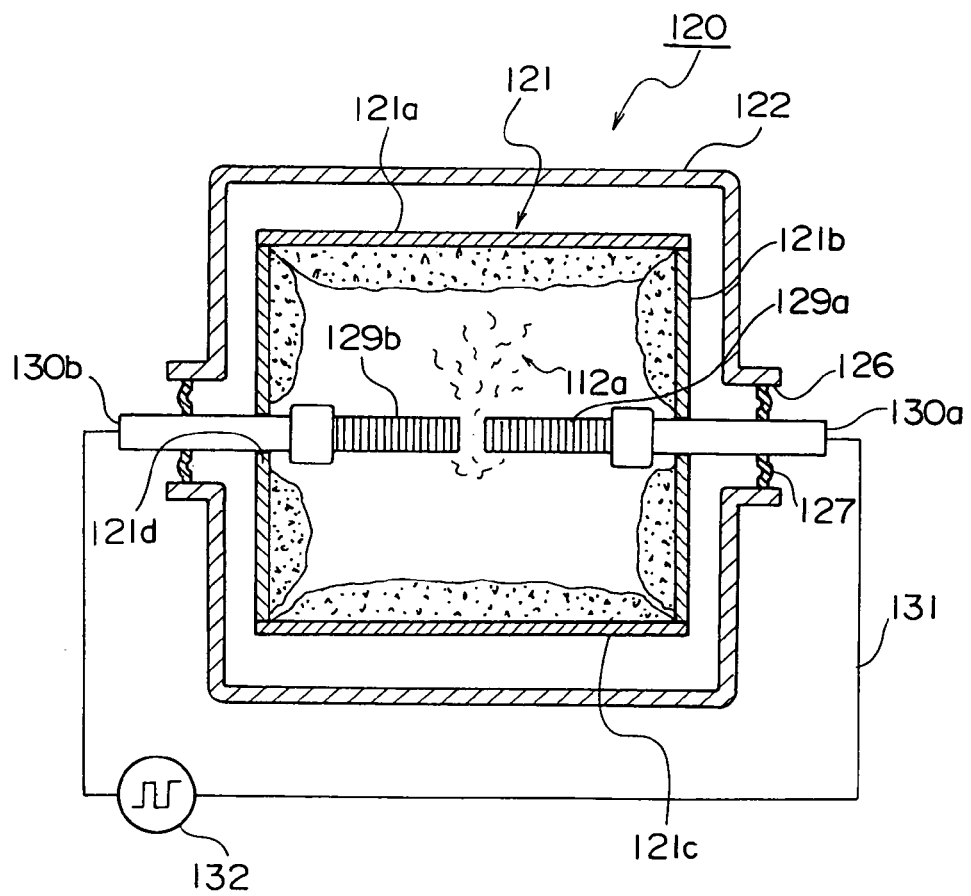
FIG. 5 is a sectional view illustrating an arc discharge apparatus.

FIG. 5 is a sectional view illustrating this arc discharge apparatus.

An arc discharge apparatus 120 includes a vacuum chamber 121 defining a shield plate to be water cooled and a case 122 for covering the exterior of the vacuum chamber 121. The vacuum chamber 121 is constructed generally in a cubic shape with a rectangular top plate 121a and a bottom plate 121c opposing each other and four side plates 121b the upper and lower ends portions of which are jointed to each side of the top plate 121a and the bottom plate 121c, respectively. Incidentally, the vacuum chamber 121 is not limited to the general cubic shape but may also be constructed in a general cylindrical shape.

Discharge electrodes 130a, 130b to which each bottom end portion of carbon bars 129a, 129b having the top end portions projected into the vacuum chamber 121 is clamed are fitted into holes 121d that penetrate portions of the side plates 121b of the vacuum chamber 121 and into holes 126 that are each formed on the sides of the case 122 corresponding to the holes 121d. The carbon bars 129a, 129b contain a predetermined catalytic metal, each being held with the top end portions opposed and spaced by a predetermined distance. A sealing member 127 is fitted in between the discharge electrodes 130a, 130b and the inner circumferential surface of the holes 126, thereby allowing the inside of the case 122 to seal out the atmosphere. The discharge electrodes 130a, 130b are each connected to an arc discharge power supply 132 employing a rectangular wave scheme via lead wires 131.

Figure 6:
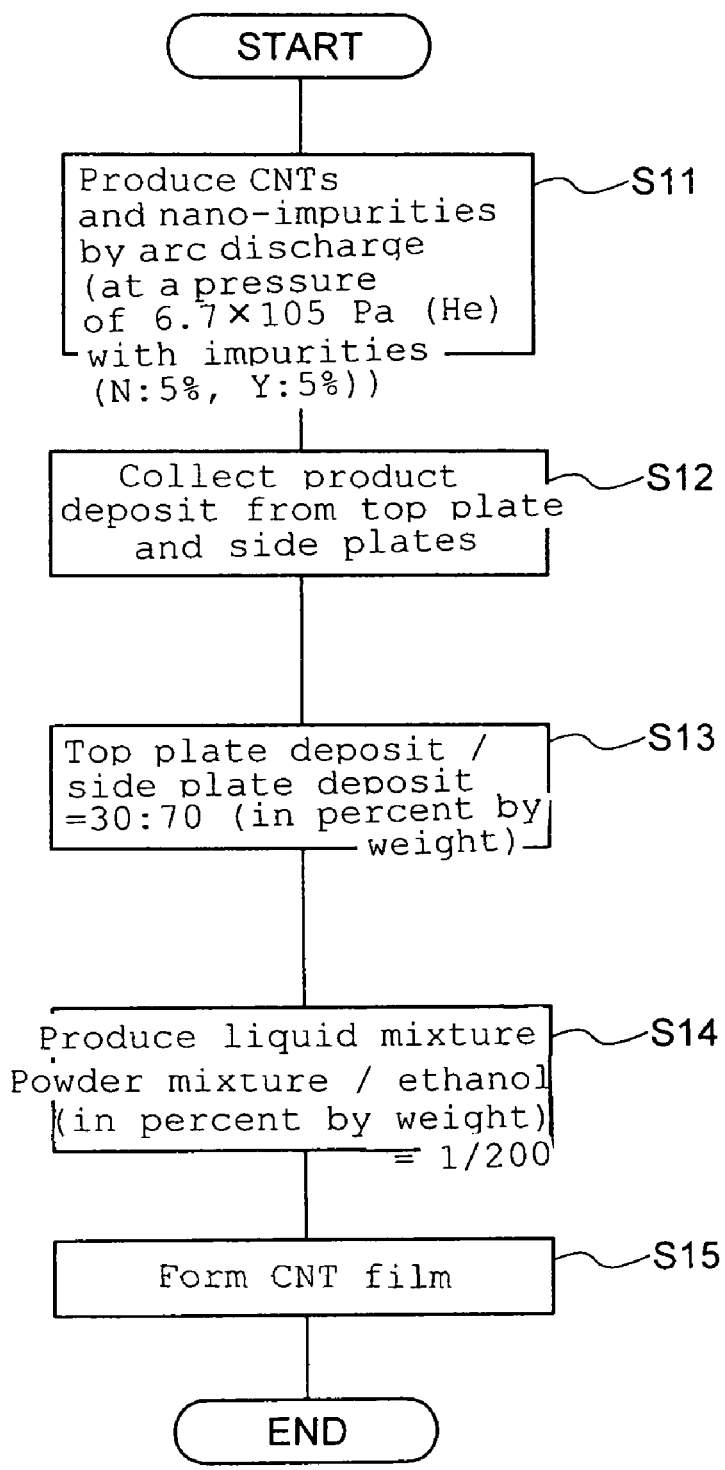
FIG. 6 is a flowchart illustrating a production method employing arc discharge.

Now, a method for producing CNTs using the arc discharge apparatus 120 will be specifically explained. FIG. 6 is a flowchart illustrating this production method. First, in step S11, the vacuum chamber 121 is evacuated and maintained at a pressure of $1 \times 10^{-1}$ Pa or less, and thereafter a helium (He) gas is introduced into the vacuum chamber 121 which is in turn maintained at pressure of $6.7 \times 105$ Pa. Furthermore, under this pressure, the arc discharge power supply 32 applies a rectangular wave to the discharge electrodes 130a, 130b to generate arc discharges between each of the top end portions of the carbon bars 129a, 129b. At this time, a convection current of the He gas is present within the vacuum chamber 121.

Each top end of the carbon bars 129a, 129b heated by the arc discharge to a high temperature causes the carbon of the carbon bars 129a, 129b themselves and a trace of metal impurities (catalytic metal) contained in the carbon bars 129a, 129b to sublime and be carried by the convection current of the He gas to rise in the vacuum chamber 121 in the form of smoke. That is, the sublimation by the arc discharge and the crystallization resulting from the rapid cooling of the sublimate gas molecules colliding with the He molecules result in producing CNTs, various carbon base particles, and chemical compounds and mixtures of carbon and particulate impurities to be discussed later. On the other hand, the percentage of metal impurity content is 5% for nickel (Ni) and 5% for yttrium (Y) in percent by weight with respect to 100% for carbon.

When the CNTs or the like in the form of smoke reach the inner surface of the vacuum chamber 121, they adhere to each of the top plate 121a, the side plates 121b, and the bottom plate 121c to deposit thereon in the form of soot. At this time, different types and shapes of crystals are deposited on the top plate 121a, the side plates 121b, and the bottom plate 121c, respectively. In step S12, the product powder deposited on the top plate 121a in the vacuum chamber 121 (hereinafter referred to as the "top plate deposit") and the product powder deposited on the side plates 121b (hereinafter referred to as the "side plate deposit") are collected. At this time, the product powder deposited on the bottom plate 121c (hereinafter referred to as the "bottom plate deposit") is not used but discarded even when collected.

For example, a discharge sustained for ten minutes by arc discharge would make it possible to collect one gram of the top plate deposit and the side plate deposit in total. The weight ratio between the top plate deposit and the side plate deposit is often about 30:70. In step S13, a powder mixture of the top plate deposit and the side plate deposit is prepared which is mixed at a ratio of 30:70 by weight or the like. This mixing processing is performed using a mixer by dry mixing. On the other hand, when an adjustment is made to the distance between the carbon bars 129a, 129b so as to obtain one gram of deposit in 15 minutes, the ratio between the top plate deposit and the side plate deposit can be made 40:60 in percent by weight.

Then, in step S14, a liquid mixture is produced at a ratio of 1:200 between the powder mixture and ethanol by weight. That is, 200 grams of ethanol are prepared for one gram of the powder mixture, the powder mixture being mixed into the ethanol. In this case, the powder does not dissolve but is made up of so fine particles as to scatter generally uniformly into the ethanol.

Furthermore, in step S15, the CNT film 112 is formed using the powder mixture prepared in step S13. Here, it is possible to enhance the film strength by mixing an organic binder such as acrylic or enhance the adhesion to the glass substrate 110 using an organic binder. On the other hand, even without using any organic binder, the adhesion can be performed with the intermolecular forces of the CNTs and particulate impurities. Even in the presence or absence of an organic binder, it is possible to improve the adhesion by providing irregularities on the surface of the substrate to increase the surface area.

Figure 7A:
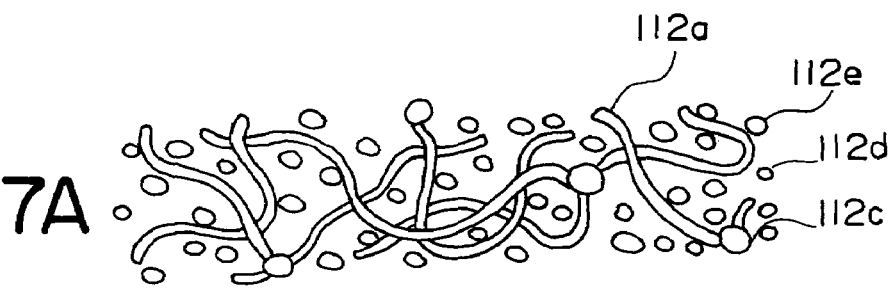
FIGS. 7A to 7C are views illustrating typical shapes of product powder deposited in a vacuum chamber, FIG. 7A showing top plate deposits, FIG. 7B showing side plate deposits, FIG. 7C showing bottom plate deposits, respectively.
Figure 7B:
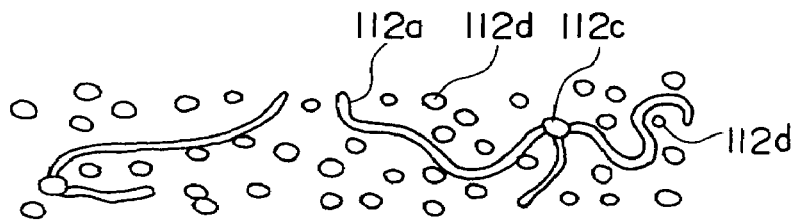
Figure 7C:
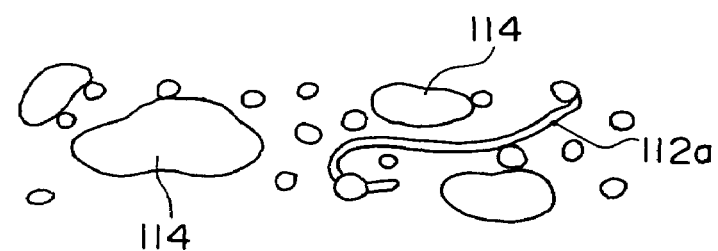

FIGS. 7A to 7C illustrate typical shapes of product powder deposited in the vacuum chamber. As shown in FIG. 7A, in the top plate deposit, observed are particulate impurities 112c formed such that carbon networks bonded in a six-carbon ring structure surround fine metal particles. A single layer of the CNT 112a is grown from the particulate impurity 112c. The CNTs 112a are elongated like hair and a plurality thereof are often tied in a bundle, whereas a plurality thereof may be grown. In the top plate deposit, particulate impurities 112d located away from the CNTs 112a as well as particulate impurities 112e adhered to the CNTs 112a are also observed. Here, a droplet of the top plate deposit having ethanol added thereto, which was placed on a piece of glass, was observed with an electron microscope. In this case, the existence ratio of the CNTs 112a and the particulate impurities was about 80:20 in percent by area.

As shown in FIG. 7B, the contents of the side plate deposit were generally the same as those of the top plate deposit. However, when compared with the top plate deposit, the side plate deposit had a less existence percentage of the CNTs 112a, i.e., about 0.5% of the entirety in percent by area.

As shown in FIG. 7C, in the bottom plate deposit, observed were the large particulate impurities 114 having particle diameters of several micrometers or more in addition to the deposits of the types found in the aforementioned top plate deposit and the side plate deposit.

Figure 8A:
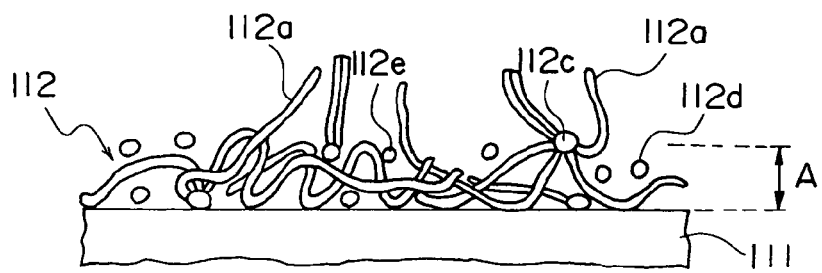
FIGS. 8A to 8C are views illustrating enlarged shapes of a CNT film formed in the CNT film formation process of FIG. 6, FIG. 8A showing the case of employing 100% of top plate deposits, FIG. 8B showing the case of employing a mixture of 30% of top plate deposits and 70% of side plate deposits, FIG. 8C showing the case of employing 100% of side plate deposits, respectively.
Figure 8B:
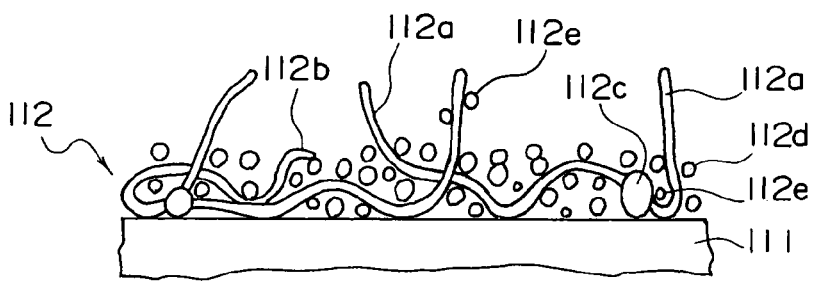
Figure 8C:
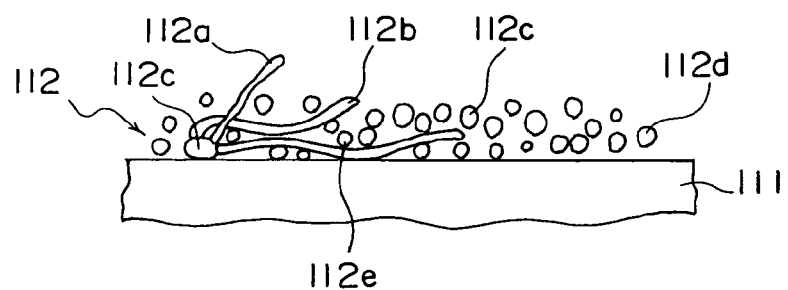

Referring to FIGS. 8A to 8C, there are schematically shown the enlarged shapes of the CNT film formed in the CNT film formation process in step S15 of FIG. 6. FIG. 8A shows the case of employing 100% of the top plate deposit, FIG. 8B shows the case of employing a mixture of 30% of the top plate deposit and 70% of the side plate deposit, and FIG. 8C shows the case of employing 100% of the side plate deposit, respectively.

The mixture weight ratio between the top plate deposit and the side plate deposit and the area ratio upon having observed a cross section of a CNT layer with an electron microscope were measured to obtain the following results. That is, (1) The area ratio between the CNTs and the particulate impurities was 0.5:99.5 at a weight ratio of 0:100 between the top plate deposit and the side plate deposit, (2) The area ratio between the CNTs and the particulate impurities was 10:90 at a weight ratio of 10:90 between the top plate deposit and the side plate deposit, (3) The area ratio between the CNTs and the particulate impurities was 25:75 at a weight ratio of 30:70 between the top plate deposit and the side plate deposit, (4) The area ratio between the CNTs and the particulate impurities was 40:60 at a weight ratio of 50:50 between the top plate deposit and the side plate deposit, and (5) The area ratio between the CNTs and the particulate impurities was 80:20 at a weight ratio of 100:0 between the top plate deposit and the side plate deposit.

When particulate impurities having an average diameter of 30 nm were observed under an electron microscope, the volume ratio between the CNTs and the particulate impurities was found to be about 2:98 at an area ratio of 40:60. On the other hand, for 0.5:99.5, the volume ratio is $1 \times 10^{-7}:1$. It was found that the volume ratio VR between the CNTs and the particulate impurities was proportional to the average diameter Dn nm of the CNTs and S(CNT) and inversely proportional to S(NP) to the power of 1.5, where S(CNT) $nm^2$ and S(NP) $nm^2$ are the areas of the CNTs and the particulate impurities taken under the electron microscope (with a field of view of $1.2 \times 1.0$ $\mu m^2$), respectively. That is, the volume ratio VR is expressed by $$VR = K \times Dn \times S(CNT)/S(NP)^{1.5},$$

where the coefficient K is defined so that K=1.02. Therefore, a known average diameter of CNTs can be converted into a volume ratio by the aforementioned equation.

For the CNT film according to this embodiment, the area ratio between the CNTs and the particulate impurities in cross section and surface structure is desirably set within the range of 0.5:99.5 to 40:60. In this case, by setting the area ratio between the CNTs and the particulate impurities within the range of 0.5:99.5 to 40:60 to fill the mutual gaps between the CNTs, it is possible to ensure the mechanical film strength without depending only on the organic binder while readily providing a flat shape which traps no air bubbles in the film. It is also made possible to eliminate a complicated CNT refining process that may cause impurities other than nanotubes to be removed more than necessary and to mitigate deterioration in electron emission characteristics caused by an increase in diameter of bundles.

As shown in FIG. 8A, since the percentage of CNTs is relatively greater than that of particulate impurities when the top plate deposit was used 100%, more CNTs are aligned upright in the vertical direction from the conductive layer 111 (the CNTs 112a). In the film, also observed are horizontally aligned CNTs 112b, and CNTs adhered to each other resulting in an increase in its bundle diameter. Here, the "horizontal alignment" means the states of being toppled over along the glass substrate 110 (see FIG. 1). An emitter constructed as an electron emitting source employing CNTs provides the fullest field concentration in the upright alignment attitude to function as an excellent electron emitting source, and it is therefore critical how many upright aligned CNTs 112a are available. In the figure, "A" indicates the average thickness of the CNT film 112.

As shown in FIG. 8B, when 30% of the top plate deposit and 70% of the side plate deposit are mixed to be used, the upright aligned CNTs 112a are slightly less when compared with FIG. 8A, however, almost no adhered CNTs are found. On the other hand, those shapes are indicated which have the particulate impurities 112e, 112d adhered to around the CNTs.

As shown in FIG. 8C, when the side plate deposit was used 100%, the upright aligned CNTs 112a are very few whereas particulate impurities 112c, 112d, 112e increase.

When compared with the conventional technique, the aforementioned embodiment does not perform a complicated CNT refining process, thus making it possible to suppress bundling of CNTs during the refining process or during the formation of the film. Furthermore, the amount of mixture of particulate impurities which were conventionally excluded as unnecessary components and which mix during the CNT fabrication process is positively controlled, thereby making it possible to reduce contacts between neighboring CNTs and suppress bundling. That is, it is possible to mitigate deterioration in emission characteristics caused by an increase in diameter of bundles.

More specifically, as shown in FIG. 8A, since the particulate impurities 112e, 112d surrounding the CNTs are relatively fewer than the CNTs, the CNTs are apt to adhere to each other, thereby readily causing an increase in bundle diameter. However, in FIG. 8B, because of the presence of a moderate amount of particulate impurities surrounding the CNTs, neighboring CNTs are less prone to contacts due to particulate impurity impediments thereto. Accordingly, an increase in bundle diameter is suppressed.

Furthermore, the mixture ratio between the CNT and the particulate impurity is controlled to a desired value, thereby making it possible to control the separation (density) of the CNT tips present on the CNT film surface. Conventionally, in the refining process employed before the emitter was formed, impurities other than the nanotubes were excluded. This is effective to realize nanotubes of high purity, but increases the percentage of nanotubes occupying a unit area of the nanotube film surface and provides dense separations to the tips of the neighboring nanotubes. The separation between the neighboring CNTs projected on the CNT film surface via the refining process is about 1 μm or less. On the other hand, when particulate impurities are combined in the CNTs, that is, their separations are 2 μm in FIG. 8A, 4 μm in FIG. 8B, and 20 μm in FIG. 8C.

Figure 9:
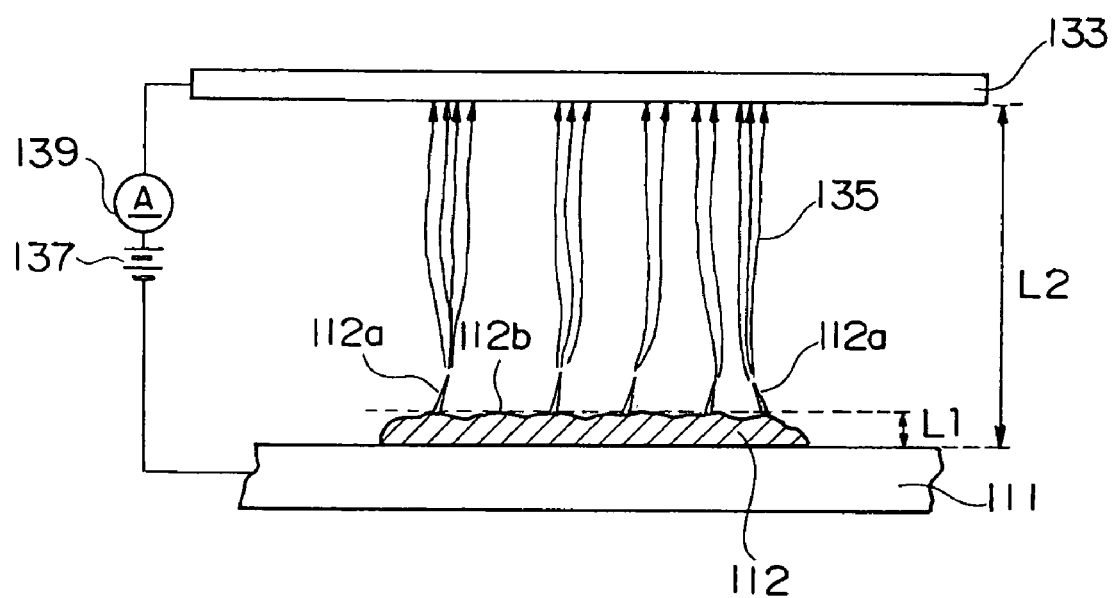
FIG. 9 is a sectional view illustrating the state under which measured with a fluorescent screen are the electron emission characteristics of an emitter employing the CNT film fabricated by the fabrication method according to the first embodiment of the present invention.

FIG. 9 is a view illustrating the state under which measured with a fluorescent screen 133 are the electron emission characteristics of an emitter employing the CNT film obtained by the fabrication method according to the aforementioned embodiment. Upon this measurement, the distance L2 between the conductive layer 111 (cathode electrode) located below the CNT film 112 having a thickness of L1 and the fluorescent screen 133 opposite thereto was set at 1 mm, while in a vacuum, a negative voltage was applied from a power supply 37 to the conductive layer 111 and a positive voltage was applied to the fluorescent screen 133, respectively. At this time, the upright aligned CNTs 112a emitted electrons as shown by trajectories 135. The current flowing between the fluorescent screen 133 and the conductive layer 111 was measured with an ammeter 36.

Figure 10:
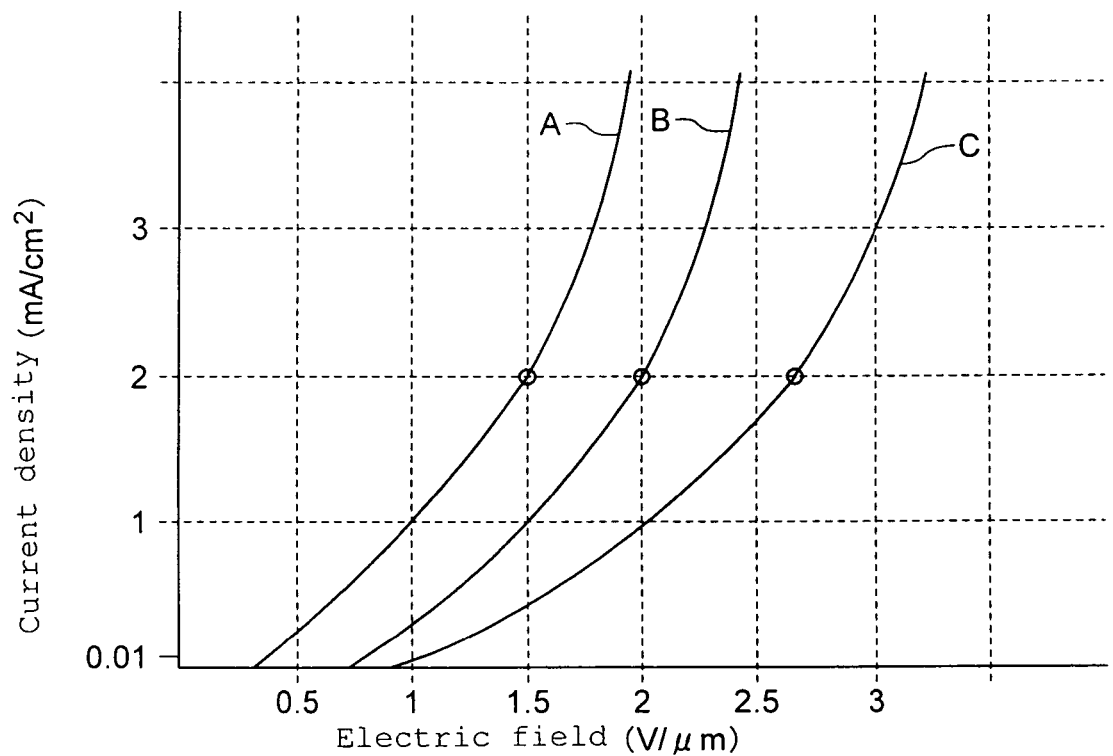
FIG. 10 is a graph showing the correlation between the electric field and the current density which are determined in the measurements of FIG. 9.

FIG. 10 is a graph showing the correlation between the electric field and the current density which are determined in the measurement of FIG. 9. The results of the graph were determined from the distance L2 between the fluorescent screen 133 and the conductive layer 111, and the electric field application voltage. With the area of the CNT film 112 defined as an emitter area, the current density was determined by diving the current obtained by the ammeter 139 by this area.

In FIG. 10, graph A shows the result of having used the CNT film 112 having a mixture weight ratio of 30:70 between the top plate deposit and the side plate deposit, i.e., the CNT film 112 of a top plate percentage of 30%; graph B shows the result of having used the CNT film 112 of 100% of the side plate deposit including no top plate deposit; and graph C shows the result of having used the CNT film 112 formed by using 100% of the top plate deposit, respectively. As a result of the measurements, graph A emitted electrons in the lowest electric field and emitted electrons at the highest current density in the same electric field. Each of the CNT films 112 of graphs A to C provided a current density of 2 mA/cm$^2$ in the electric field of 1.5V/μm, 2V/μm, and 2.7V/μm, respectively.

Figure 11:
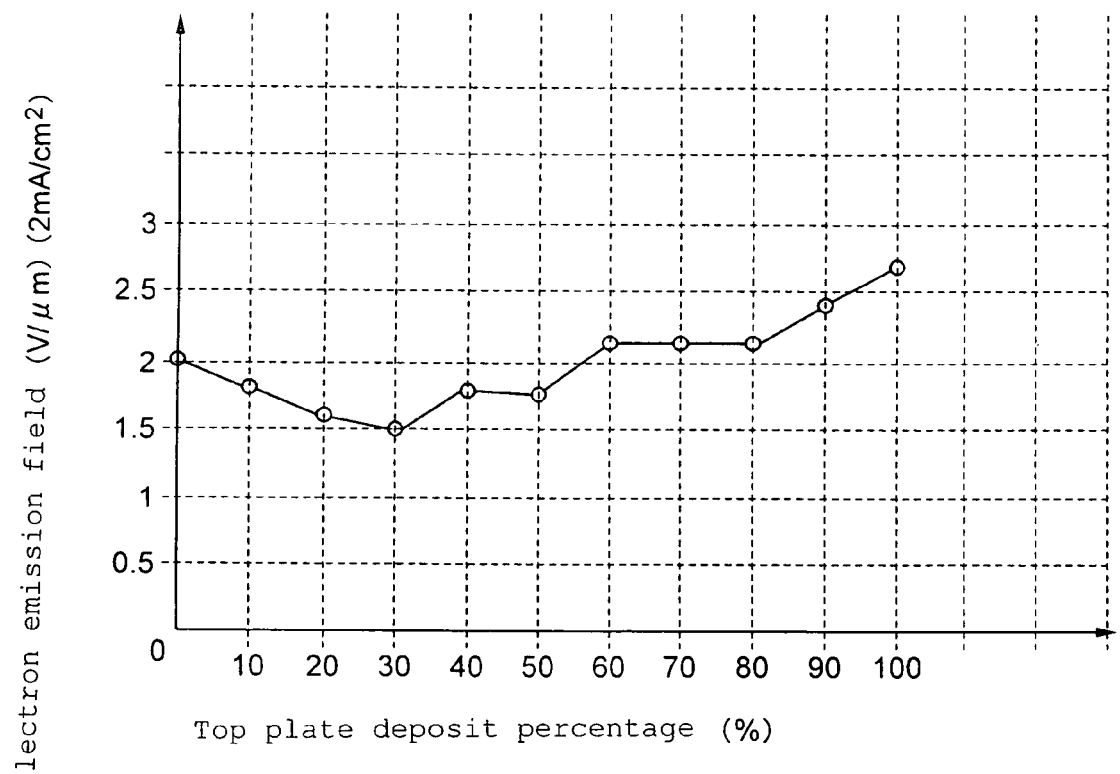
FIG. 11 is a graph showing the dependency on the mixture ratio upon measuring the percentage of top plate deposits.

FIG. 11 is a graph showing the dependency on the mixture ratio upon measuring the percentage of the top plate deposit in increments of 10%. In the graph, it can be seen that the lowest electron emission of 1.5 mA/cm$^2$ is obtained at a top plate deposit percentage of 30% while the highest electron emission field of 2.7V/μm is obtained at a top plate deposit percentage of 100%. For example, the current density of 2 mA/cm$^2$ is a value at which an intensity of 700 cd/m$^2$ is obtained through the application of a high voltage of 5 kV using a P22 phosphor (i.e., ZnS:Cu, Al) in the fluorescent screen 133. This means that a drive electric field of only 1.5V/μm is enough to obtain a sufficiently bright screen of 700 cd/m$^2$ at an FED.

The aforementioned result that the electron emission field was enhanced in FIG. 11 when the CNT film 112 of 100% of the top plate deposit was used was because as shown in FIG. 8A, since the particulate impurities 112e, 112d surrounding the CNTs are relatively fewer than the CNTs, the CNTs are apt to adhere to each other thereby readily causing an increase in bundle diameter and the distances between the CNTs projected from the CNT film surface are short. The particulate impurity serves to suppress an increase in bundle diameter caused by the adhesion of neighboring CNTs to each other, however, in the case of which the effect is little, and thus the CNTs or the CNT bundles adhere locally to each other, resulting in an increase in bundle diameter. The higher the electric field concentration, i.e., the smaller the bundle diameter, the lower the electron emission field is. However, since the combination ratio between the CNTs and the particulate impurities works here to increase the bundle diameter, the electron emission field becomes higher.

Furthermore, when the purity of CNTs is increased by increasing the mixture percentage of the top plate deposit or by refining the CNTs after having been fabricated, the density of the CNTs present on the CNT film surface is increased. Therefore, the distances between the CNTs projected from the CNT film surface are shortened. For example, the distance between neighboring CNTs projected from the CNT film surface shown in FIG. 8A is about 2 μm as described above while being less than that for a refined CNT film.

As described above, a shorter distance between neighboring CNTs makes it harder for a field concentration to occur at the tip of the CNTs or at the tip of the bundles. Since the CNT is a substance exhibiting metallic or semiconductor-like conduction, an external electric field does not penetrate into the CNT but exhibits a field distribution as crawling over the surface thereof. For example, one CNT isolated and aligned upright on the substrate causes the electric field to distribute so as to cover the sharp CNT tip portion from the substrate surface, thereby increasing the field concentration at the CNT tip portion. However, a plurality of CNTs densely aligned would cause individual CNTs to shield the electric fields, thereby making the field concentration at the CNT tip portion less than that of one CNT. Such a suppression effect on field concentrations is further enhanced as the distance between neighboring CNTs is reduced.

The inventor et al calculated the dependency of the field emission electric field on the distance between neighboring CNTs to examine in greater detail the suppression effect on field concentration as described above. More specifically, with the number of CNTs increased in a certain area (the distance between neighboring CNTs being reduced), the field distribution and the degree of field concentration near the CNT tip at that time were calculated to find the field emission electric field. Incidentally, the height of the aligned CNTs was 1 μm and the diameter of the CNTs (bundle) was 20 nm. As a result, it was shown that the field emission electric field tended to decrease while the distance between neighboring CNTs was decreased from infinity to 2.4 μm. This is because of a simple increase in the electron emitting point (CNT). However, conversely, at a distance of 2.4 μm or less between neighboring CNTs, it was shown that the degree of field concentration of individual CNTs tended to decrease and the field emission electric field tended to increase. This result means that excessively densely aligned CNTs may only cause the characteristics to deteriorate.

On the other hand, as suggested by the calculation result, the reason for an increase in the electron emission field at 30% or less of the top plate deposit in FIG. 11 is because the CNTs responsible for electron emission are substantially reduced.

As described above, the condition for not being subjected to the suppression effect on field concentration even in the case of an increase in the density of CNTs and the CNTs not being adhered to each other was that the top plate deposit percentage was 50% or less. The distance between the CNTs at 50% is about 2.5 μm, which is a combination percentage corresponding to the threshold value at which the aforementioned suppression effect works on field concentration.

However, an excessively small percentage of the top plate deposit would cause the field emission electric field to increase as well as the stability and uniformity of current to deteriorate. This is because the number of CNTs decreases substantially, thereby reducing the electron emitting point per unit area and causing fluctuations in emission current from individual CNTs not to be averaged statistically. The emission current is recognizable to the naked eyes to be sufficiently stable only at a top plate deposit percentage of 10% or more.

Therefore, from the viewpoint of electron emission, the top plate deposit percentage is desirably 10% or more, more desirably 10% or more and 50% or less. On the other hand, in terms of the CNT area ratio of the CNTs and particulate impurities to the total area, the percentage of CNT content is desirably about 10% or more, or more desirably 10% or more and 40% or less.

Figure 12:
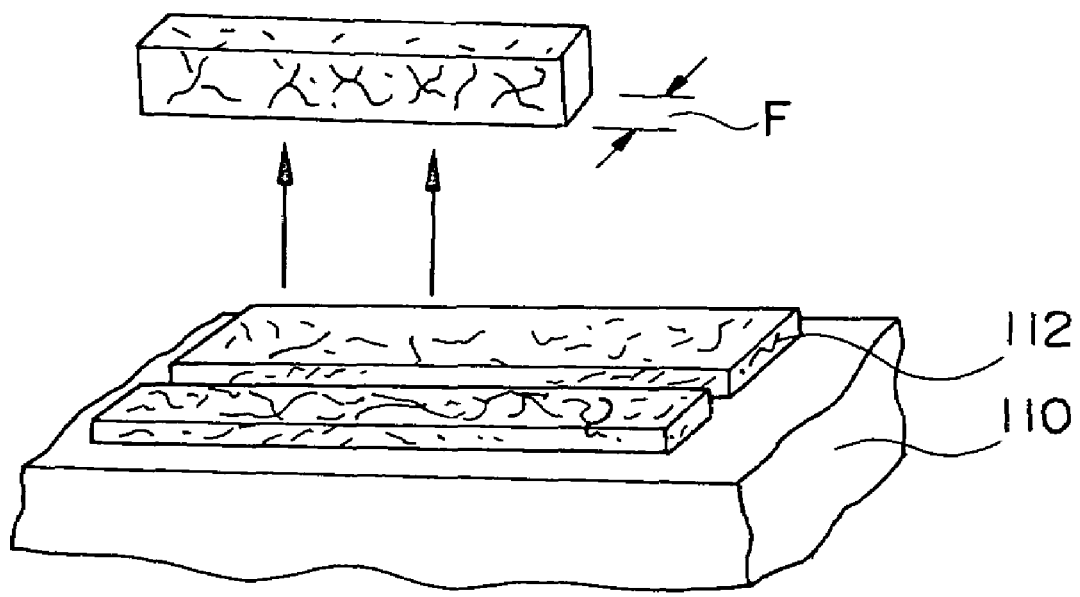
FIG. 12 is a perspective view illustrating the state of a sliced CNT film deposited on a glass substrate.

As shown in FIG. 12, the CNT film 112 deposited on the glass substrate 110 was sliced into the shape of a thickness F of 0.5 μm and observed visually from the front toward the back of the figure to measure the filling rate of the CNT film 112 depending on the extent of gaps found. When no gaps are found, the filling rate is 100%, whereas the filling rate is 10% when gaps are found entirely.

Figure 13:
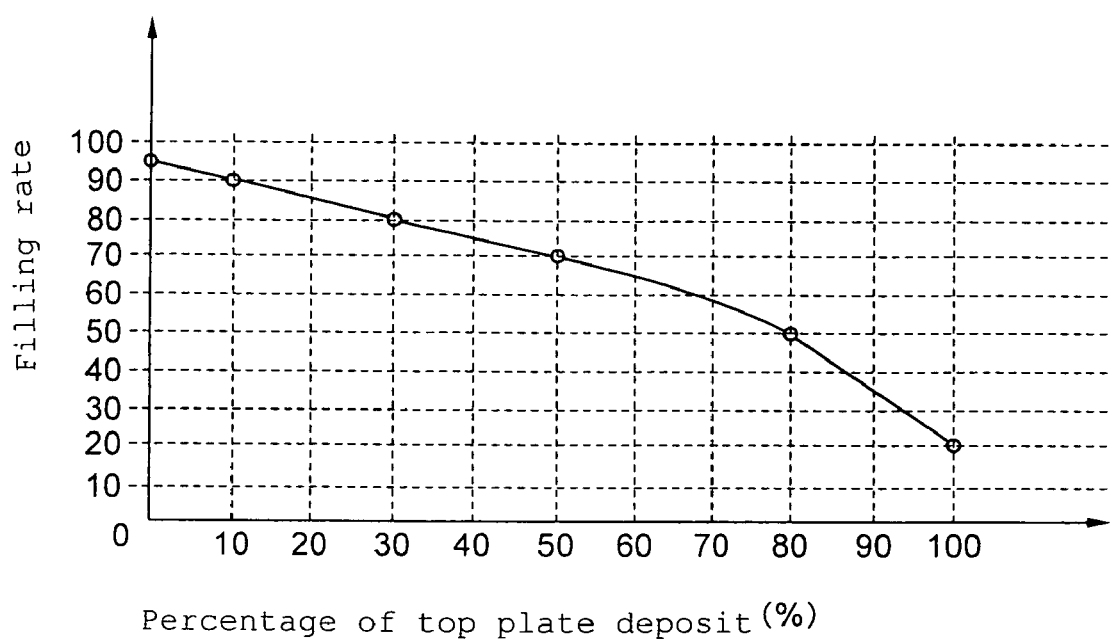
FIG. 13 is a graph showing the relationship between the percentage of top plate deposits and the filling rate.

FIG. 13 is a graph showing the relationship between the percentage of the top plate deposit and the filling rate. Upon evaluating the filling rate of a CNT film, the filling rate of 0% never exist in practice. As can be seen from the graph, the CNT film 112 prepared using only the side plate deposit (at a top plate deposit percentage of 0%) results in a very high filling rate of 95%. This means that almost spherical particulate impurities entered the gaps between scattered CNTs to thereby raise the filling rate. Conversely, an increase in the top plate deposit weight ratio will increase the existence percentage of CNTs to tangle the CNTs with each other, thereby causing the gap to increase. That is, at a higher filling rate, the CNT film 112 has desirably less irregularities and is thus preferable to provide the gate insulating film 113 and the gate electrodes 116 (or a grid electrode) on the CNT film 112. Conversely, a lower filling rate may result in the occurrence of air bubbles in the gate insulating film 113. From the viewpoint of the preference of the CNT film 112 having a higher filling rate, the higher the side plate deposit percentage, the better.

More specifically, the filling rate was 80% at a mixture ratio of 30% of the top plate deposit, which is the most preferable value in practice. On the other hand, at a filling rate of 70% or less, i.e., at a top plate deposit percentage of greater than 50%, air bubbles readily occur upon forming an insulating layer on the CNT film, and irregularities may occur after the film is formed or abnormal electron emission may occur. Therefore, upon forming a structure on the CNT film to form a field emission cold cathode, the filling rate of particulate impurities is desirably controlled at 70% or more, i.e., the top plate deposit percentage at 50% or less. In this case, such an effect is obtained that enables a stable insulating layer having excellent insulation characteristics to be formed on the CNT film. In consideration of the aforementioned optimum condition for field emission (a top plate deposit percentage of 10% or more and 50% or less), the condition in which excellent electron emission characteristics can be maintained and a field emission cold cathode can be formed is found to be the top plate deposit percentage of 10% or more and 50% or less.

Now, a specific example of this embodiment will be explained. In this specific example, a CNT-FED is formed. That is, using the CNT film according to this embodiment provides effects that the irregularities on the surface of the CNT film 112 are suppressed, and less gaps between the CNTs allow air bubbles to hardly enter the gate insulating film 113.

As shown in FIG. 2D, the gate insulating film 113 was set at 5 μm in thickness to form the CNT-FED. The mixture ratio of the top plate deposit was set at 50% or less in order to make the gate insulating film 113 as thin as 5 μm. As shown previously, this is the condition in which the filling rate is 70% or more.

On the other hand, at a mixture ratio of 50% or more, irregularities on the surface and gaps in the film increase, thereby making it impossible to ensure a sufficient insulating resistance with a gate insulating layer of 5 μm. In this case, a film thickness of at least 15 μm or more is required to form an insulating layer having a sufficient insulating resistance. In contrast to this, at a mixture ratio of 50% or less, the particulate impurity blocks the gaps in the film, thereby causing air bubbles to hardly occur and enabling the formation of an excellent thin uniform insulating layer.

A thinner gate insulating film 113 lowers the voltage (drive voltage) applied between the gate electrodes 116 and the emitter 112b. For example, a gate insulating film 113 reduced into 25% in thickness from 20 μm to 5 μm allows the applied voltage to be well reduced into 25%. Therefore, the aforementioned condition which enables the insulating layer to be made thinner (a mixture ratio of 50% or less of the top plate deposit) is also effective for operation at low voltages.

As can also be seen from FIG. 1, the FED that employs an gate insulating film of a thickness of 5 μm and a CNT film having a mixture ratio of 30:70 requires an applied voltage, $$1.5V/\mu m \times 5 \mu m = 7.5V,$$

whereas the FED that employs a mixture ratio of 0:100 requires an applied voltage, $$2.0V/\mu m \times 5 \mu m = 10V.$$

Furthermore, although not illustrated in FIG. 11, when refined CNTs (to the right hand side from the percentage of 100% in FIG. 11) is used, the electron emission field is 2.8V/μm and the applied voltage at that time is 2.8V/μm×5 μm=14V. Therefore, with the insulating layer of a thickness of 5 μm, it is possible to drive the device at a low applied voltage of 10V or less for an electron emission field of 2V/μm or less.

However, like the refined CNTs, for an electron emission field of more than 2V/μm, the applied voltage is greater than 10V and thus a low-price liquid crystal address driver cannot be used, thereby making it necessary to develop a new address driver. This causes the price of the driver to increase, resulting in an increase in the price of the display module including the driver. Accordingly, the electron emission field is desirably 2V/μm or less. On the other hand, using a gate insulating film of a thickness of less than 5 μm also makes it possible to implement driving at 10V or less even in a field emission electric field of 2V/μm or more, however, in the case of which since operations for a long period of time may readily cause insulation deterioration of the insulating film, the film thickness is desirably 5 μm or more.

From the results in the foregoing, the composition of the optimum CNT film as the FED is desirably a top plate deposit percentage within the range from 0% or more and 50% or less. Additionally, in consideration of the problem such as the adhesion of CNTs to each other, a top plate deposit percentage is desirably within the range from 10% or more and 50% or less. Rewording these conditions in terms of the CNT area ratio at which the CNTs and the particulate impurities occupy the total area, the percentage of CNT content is desirably 0.5% or more and 40% or less, more desirably 10% or more and 40% or less.

Figure 14:
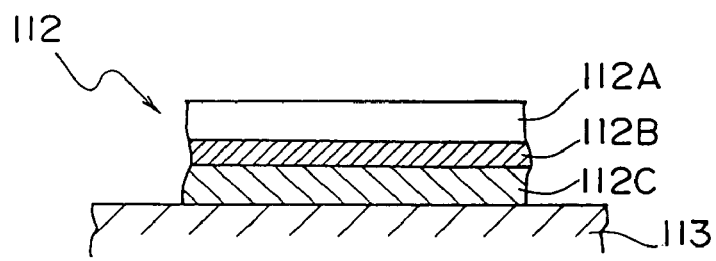
FIG. 14 is a sectional view illustrating a deposition process of a fabrication method according to a second embodiment of the present invention.

Now, a fabrication method according to a second embodiment of the present invention is explained. Referring to FIG. 14, the CNT film 112 is divided into three stages in the direction of thickness: a first layer 112A, a second layer 112B, and a third layer 112C.

The CNT film 112 contains the CNTs 112a and particulate impurities, and can be impregnated with an organic binder material such as acrylic, nitrocellulose, and polyimide resin in order to increase its mechanical strength and improve the characteristics of adhesion to the glass substrate 110. The reason why the organic binder was employed here is because it can be baked through a low-temperature process (at 300 degrees or less) and the CNT film can be easily patterned as described later. In view of these points, in this embodiment, the composition ratio is adjusted for each of the three portions of the CNT film 112.

The first layer 112A constituting an electron emitting surface employed a ratio at which the upright aligned CNTs 112a are increased. The second layer 112B employed a composition ratio at which particulate impurities are rich and the filling rate of the CNT film 112 is increased. The third layer 112C employed a composition ratio at which acrylic is rich, better characteristics of adhesion to the glass substrate 110 are provided, and the filling rate of the CNT film 112 is further improved.

More specifically, the composition ratio of CNTs:particulate impurities:acrylic can be set at a ratio of 20:80:0 for the first layer 112A, at a ratio of 5:80:15 for the second layer 112B, and at a ratio of 1:29:70 for the third layer 112C, respectively.

To fabricate the CNT film 112 by spraying, with three types of spray solutions prepared, the materials of the third ratio pattern of 1:29:70 are sprayed to a thickness of 0.2 μm during the initial spray corresponding to the third layer 112C. After it is dried, the materials of the second ratio pattern of 5:80:15 are sprayed to a thickness of 1 μm, and without drying them but as they are, the materials of the first ratio pattern of 20:80:0 are sprayed to a thickness of 0.5 μm.

Upper layers contain less amount of binder mixture to mitigate the upright aligned CNTs on the film surface toppled over due to the surface tension of the binder and an increase in work function caused by adhesion of binder components to the CNT surface. As describe above, designing such that upper layers contain a larger amount of CNTs and lower layers contain a larger amount of materials other than CNTs makes it possible to form a CNT film having an enhanced adhesion without causing deterioration in electron emission characteristics.

Although ethanol is added in order to spray well each of the materials having the aforementioned composition ratios, the ethanol evaporates after having been sprayed and is thus not taken into account in the composition ratio. In this embodiment, the acrylic component is also allowed to remain as it is as a component of the film to form a FED panel.

Figure 15:
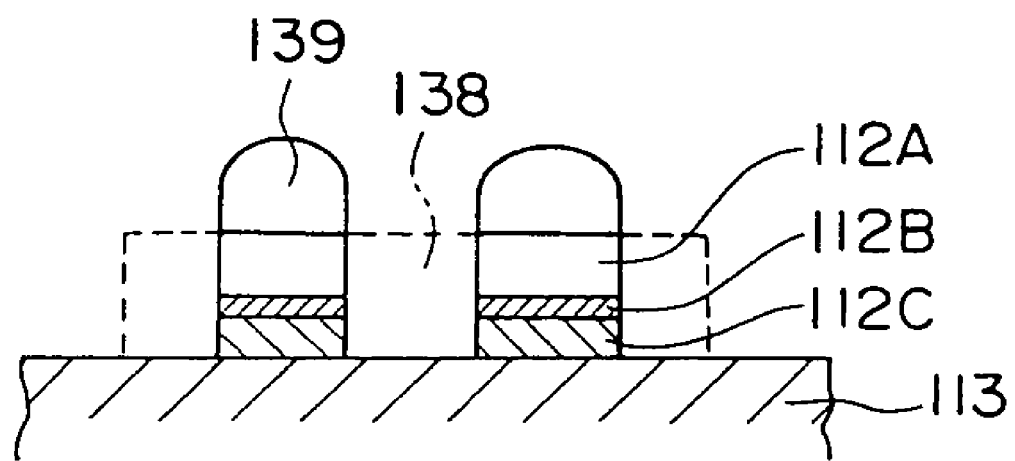
FIG. 15 is a sectional view illustrating the state of a CNT film being patterned in a fabrication method according to a third embodiment of the present invention.

Now, a fabrication method according to a third embodiment of the present invention is explained. Referring to FIG. 15, in the process for patterning the CNT film, the surface of a portion having to remain in the CNT film 112 is covered with a mask material 139 while a portion 138 having to be removed is dissolved in acetone or the like to thereby be removed. In this case, CNTs and particulate impurities are not dissolved in acetone, but the acrylic is dissolved.

Using the aforementioned method, the length of the contained CNTs is made shorter than the distance between gaps to be removed by patterning, thereby making it possible to perform patterning without raising a problem of causing the remaining CNTs to be bridged thereby disabling separation.

For the CNTs longer than the gap distance, the gap portion is mechanically rubbed so as to prevent bridging of the CNTs, thereby making it possible to remove the CNTs bridged temporarily. In this case, since the binder supporting the CNTs is dissolved in the acetone resulting in a reduction in strength, the bridged CNTs are easily removed. To remove bridged CNTs, such a method is also available by which current is allowed to flow between neighboring patterns after the patterning to melt the roots of the bridged CNTs.

In the absence of bridged CNTs where neighboring patterns are insulated therebetween, the current allowed to flow by applying a voltage between the neighboring patterns flows though the bridged CNTs. It was discovered that a current flowing through a thin CNT portion can cause the root or an interface portion between the bridged CNTs and the CNT film to be heated and melted. As described above, when bridged CNTs remain between neighboring traces which are essentially insulated therebetween, the method of removal by energization is applicable.

Setting at the composition ratio of the CNTs:particulate impurities:acrylic, which was explained with reference to FIG. 14, will allow 70% and 15% of impregnated acrylic to be dissolved in the second layer 112B and the third layer 112C, respectively. That is, acetone makes it possible to remove the entirety from the bottom surface portion of the CNT film 112 by etching. Since setting at the aforementioned composition ratio as described above allows preparation at a ratio suitable for patterning, it is possible to pattern the CNT film not only by the aforementioned wet etching but also by dry etching employing such as a plasma technique (oxygen plasma processing) or a milling technique.

For example, like the case of FIG. 15, the plasma technique can be used to perform patterning by exposing the aforementioned acrylic in the plasma to thereby burn it out with the remaining portion covered with a mask material. Since the CNTs 112a and the particulate impurities are burned out in conjunction with the organic binder such as acrylic in the oxygen plasma, removed components will never adhere again to the glass substrate 110.

In the aforementioned step, the etching rate of a binder material (another binder material) is desirably greater (faster) than at least that of the CNTs. For example, when a binder predominantly composed of an inorganic material such as SOG or water glass is used, they are hardly etched in the oxygen plasma and thus patterned with difficulty. On the other hand, when the etching rate of a binder material is less than that of the CNTs, since etching of only the CNTs takes place on a priority basis, the oxygen plasma causes the CNTs 112A under the mask material 139 and the CNTs in the underlying layer to be burned out before the formation of the etched region 138. Accordingly, an electric field applied to a patterned CNT film cannot provide a sufficient emission current.

However, since the etching rate of the binder material greater (faster) than at least that of the CNT allows the binder to be etched on a priority basis, the time for forming the etched region 138 depends only on the etching rate of the CNT. Accordingly, it is possible to minimize the etching time and mitigate the etching of the CNT layer under the mask material 139. On the other hand, a milling method employing an organic binder as the binder allows the etching rate of the binder material to be greater than that of the CNT, thus providing the aforementioned effect. These operational effects can also be obtained even when particulate impurities or a material having an etching rate greater than that of the CNT are used as the binder material.

As described above, in the fabrication method according to this embodiment, a binder material of particulate impurities and/or another binder material are made of a material having an etching rate greater than that of the CNTs 112a to pattern the CNT film 112. That is, this fabrication method uses a binder material having an etching rate greater than at least that of the CNTs 112a, thereby making it possible for the binder material and/or another binder material to vanish at the same time as the CNTs 112a or faster than the CNTs 112a in an etching gas employed in the plasma method or in the milling method. Accordingly, this significantly simplifies the process of removing the CNT film 112 and allows the CNT film 112 to be patterned without degrading the electron emission characteristics. Furthermore, upon allowing the CNTs 112a in a desired region to remain and removing the CNT film 112 outside the region, the particulate impurities (the binder material) in the remaining region and/or a binder material (another binder material) such as acrylic are also allowed to remain, thereby making it possible for the CNT film 112 to be securely adhered to the glass substrate 110 after the process.

In the CNT film 112, a metallic impurity such as nickel exists which is contained in the carbon bar upon generating CNTs. The metallic impurity is oxidized and remains as an insulating material in the aforementioned removed region 138, thus serving as an electrical insulator and raising no functional problem. An acidic solution may be used for wet etching to remove this metallic impurity. In this case, since the carbon surrounding the metallic impurity is already burned out, it is possible to readily perform the etching.

Particulate impurities can also be added afterwards. For example, impurities of carbon of 500 nm or less, fine metallic particles, fine inorganic particles, or fine organic particles may also be added to the CNTs which were refined by removing particulate impurities after the CNTs were fabricated, thereby making it possible to form a CNT film having the same function as that of the CNT film 112 containing the particulate impurities in each of the aforementioned embodiments. In this case, it is possible to mix fine particles more uniform in diameter than the particulate impurities simultaneously produced upon manufacturing the CNTs and to provide better control to the composition ratio. Incidentally, the refined CNT is not suitable from the viewpoint of electron emission due to the influence such as of adhesion, but may have fine particles added thereto and sufficiently scattered, thereby making it possible to avoid a problem of adhesion of the CNTs, or the like.

In this embodiment, the CNT film 112 contains the particulate impurities 112c to 112e in conjunction with the CNTs 112a, thereby making it possible to precisely form the CNT film 112 independent of the binder component. The precise CNT film 112 makes it possible to avoid such a phenomenon as air bubbles penetrate into the gate insulating film 113 in the course of deposition on the CNT film 112. Suppose that the CNT film 112 formed as such is used with a FED, in the case of which the FED is operated in a vacuum. At that time, any gap in the CNT film 112 requires a large amount of time to exhaust air having penetrated into the gap. However, the CNT film 112 according to the present invention is very precise to provide a very small amount of gaps, thereby allowing for being evacuated in a short period of time.

Furthermore, the CNT film 112 is filled precisely with particulate impurities, thereby making it possible to ensure a sufficient film strength independent of the organic binder. Furthermore, since the organic binder component can be reduced, there is no possibility of impairing the degree of vacuum due to gases emitted from the organic binder. Still furthermore, the CNT film 112 is impregnated with a binder component (such as acrylic), which is not burned out but allowed to remain as a film component. Accordingly, this makes it possible to avoid such a problem as the film surface having irregularities formed or gaps produced due to a decrease in volume caused by the binder component being burned out. This allows for easily forming the CNT film 112 having a flat surface.

The aforementioned first to third embodiments provide a CNT film which can ensure a mechanical film strength without depending only an organic binder, readily provides a flat shape, traps no air bubbles in the film, enables elimination of a complicated CNT refining process that may cause impurities other than nanotubes to be removed more than necessary, and mitigates deterioration in electron emission characteristics caused by an increase in diameter of bundles. It is also possible to obtain a fabrication method of a CNT film which has excellent electron emission characteristics.

Furthermore, the particulate impurities can be contained as the filling material of the CNT film to reduce the organic binder component, thereby making it possible to provide an effect of suppressing an increase in temperature of the CNT film caused upon field electron emission from the CNT film or gas emission from the CNT film due to ion bombardments. In the field electron emission image display device, residual gases in the vacuum vessel or phosphors are ionized and accelerated, with which the CNT film surface is irradiated. In this case, among other things, the fact that the CNT film surface contains a number of CNTs which are hardly dissolved due to the ion bombardment mitigates the problem of gas emission. At a percentage of organic binder content being higher in lower layers than in upper layers in a multi-layer structure, the fact that particulate impurities higher in resistance to ion than the organic binder fill the vicinity of the surface also provides an effect that the surface layer having a higher resistance to ion protects the surface of a lower layer containing a larger amount of organic binder.

FIGS. 16A to 16G each illustrate a process for using a CNT film to fabricate a field emission cold cathode employed in the flat image display device according to the first embodiment of the present invention in accordance with a fabrication method according to a fourth embodiment of the present invention.

Figure 16A:
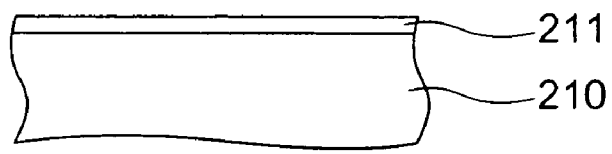
FIGS. 16A to 16G are sectional views each sequentially illustrating a process in a fabrication method for fabricating a field emission cold cathode used in a flat image display device, the fabrication method according to a fourth embodiment of the present invention.
Figure 16B:
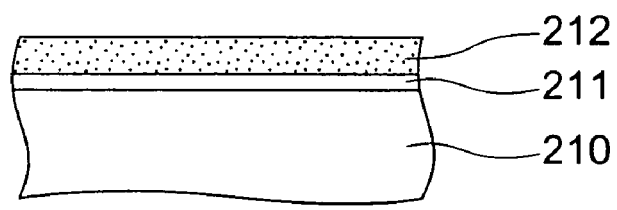

First, as shown in FIG. 16A, a conductive layer 211 is formed on a glass substrate 210 by the chemical vapor deposition (CVD) technique or the like, and then as shown in FIG. 16B, a CNT film 212 is formed on the conductive layer 211 by the transfer method or the like. The CNTs of the CNT film 212 can be fabricated by the arc discharge method or by the laser ablation method. In this embodiment, the arc discharge method is employed for the fabrication.

Figure 16C:
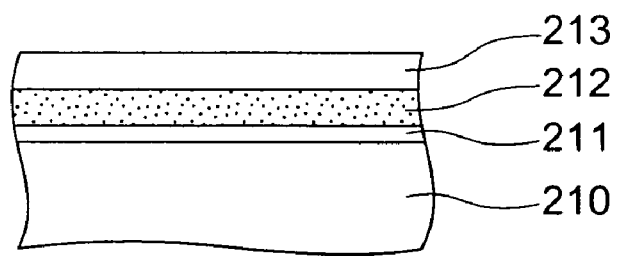
Figure 16D:
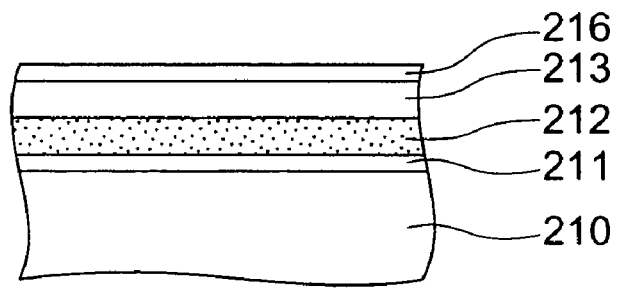
Figure 16E:
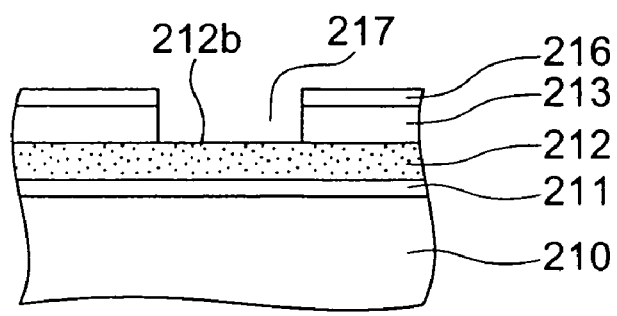

Then, as shown in FIG. 16C, an insulating film 213 is formed on the CNT film 212, and as shown in FIG. 16D, a metal film such as of aluminum is deposited to be formed into a gate electrode 216 on the insulating film 213. Furthermore, as shown in FIG. 16E, by etching or the like, there is formed a gate opening 217 which penetrates the gate electrode 216 and the insulating film 213 to allow a portion of the CNT film 212 to be exposed. The CNT film 212 exposed from the gate opening 217 constitutes an emitter 212b. Incidentally, it is possible to use a conductive substrate in place of the glass substrate 210. In this case, the conductive layer 211 becomes unnecessary.

Here, explained is the processing for manufacturing the CNTs contained in the CNT film 212 by the arc discharge method. First, a reactive container (not shown) is filled with a He gas at 66,500 Pa (500 Torr) and two carbon bars (not shown) containing catalytic metal are opposed to each other at each of their top ends, thereby generating arc discharges between the carbon bars. This allows a solid containing CNTs to be deposited on the surface of the carbon bar at the cathode side and on the inner wall of the reactive vessel, respectively. The arc discharge is performed, for example, by applying a voltage of 18V between both the carbon bars and allowing a current of 100 A to flow.

In the aforementioned solid deposited, contained are graphite particles having a diameter of about 10 to 100 nm, amorphous carbon, or catalytic metal in addition to CNTs. The CNTs obtained here are single-layer nanotubes of a diameter of 1 to 5 nm, a length of 0.5 to 100 µm, and an average length of about 2 µm. The CNTs fabricated using not the arc discharge method but the laser ablation method also have the same size in principle as those fabricated by the aforementioned arc discharge method.

Then, a coarse product containing the aforementioned CNTs is suspended in ethanol and scattered ultrasonically. Furthermore, a membrane filter having a pore size of 0.5 µm is used to filter the aforementioned suspension. At this time, the fine particulate impurities other than the CNTs are smaller than the pore size of the filter and thus pass through the filter, whereas the CNTs having a length of 0.5 µm or more remain on the filter. Only those CNTs remaining on the filter are collected and refined.

Figure 16F:
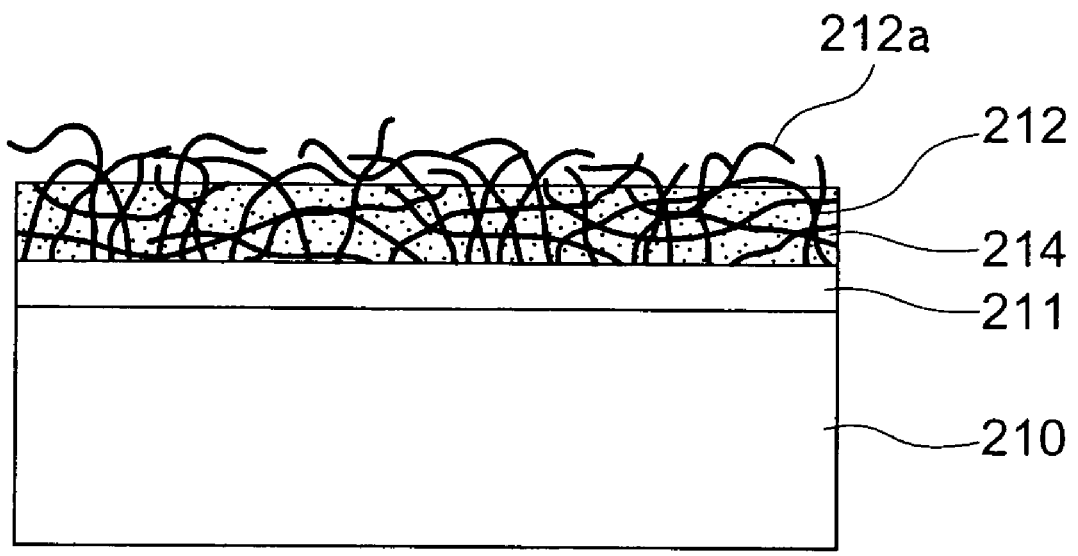

Subsequently, as shown in FIG. 16F, a binder layer 214 is formed to a thickness of 0.8 µm on the conductive layer 211 formed on the glass substrate 210, and immediately thereafter, a pre-fabricated CNT film 212 of a thickness of 5 µm is transferred onto the binder layer 214 by the transfer method. It is possible to employ resin such as resist, SOG (Spin on glass), or acrylic as the binder layer 214.

Figure 16G:
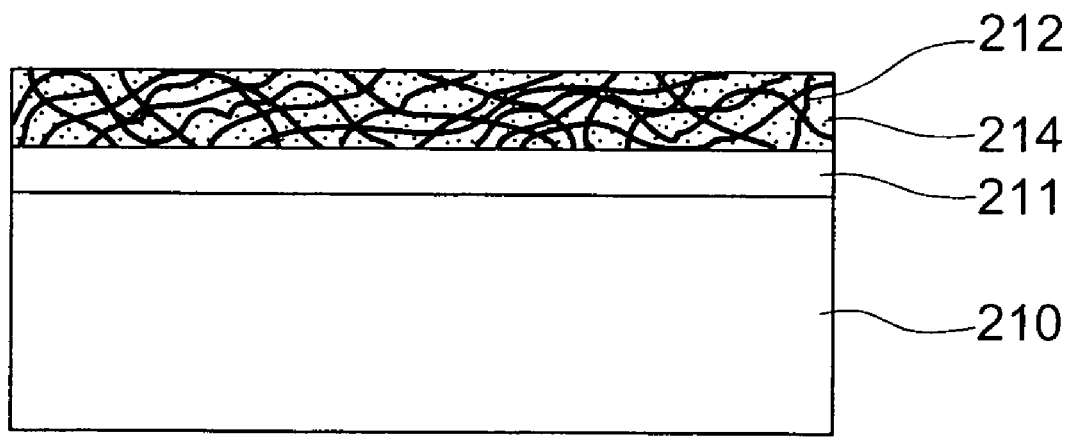

Then, the glass substrate 210 on which the CNT film 212 is formed is accommodated in a predetermined apparatus and baked to harden the binder layer 214, thereby forming it as a completed CNT film 212 as shown in FIG. 16G. Here, the CNT film 212 was formed by the transfer method, although not limited thereto, however, the CNT film 212 can also be formed by the screen printing method or the spraying method.

In this case, to form the CNT film 212, used was a suspension having the CNTs 212a ultrasonically scattered in a solution such as ethanol having a low viscosity and a high volatility or a binder. The effects of the present invention can be more easily obtained with a higher CNT concentration in the suspension. Here, two grams or more of CNTs were used for one liter of ethanol.

Immediately after having been formed, the CNT film 212 is in the state as shown in FIG. 16F in which the CNTs 212a are aligned generally upright from the surface of the CNT film 212 with respect to the glass substrate 210. The processing in the foregoing facilitates processes and is suitable for applications for larger areas. However, as shown in FIG. 16G, after having passed through a process such as cleaning in water, the upright CNTs 212a leave the glass substrate 210 to vanish or are aligned horizontally along the glass substrate 210 due to the viscosity and the surface tension of the binder layer 214.

Figure 17A:
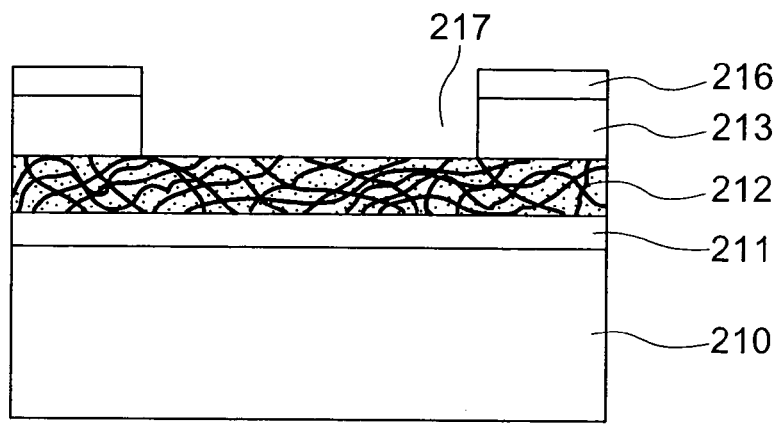
FIGS. 17A to 17C are sectional views each sequentially illustrating a process of aligning a CNT film upright.
Figure 17B:
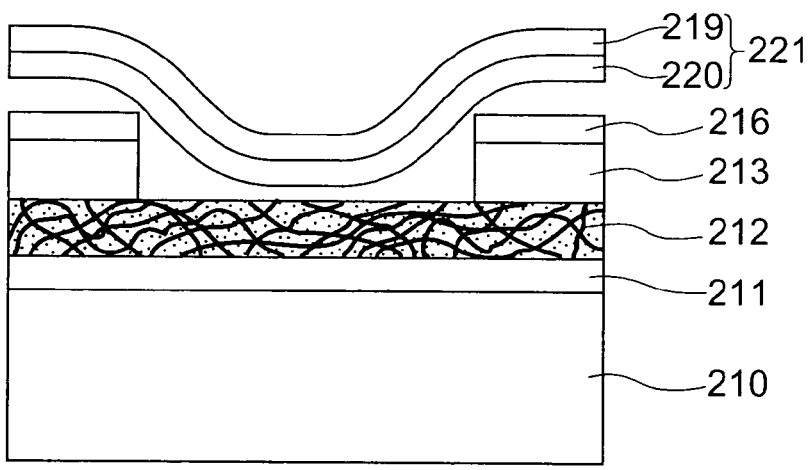
Figure 17C:
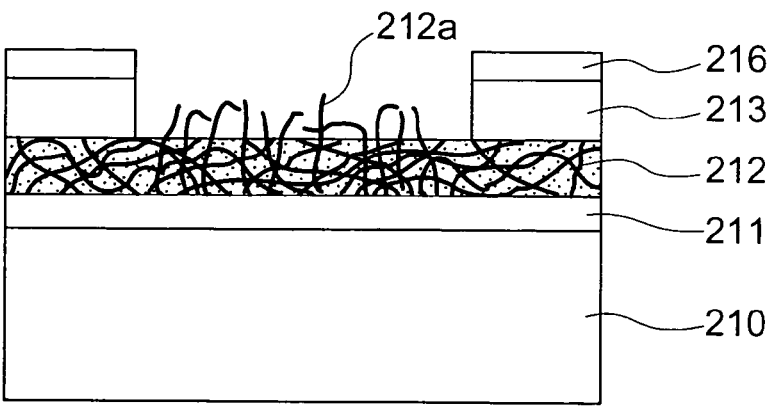

Now, the processing for aligning upright the CNTs that are aligned horizontally in the CNT film will be explained. FIGS. 17A to 17C illustrate an upright alignment method according to this embodiment, FIG. 17A illustrating an enlarged view of FIG. 16E.

As shown in FIG. 17B, an adhesive sheet 221 with an adhesive agent 220 adhered to a thin film 219 is pressed from above the gate electrode 216 to allow a portion of the adhesive agent 220 to go into the gate opening 217 and contact with the surface of the CNT film 212. As a pressing jig, it is possible to use a press or a roller having the surface formed of a soft member such as a cloth, sponge, rubber, or gel material.

Then, as shown in FIG. 17C, peeling off the pressed adhesive sheet 221 causes the CNTs 212a on the surface of the CNT film 212 to be pulled upright with the CNTs 212a adhered to the adhesive agent 220, thereby being brought into an upright alignment state. This upright alignment means that the tip of the CNTs 212a in the CNT film 212 has an angle of 50 degrees or less relative to the normal to the glass substrate 210. Even if a portion of nano-particles (particulate impurities) deposited in conjunction with the CNTs by the arc discharge method, amorphous carbon, metal catalytic powder, or the binder layer 214 necessary to adhere the CNTs is removed in addition to a portion of the CNTs 212a on the surface of the CNT film 212 upon pulling off the adhesive sheet 221, there will be no problem with the effects obtained by the present invention.

Here, Table 1 shows the type and adhesive strength of the adhesive material employed, the characteristics of the processing materials, the alignment of CNTs, and the resulting state of remaining residues upon conducting the experiments with adhesive sheets of various thicknesses. Here, employed is only a CNT film configured to have no insulating film and gate electrode formed on the CNT film.

TABLE 1

| Adhesive sheet | Adhesive force (N/mm) | Sheet thickness (mm) | Alignment | Residues | Remarks |
| --- | --- | --- | --- | --- | --- |
| A | 2.0 | 0.2 | Good | No | Film peel off observed |
| B | 0.4 | 0.2 | Good | No | |
| C | 0.003 | 0.2 | Good | No | |
| D | 0.002 | 0.2 | NG | No | |
| E | 0.5 | 0.2 | Good | No | |
| F | 0.5 | 0.2 | Good | Observed | |
| G | 0.5 | 0.2 | Good | observed | |

Table 1 includes adhesive sheet samples A to G, each sample having the same thickness of 0.2 mm. However, the sample A has an adhesive force of 2.0 N/mm, the sample B has an adhesive force of 0.4 N/mm, the sample C has an adhesive force of 0.003 N/mm, the sample D has an adhesive force of 0.002 N/mm, and the samples E to G have the same adhesive force of 0.5 N/mm. The sample E has the same adhesion structure as that of the samples A to D. However, the sample F has a structure with a weak adhesive material causing fine adhesive particles to adhere to the thin film 219, while the sample G has a structure with its own adhesive strength causing fine adhesive particles to adhere to the thin film 219.

Table 1 shows that the sample D having the lowest adhesive force of 0.002 N/mm provides insufficient alignment to the CNTs and thus lacks in adhesive strength. On the other hand, the sample A having the highest adhesive strength of 2.0 N/mm caused the CNT film 212 to be peeled off. From these results, it is found that the adhesive strength has values preferably greater than 0.002 N/mm and below 2 N/mm. With an adhesive sheet having an adhesive strength within in this range, it is possible to obtain the emitter 212b having an excellent upright alignment without causing the CNT film 212 to be peeled off. Furthermore, the samples F and G caused part of the fine adhesive particles to leave upon being pressed against the CNT film 212 and remain as a residue on the surface of the CNT film 212. This result shows that it is desirable to use an adhesive sheet, like the samples A to C, which has a structure with the adhesive agent 220 integrally affixed to the thin film 219. Additionally, it is generally found that the results of alignment do not depend on the thickness of the samples.

Now, Table 2 shows the adhesive force of the adhesive material employed, the characteristics of the processing materials, the alignment of CNTs, the state of remaining residues, and the resulting gate peeling upon conducting experiments with adhesive sheets of various thicknesses. Here, the upright alignment property of the CNT film surface having a gate structure was investigated.

TABLE 2

| Adhesive sheet | Adhesive force (N/mm) | Sheet thickness (mm) | Alignment | Residues | Gate Peel off |
| --- | --- | --- | --- | --- | --- |
| H | 2.0 | 0.2 | Good | No | observed |
| I | 0.18 | 0.2 | Good | No | No |
| J | 0.003 | 0.2 | Good | No | No |
| K | 0.002 | 0.2 | NG | No | No |
| L | 0.5 | 2 | Good | No | No |
| M | 0.5 | 1.8 | Good | No | No |
| N | 0.5 | 0.02 | Good | No | No |

Table 2 includes adhesive sheet samples H to N. The sample H has an adhesive strength of 0.2 N/mm, the sample I has an adhesive strength of 0.18 N/mm, the sample J has an adhesive strength of 0.003 N/mm, the sample K has an adhesive strength of 0.002 N/mm, respectively, and the samples L to N have mutually the same adhesive strength of 0.5 N/mm. The samples H to K have mutually the same thickness of 2 mm, however, the sample L is 2 mm, the sample M is 1.8 mm, and the sample N is 0.02 mm in thickness.

Table 2 shows that an adhesive strength of 0.2 N/mm or more, like that of the sample H, causes gate peeling, while an adhesive strength of 0.002 N/mm or less, like that of the sample K, provides insufficient alignment to the CNTs. Therefore, it is found that the adhesive strength is preferably set at greater than 0.002 N/mm and below 0.2 N/mm. With an adhesive sheet having an adhesive strength within in this range, it is possible to obtain the emitter 212b having better upright alignment with no peeling and residue in the CNT film 212.

Although not included in Table 2, the adhesive agent 220 predominantly composed of natural rubber and having resin and an anti-aging agent added thereto was used to employ the adhesive sheet 221, which was configured to have the adhesive agent 220 affixed to the thin film 219 of cellophane thin film and a thickness of 2 mm, for 100 μm of an inner diameter of the gate opening 217 and an insulating film thickness of 20 μm. In this case, the adhesive sheet 221 could not go into the gate opening 217, thereby providing no results of upright alignment. This showed that the adhesive sheet 221 is desirably below 2 mm in thickness.

Furthermore, with the insulating film 213 and the gate electrode 216 being 5 μm in the total thickness and the gate opening 217 being 5 to 20 μm in the hole diameter, the adhesive sheet 221 is preferably below 5 mm in thickness, while the adhesive sheet 221 is preferably below 100d in thickness within the range of a hole diameter from d to 4d in terms of the thickness d of the insulating film 213 and the gate electrode 216. Incidentally, since the flexibility of the adhesive sheet 221 is proportional to the Young's modulus and the thickness, it is possible to obtain excellent results by properly selecting the Young's modulus and the thickness of the material.

By the way, when the emitter 212b is aligned upright in the atmosphere using the adhesive sheet 221, gases are encapsulated within the gate opening 217, thereby raising a problem that even when the adhesive sheet 221 is pressed, the adhesive agent 220 cannot be brought into sufficient contact with the surface of the CNTs due to the repulsion of the gases encapsulated. However, for example, with the adhesive agent 220 prepared by foaming, the adhesive agent 220 having a breathable property resulting from irregularities formed on the surface thereof allows the gases within the gate opening 217 to be exhausted from the recessed portions out of the gate opening 217 when the thin film 219 is pressed. In this case, the projected portions (adhesive projected portions) smaller than the gate opening 217 allow the projected portions of the adhesive agent 220 to easily go into the corresponding gate opening 217 and reach the surface of the CNT film 212 in a very effective manner.

On the other hand, suppose that the glass substrate 210 with the adhesive sheet 221 placed on the gate electrode 216 is accommodated in a decompression apparatus and then the adhesive sheet 221 is pressed under the environment of a reduced pressure of 66,500 Pa (500 Torr) or less, for example. At this time, since the amount of gases is reduced within the fine gate opening 217, the adhesive agent 220 can be brought into contact with the surface of the CNTs even when the adhesive sheet 221 is pressed against the repulsion of the encapsulated gases. In particular, at a reduced pressure of 13,300 Pa (100 Torr) or less, the encapsulated gases are reduced to 1/7.6 or less in volume, thereby exerting almost no influence. This enables the adhesive material to contact with even the vicinity of the surrounding edge within the gate opening 217 of the emitter 212b, thereby making it possible to obtain proper upright alignment that provides excellent emission characteristics.

This embodiment employs the thin film 219 as the member for supporting the adhesive agent 220, however, alternatively, a jig such as of metal can also be used. In this case, the jig does not need to be flat in shape. For example, the adhesive material can be pressed only against or pulled away only from the portion at which the CNT film 212 should be aligned upright, thereby allowing the CNTs 212a in the gate opening 217 to selectively stand upright. In this case, it is not necessary to adhere the adhesive material to the entire surface of the jig but sufficient to adhere it to part thereof. For example, for the shape of the adhesive agent 220 having irregularities, it is sufficient to adhere the adhesive material only to the projected portions.

As described above, the areal selectivity of the adhesive material can be provided on the thin film 219, thereby making it possible to align upright or pattern the CNTs 212a at given locations. On the other hand, the pressing and removing processes with the adhesive sheet 221 are not limited to a single step but may be repeatedly performed as many times as required. Furthermore, as described in Tech. Digest of SID2000, pp. 320 to 324, the CNT film grid fabricated by the aforementioned method can be placed to form a triode structure. Incidentally, before the gate opening 217 is formed or upon aligning the CNTs 212a upright without forming the gate opening 217, the adhesive sheet 221 can be adhered simply onto the CNT film 212 and then the adhesive sheet 221 can be peeled off, thereby aligning the CNTs 212a upright. This allows a simple process employing the adhesive sheet 221 to provide the upright alignment of the CNTs 212a.

Now, referring to FIGS. 18A to 18D, a fabrication method according to a fifth embodiment of the present invention will be explained.

Figure 18A:
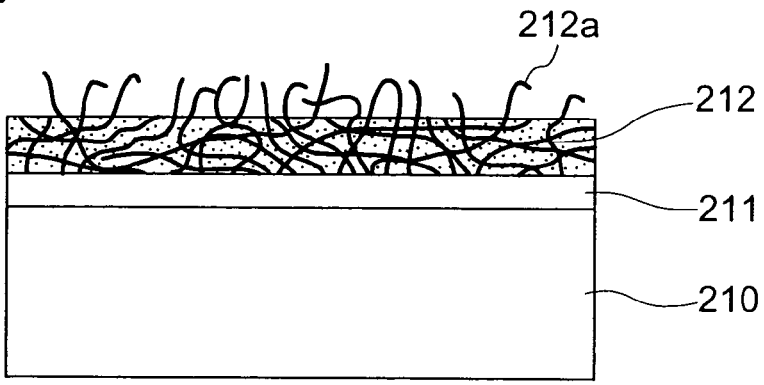
FIGS. 18A to 18D are sectional views each sequentially illustrating a process procedure of a fabrication method according to a fifth embodiment of the present invention.
Figure 18B:
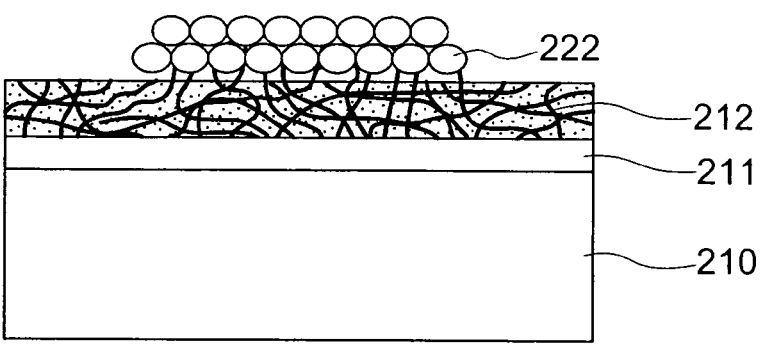

As shown in FIG. 18A, the CNT film 212 containing a plurality of CNTs 212a is formed on the glass substrate 210, and fine particles 222 of metal such as silver are coated on the CNT film 212 as shown in FIG. 18B. Since this allows each of the CNTs 212a to be buried in a plurality of fine metal particles 222 with the CNT 212a aligned upright, the CNT film 212 has no projected CNTs 212a on the surface and is thus flattened.

Figure 18C:
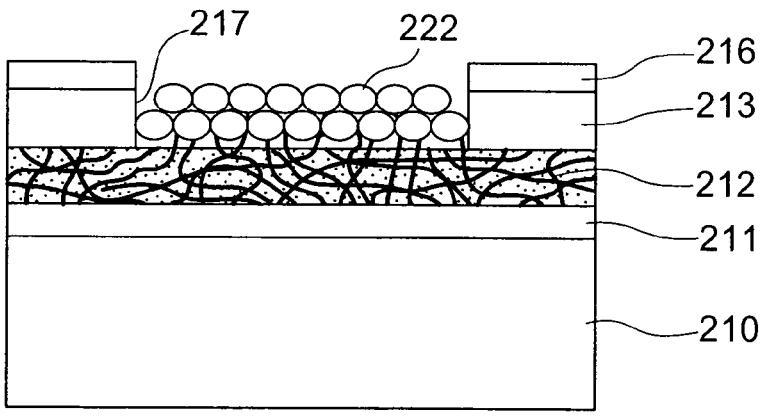
Figure 18D:
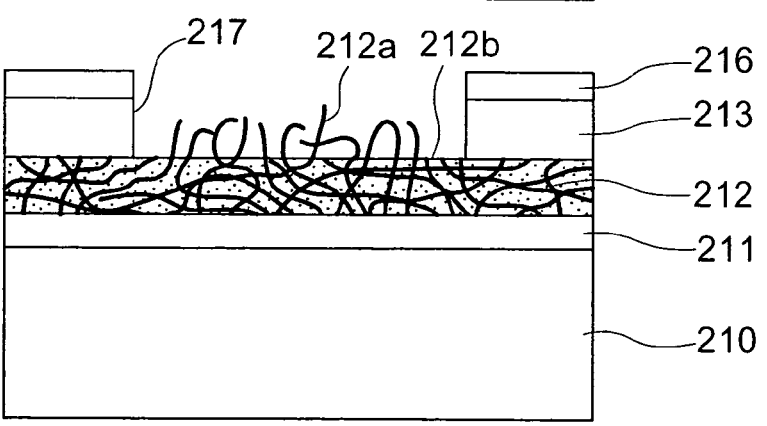

Then, using a spin coater, acrylic resin, epoxy resin, polyimide resin, or SOG is formed into the insulating film 213 in a thickness of 20 μm on the cover film 222 which is formed by coating fine metal particles. Furthermore, a metal film 216 is formed on the insulating film 213. Additionally, the metal film 216 and the insulating film 213 are both provided with a plurality of gate openings 217, thereby allowing the metal film 216 to be formed into the gate electrode 216 and as well part of the cover film 222 to be exposed from the gate opening 217 (FIG. 18C).

Subsequently, the adhering portion of the adhesive sheet 221 (FIG. 17B) is allowed to go into the gate opening 217 and contact with the surface of the cover film 222, and thereafter peeled off, thereby removing at least part of the exposed portion of the cover film 222 to expose the CNT film 212. This allows the CNTs 212a on the surface of the CNT film 212 to appear in the state of upright alignment.

In this embodiment, even with the gate opening 217 of the gate electrode 216 having a small hole diameter, the adhesive sheet 221 placed on the gate electrode 216 is pressed to allow the adhering portion thereof into the gate opening 217 and then the adhesive sheet 221 having the adhering portion in contact with the surface of the cover film 222 is only pulled off, thereby making it possible to remove part of the exposed portion of the cover film 222 to expose the upright aligned CNTs 212a. This provides excellent emission characteristics by which stable uniform emission current is generated.

In this embodiment, although not limited to metal, the cover film was formed using the fine metal particles 222, but silicon dioxide or an organic substance such as resin can also be used, for example. In this case, an inorganic substance is preferable in consideration of gas emission. On the other hand, the pressing and removing processes with the adhesive sheet are not limited to a single step but may be repeated as required.

Now, referring to FIGS. 19A to 19H, a fabrication method according to a sixth embodiment of the present invention will be explained.

Figure 19A:
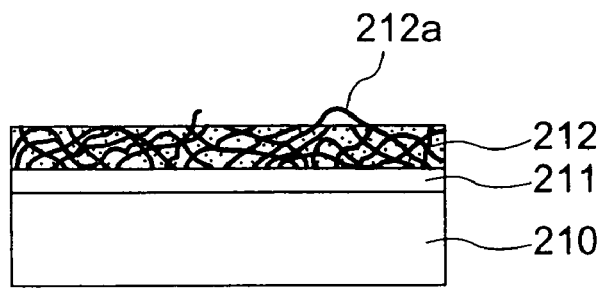
FIGS. 19A to 19H are sectional views each sequentially illustrating a process procedure of a fabrication method according to a sixth embodiment of the present invention.

First, as shown in FIG. 19A, like the fourth embodiment, the conductive layer 211 and the CNT film 212 are formed on the glass substrate 210 in that order. The CNT film 212 may be formed by any one of the transfer, coating, spraying, or screen printing method; however, the spraying method was employed here which enables uniform deposition across a large area. The spraying was performed after CNTs had been ultrasonically scattered into an acrylic resin solution. In this embodiment, CNTs of a single layer was employed which had been produced by the arc discharge method.

Figure 19B:
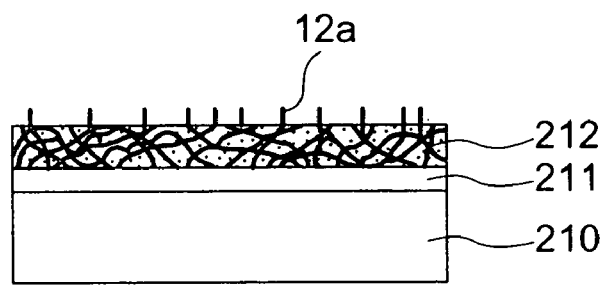

Then, as shown in FIG. 19B, the CNT film 212 is baked after having been sprayed, and an adhesive sheet is further affixed onto the surface of the CNT film 212 at a uniform pressure across the entire surface and then stripped away, thereby allowing the CNTs 212a on the surface of the CNT film 212 to be aligned upright. The adhesive sheet employed here follows the specifications having been described with reference to Tables 1 and 2. However, since upright alignment is provided before a triode structure is formed, there is no limitation here to the adhesive strength of the adhesive sheet due to the peeling or the like of the gate electrode and an insulating film. Accordingly, it is possible to use an adhesive sheet having a sufficient adhesive strength within the extent to which the CNT film itself is not peeled off.

Figure 19C:
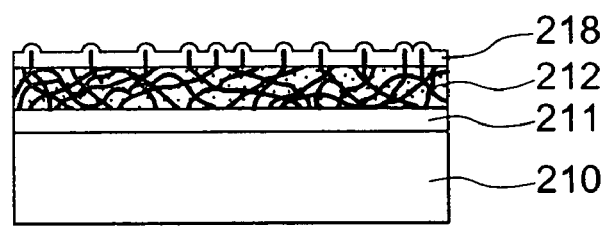

Subsequently, as shown in FIG. 19C, by sputtering or by a vapor deposition method such as CVD, an aluminum layer 218 is deposited in a thickness of 0.6 μm on the surface of the CNT film 212. The aluminum layer 218 serves to maintain the upright alignment of the CNTs 212a on the surface of the CNT film 212 and serves as a protective film for the surface of the CNT film 212. On the other hand, the vapor deposition method was employed because of its excellent coating properties and capability of keeping the upright aligned CNTs 212a unchanged. For example, when a like deposit film is formed by coating or the like on the surface of the CNT film 212, the surface CNTs are again horizontally aligned due to the influence of the surface tension of the coating fluid, thereby insufficiently providing the effects of this embodiment, discussed later.

Aluminum was used here as the protective film, however, as a deposit material, it is possible to use materials which have a high adhesive strength to the CNTs and the insulating film deposited in a layer overlying the CNTs and which can be deposited within the range of temperatures at which the glass substrate 210 can resist heat, for example, single metals such as titanium, gold, or tungsten; metal compounds such as titanium nitride or aluminum oxide; or an insulating material. Incidentally, the aluminum layer 218 increased in thickness provides an improved flattening effect to the surface CNTs 212a. Thus, for an increased thickness, it is possible to suppress the occurrence of air bubbles or the like at the time of forming the insulating film to be discussed later. However, since the vapor deposition method provides a low growth speed, the deposition was performed here to a thickness of 0.6 μm.

Figure 19D:
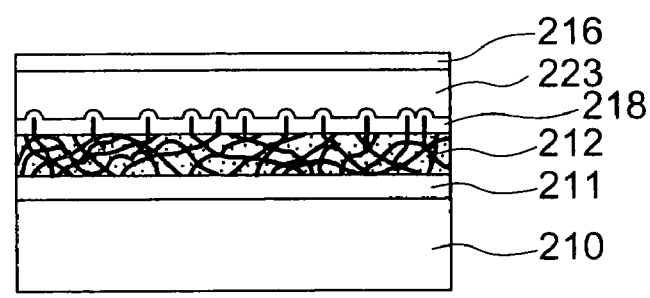

Then, as shown in FIG. 19D, polyimide is applied to a thickness of 10 μm onto the aluminum layer 218 coated with the CNT film 212 to thereby form an insulating film 223, and a gate electrode 225 is further formed in a thickness of 0.2 μm on the insulating film 223. Even during these processes, the CNTs 212a are maintained to be aligned upright by the aluminum layer 218 and thus never aligned horizontally.

Figure 19E:
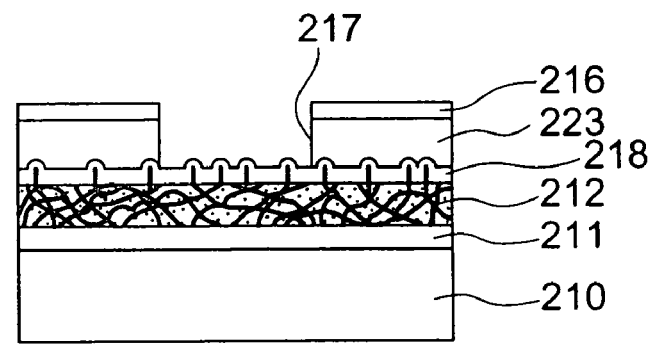

Subsequently, as shown in FIG. 19E, using a photolithographic technique, the gate electrode 225 and the insulating film 223 are sequentially removed by dry or wet etching to form the gate opening 217 of 100 μm. The CNTs 212a are protected with the aluminum layer 218 even during this time, and thus there will be raised no problem such as of deterioration caused by the etching processing. Here, the gate electrode 225 was formed prior to the gate opening 217; however, conversely, it is also possible to form the gate opening 217 in the insulating film 223 before the gate electrode 225 is formed.

Figure 19F:
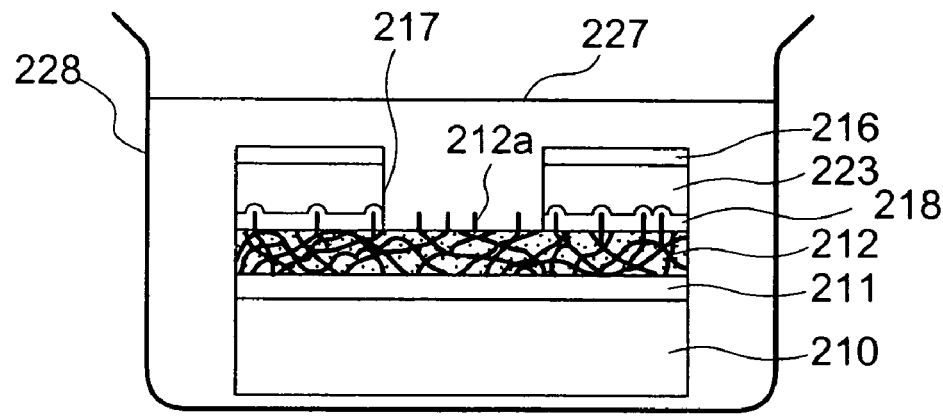
Figure 19G:
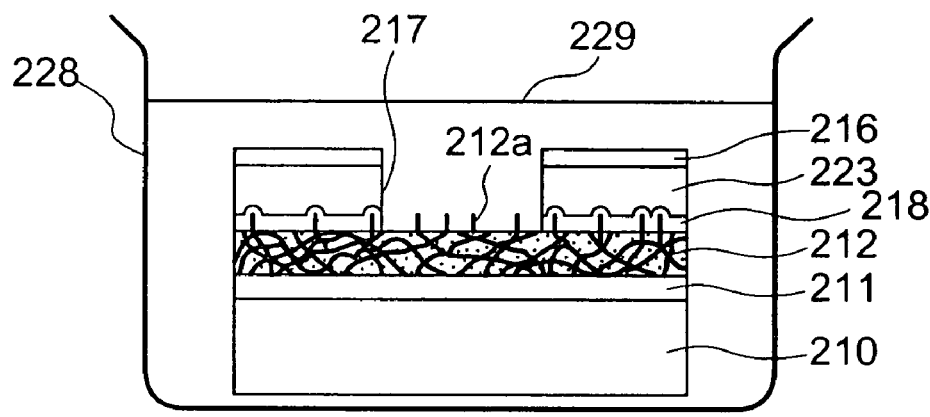

Then, as shown in FIG. 19F, the glass substrate 210 having the gate opening 217 and the like is soaked in an etching solution 227, such as a phosphoric acid or a hydrochloric acid, filled in a container 228, until a predetermined period of time elapses, thereby removing by etching the aluminum layer 218 exposed from the gate opening 217. Furthermore, as shown in FIG. 19G, the content of the container 228 is replaced with pure water 229 while at least the surface of the etching solution 227 is monitored so as not to be lower than the surface of the CNT film 212, and thereafter the entire container 228 is rapidly frozen.

Figure 19H:
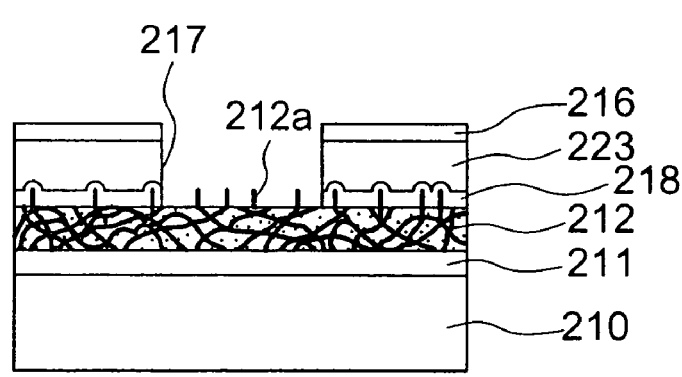

After the pure water 229 is frozen, the entire container 228 is transported into a vacuum chamber (not shown) and evacuated at a temperature of 10° C. under an atmospheric pressure of $1 \times 10^{-1}$ Pa or less (in a vacuum) for four hours or more. This allows the pure water 229 frozen in a solution 28 to sublime without passing through the liquid phase, thereby making it possible to dry and remove the pure water 229 without exerting the effect of surface tension thereon while the upright alignment state of the CNTs 212a is being maintained (FIG. 19H).

Figure 20:
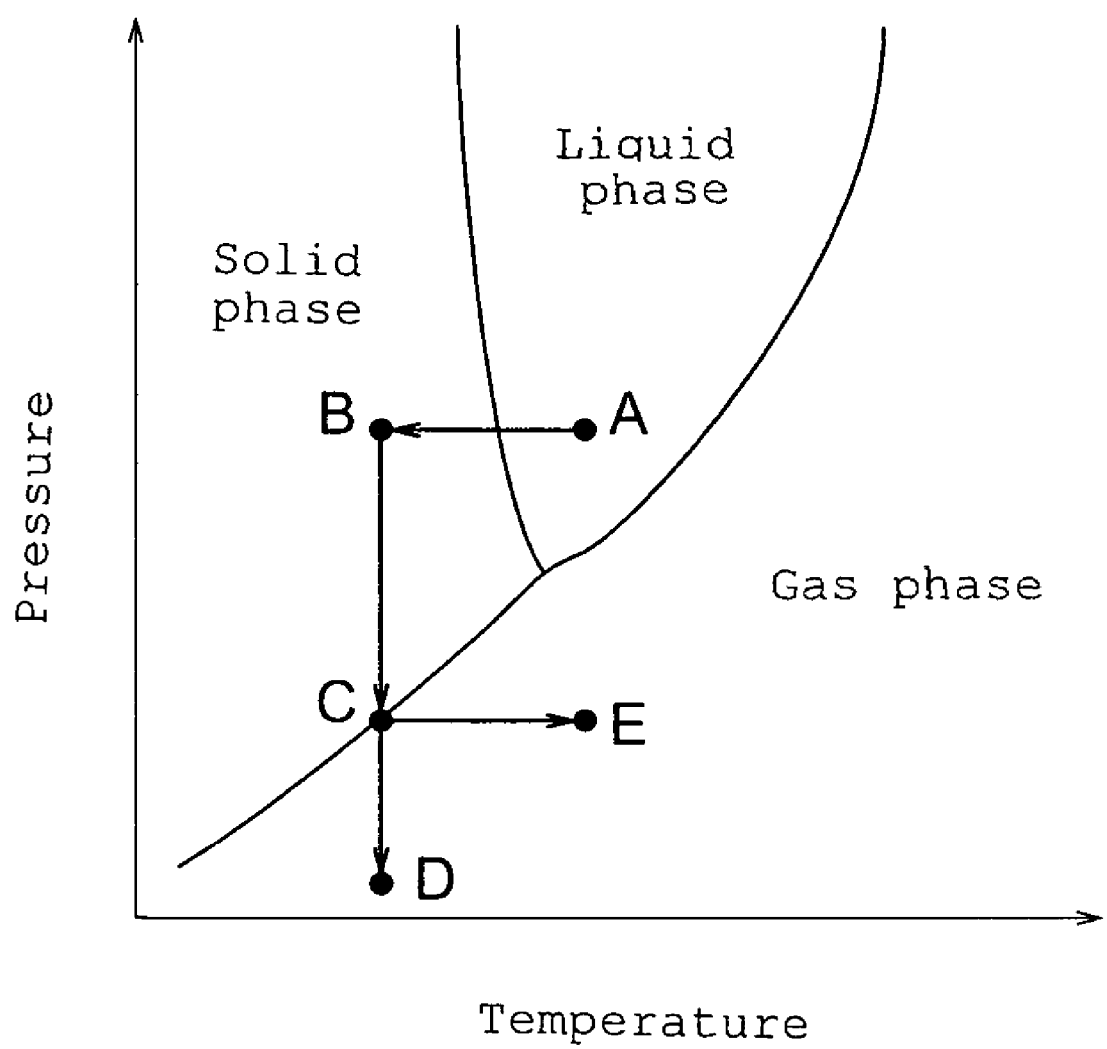
FIG. 20 is a graph showing the correlation between the pressure and the temperature of pure water in its solid phase, liquid phase, and gas phase.

FIG. 20 shows the correlation between the pressure and the temperature of pure water in its solid phase, liquid phase, and gas phase. The arrows in the figure show each of the cleaning and drying steps according to this embodiment. Point A shows the state of the replacement with the pure water 229 after the aluminum layer 218 on the CNT surface is etched, in the case of which the upper portion of the CNT film 212 is covered with pure water (liquid phase). Then, the pure water 229 is frozen, thereby causing the upright aligned CNTs 212a to be frozen as they are into a solid phase (point B).

Furthermore, the entire container 228 is decompressed in the vacuum chamber, thereby creating a boundary state between the solid phase and the gas phase (point C). Subsequent reductions in pressure cause the pure water 229 to change its phase directly from the solid phase to the gas phase to sublime without passing through the liquid phase (point D). This allows the CNTs 212a on the surface of the CNT film 212 to be dried without being affected by the surface tension of the pure water 229 while the upright alignment is being maintained. On the other hand, the temperature can be raised from point C at a constant pressure, thereby allowing for a rapid phase change from the solid phase to the gas phase (point E).

More specifically, while the degree of vacuum in the chamber is being maintained at $1 \times 10^{-1}$ Pa, the temperature of the glass substrate 210 is maintained at 60° C. Although depending on the size of the device including the glass substrate 210 or the like and as well the quantity of the pure water at the time of freezing, the period of time for drying at this time is desirably about two hours, for example, in a case where the area of the device is 7×7 cm$^2$ and the quantity of the pure water 229 is 20 ml.

Additionally, it is desirable to implement any of the two drying paths from point C shown in FIG. 20 (point D and point E) with an apparatus having a feedback function for maintaining a constant temperature or pressure. For example, using no feedback function may cause a decrease in temperature of the substrate due to the heat of evaporation upon the phase change from point C to point D, thereby raising a drawback such as a reduction in evaporation speed. Furthermore, an influence such as a sporadic deterioration in the degree of vacuum resulting from the phase change from point C to point E may cause evaporation via the liquid phase. Using no feedback function at this time may raise problems of locally impairing the upright alignment property of the CNTs 212a or making it impossible to obtain reproducibility.

The pure water 229 was used to replace the etching solution 227 in this embodiment, however, it is also possible to use an aqueous solution or the like containing impurities as long as it has a property of enabling a phase transfer from the solid phase to the gas phase without passing through the liquid phase.

On the other hand, when the replacement is performed not using the aforementioned freezing and drying methods but with a liquid, such as ethanol and fluorinert, having a much lower surface tension than that of the etching solution 227, it is possible to dry the CNTs 212a as aligned upright in the subsequent drying processing while suppressing the phenomenon of the CNTs 212a being aligned horizontally.

Now, a fabrication method according to a modified example of the sixth embodiment of the present invention will be explained. The fabrication method according to this modified example is the same as that of the sixth embodiment up to the step of FIG. 19F but different in the cleaning and drying methods after FIG. 19G. That is, in this modified example, the etching solution 227 is replaced with liquid $CO_2$ instead of the pure water 229.

Subsequently, the container 228 filled with the liquid $CO_2$ is transported into the processing apparatus, the pressure and temperature of which are controlled at $7.4 \times 10^6$ Pa (75.2 $kg/cm^{-2}$) or more and at 31.1° C. or more, respectively. The aforementioned conditions are the values that allow the liquid $CO_2$ to transfer to a super critical state. The super critical state refers to a state in which liquid and gas are in a single phase. The surface tension existing on the surface of a liquid becomes almost zero in the super critical state.

Therefore, the liquid $CO_2$ in the super critical state is removed from inside the container 228 in the final stage, thereby making it possible to dry the device without impairing the upright alignment property of the CNTs 212a. Here, the liquid $CO_2$ was used as the super critical fluid, however, instead thereof, it is also possible to use liquid-state nitrogen ($N_2$), nitrogen monoxide ($N_2O$), xenon, sulfur hexafluoride ($SF_6$) or the like. Furthermore, this modified example can also provide the same effect as that of the sixth embodiment by performing the drying process in an apparatus having the feedback function for providing control to the pressure and temperature.

By the way, when the hole diameter of the gate opening 217 is further reduced or the distance (depth) between the gate electrode 225 and the CNT film 212 is increased because of the advancement of micro-miniaturization of the device, the adhesive sheet will not reach the surface of the CNT film, making it difficult for the CNTs 212a to be aligned upright. In practice, the CNT upright alignment after the formation of the gate structure tends to align upright mainly the CNTs 212a at the center side of the CNT film 212 in the gate opening 217, resulting in a reduction in uniformity of the upright alignment on the CNT film surface. Such a tendency increases as the hole diameter of the gate opening 217 is reduced. The hole diameter was actually varied with the depth of the gate opening 217 kept constant (15 μm). In this case, for a hole diameter of 60 μm or more, the upright alignment of the CNTs 212a and an increase in emission current were observed. However, for a hole diameter of 60 μm or less, the upright alignment of the CNTs 212a and an increase in emission current were hardly observed.

In contrast to this, in the sixth embodiment and its modified example, such a technique is adopted as to allow the CNTs 212a to be pre-aligned upright and the alignment property to be maintained until the final process. This eliminates the need for aligning upright the CNTs 212a using an adhesive sheet in the final process. Accordingly, it is possible to solve the aforementioned drawbacks such as a reduction in uniformity of the upright alignment on the surface of the CNT film without being limited by the hole diameter or the depth of the gate opening 217.

Now, referring to FIGS. 21A to 21C, a fabrication method according to a seventh embodiment of the present invention will be explained. This embodiment indicates the processes which are performed prior to the process of aligning upright the CNTs 212a in the final stage, and provides a fabrication method suitable for forming the insulating film 223 on the CNT film 212 subsequently after the CNT film 212 is formed.

Figure 21A:
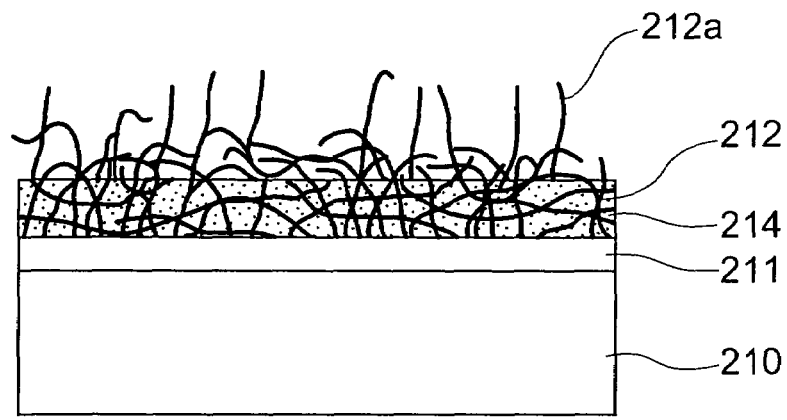
FIGS. 21A to 21C are sectional views each sequentially illustrating a process procedure of a fabrication method according to a seventh embodiment of the present invention.
Figure 21B:
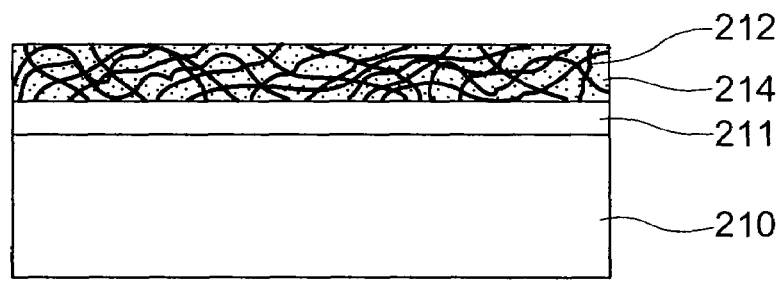
Figure 21C:
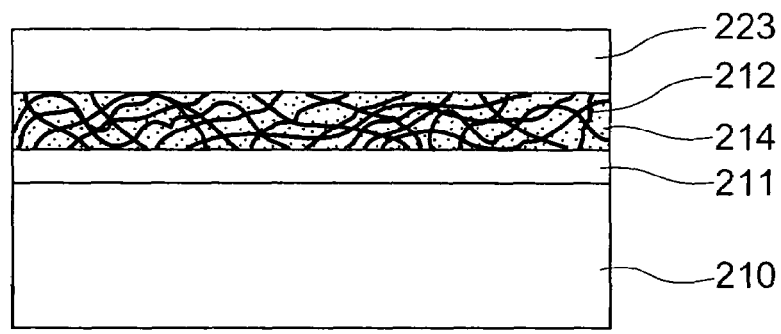

That is, as shown in FIG. 21A, the CNT film 212 is adhered onto the glass substrate 210 via the binder layer 214 in the same state as that of FIG. 16F. At this time, many CNTs 212a are observed which are aligned upright on the surface of the CNT film 212. Then, as shown in FIG. 21B, a liquid such as ethanol is sprayed on the CNT film 212 to horizontally align the upright aligned CNTs 212a using the surface tension of the liquid, thereafter allowing the CNT film 212 to be air dried. Subsequently, as shown in FIG. 21, acrylic resin, epoxy resin, polyimide resin, SOG (Spin on Glass) or the like is spin coated onto the CNT film 212 to form into the insulating film 223 in a thickness of 20 μm, and then subjected to baking processing.

The aforementioned processes according to this embodiment solve the following problems raised upon forming the insulating film 223 on the CNT film 212. That is, the CNTs 212a aligned upright on the surface of the CNT film 212 may cause a binder solvent not to be accepted in the CNT film 212 and fine air bubbles to be dissolved therein upon forming the binder layer 214, thereby raising such a problem of causing air bubbles in the insulating film 223 or irregularities on the surface thereof after the removal of the solvent or the baking processing. For example, those samples provided not according to this embodiment caused air bubbles to appear in the insulating film 223 and provided bad wettability between the CNT film 212 and the insulating film 223 during the spin coating, resulting in variations in thickness of 50% or more.

In contrast to this, according to this embodiment, since the CNTs 212a are horizontally aligned before the binder solvent is applied and the insulating film is formed, it is possible to positively suppress the occurrence of the aforementioned drawback and properly form the binder layer 214 and the insulating film 223. For this reason, the samples according to this embodiment had excellent wettability, thereby providing excellent results that no air bubbles were found in the binder layer 214 and the insulating film 223, and variations in thickness were 5% or less.

To form a uniform high-resolution flat image display device using a field emission cold cathode, it is necessary to place at least one or more electron sources at each pixel. In the case of a CNT film being used as an emitter, this corresponds to at least one or more upright aligned CNTs being formed at each pixel.

Assume that a pixel has an area of S ($cm^2$). To place one or more upright aligned CNTs therein, it is necessary to form a CNT film that has a count density (pieces/$cm^2$) of at least 1/S or more upright aligned CNTs. For example, assuming a given 30-inch high definition TV, one pixel has a rectangular shape of 0.01 cm×0.03 cm, in the case of which a CNT film must be formed which has about 3333 pieces/$cm^2$ or more of upright aligned CNTs.

Figure 22:
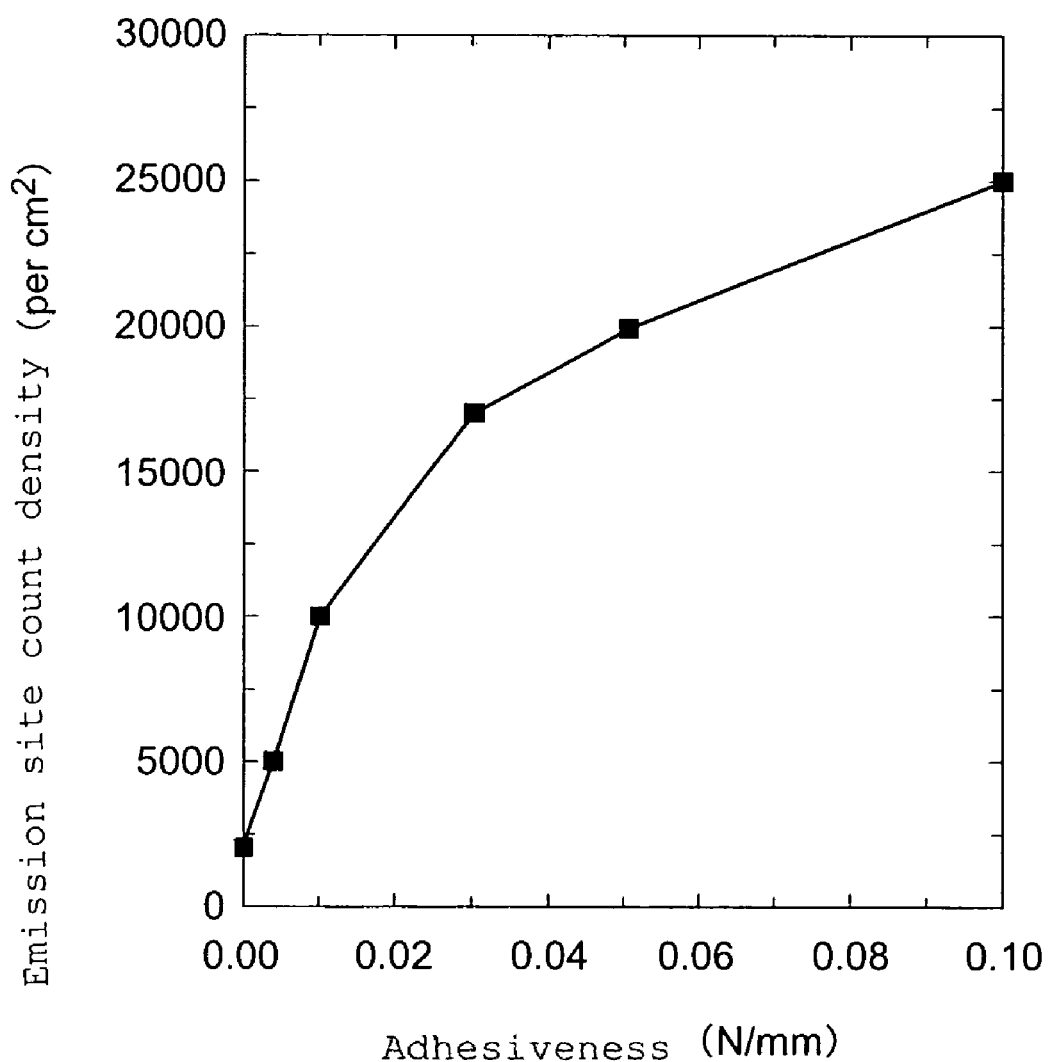
FIG. 22 is a graph showing the adhesive strength dependency of an adhesive sheet on the emission site count density.

FIG. 22 is a graph showing the adhesive strength dependency of an adhesive sheet on the emission site count density. The horizontal axis represents the emission site count density and the vertical axis represents the adhesive strength of the adhesive sheet, respectively. The measurements were made with a diode structure of a CNT film and an anode electrode. The voltage applied is 3V/μm.

Without using the adhesive sheet (with zero adhesive strength), the site count density is about 2000 pieces/$cm^2$. With increasing adhesive strength, the number of sites tends to increase such that uniform emission can be obtained across the generally entire surface at an adhesive strength of 0.1 N/mm (25000 N/mm). Incidentally, it was confirmed by a scanning electron microscope that the emission site count density observed under this condition was generally equivalent to the count density of upright aligned CNTs.

A flat image device which includes rectangular pixels each being 0.01 cm×0.03 cm and is fabricated using a CNT film having not been processed with an adhesive sheet does not satisfy the aforementioned condition (about 3333 pieces/cm$^2$), thus causing many non-light-emitting pixels to be found and providing nonuniform images. Furthermore, in the light-emitting pixels, substantially one CNT serves as an electron source, thus causing a wide range of current variation.

On the other hand, for a flat image device which has pixels of the same size and is fabricated using a CNT film having CNTs aligned upright at an adhesive strength of 0.004 N/mm, generally uniform light emission was observed at all the pixels. This is because the density of CNTs aligned at an adhesive strength of 0.004 N/mm (5000 pieces/cm$^2$) satisfies the condition of 3333 pieces/cm$^2$ or more. However, in this case, the light emission intensity varies a great deal from pixel to pixel, thereby producing a great deal of flicker in images.

Furthermore, a flat image device which has pixels of the same size was fabricated using a CNT film having CNTs aligned upright at an adhesive strength of 0.03 N/mm or more. As a result, uniform light emission of high intensity was obtained from all the pixels. Furthermore, a slight variation in intensity of emitted light and almost no flicker were recognized. The density of CNTs aligned at an adhesive strength of 0.03 N/mm or more is 17000 pieces/cm$^2$, which corresponds to about five times or more the required condition (3333 pieces/cm$^2$).

That is, this means that there exist about five or more upright aligned CNTs per one pixel. The change into a lower current was obtained here because a variation in electron current emitted from one CNT was statistically averaged by a plurality of CNTs. Such a reduction in current variation can be achieved through processing with a sheet having as high an adhesive strength as possible, however, a sheet of 0.03 N/mm can be used to obtain an image with almost no flicker that is visible to the naked eye.

Thus, to form a uniform high-definition flat image display device, it is necessary to form a CNT film that has a count density (pieces/cm$^2$) of at least 1/S or more upright aligned CNTs, and it is desirable to use a CNT film that has a count density (pieces/cm$^2$) of 5/S or more upright aligned CNTs.

Incidentally, the aforementioned condition for the count density of upright aligned CNTs holds in the presence of a CNT film across an entire pixel. However, in the case of an emitter in the triode structure, the ratio of CNT film to a pixel is reduced due to other structure or the gate electrode. Defining the ratio of the area of an exposed CNT film to the area of a pixel as the share r (%) of the CNT film, the condition mentioned previously is expressed as follows.

To form a uniform high-definition flat image display device, it is necessary to form a CNT film that has a count density (pieces/cm$^2$) of at least 100/(S×r) or more upright aligned CNTs, and it is desirable to use a CNT film that has a count density (pieces/cm$^2$) of 500/(S×r) or more upright aligned CNTs.

The fabrication methods according to the aforementioned fourth to seventh embodiments can provide an emitter that produces stable uniform emission current while employing a CNT film and accomplishes excellent emission characteristics, a field emission cold cathode incorporating the emitter, and a flat image display device incorporating the field emission cold cathode.

It is possible to combine any one of the structures according to the first to third embodiments with any one of the structures according to the fourth to seventh embodiments. In this case, since the CNT film containing particulate impurities has some non-bundled CNTs distributed therein, an upright alignment with an adhesive sheet or the like causes the CNTs to be aligned upright independently. These independently upright aligned CNTs may readily provide field concentration when a voltage is applied thereto, making it easier to obtain emission. The "bundling" occurs more readily in the multi-wall (multi-ring) CNT than in the single-wall (single-ring) CNT. Therefore, with the aforementioned particulate impurities contained, the single-wall CNT provides a noticeable effect of preventing the bundling.

On the other hand, the bundling occurs relatively hardly in the multi-wall CNT film. Even in this case, with the particulate impurities contained, the CNTs are scattered to stand upright. Such a film of the CNTs provides field concentration at the tip of the CNTs more easily than the film of CNTs standing densely upright, thus providing emission at lower voltages.

Furthermore, the CNT film containing particulate impurities is provided with enhanced adhesive strength. Thus, when provided with upright alignment by means of an adhesive sheet or the like, the CNT is apt to stand upright being pulled at the tip while being secured at the root thereof to the film, thereby reducing the possibility of damage to the CNT film due to the stripping of the very CNT film or partial elimination of the CNT film. Furthermore, a CNT film containing particulate impurities makes it possible to use a sheet of high adhesive strength, thereby providing an extended permissible range of adhesive strength and allowing more efficient upright alignment.

Furthermore, the CNT film containing particulate impurities is provided with enhanced adherence. Thus, when provided with upright alignment by means of an adhesive sheet, the CNT may be pulled and split at the tip. The tip of the CNT having been split in this manner is often thinner than that before being split. Accordingly, field concentration is provided more easily, and electron emission is produced at lower voltages or emission current is increased at a constant voltage.

Figure 23:
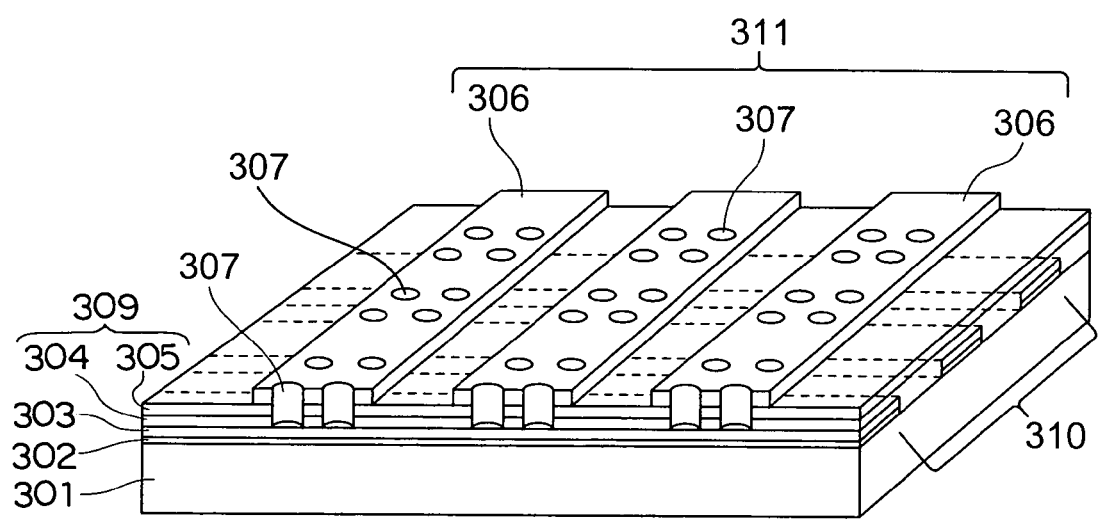
FIG. 23 is a perspective view illustrating CNTs fabricated according to an eighth embodiment of the present invention.

Referring to FIG. 23, shown is a field emission cold cathode that is fabricated by a fabrication method according to an eighth embodiment of the present invention. The CNTs forming the emitter can be fabricated such as by the arc discharge method or the laser ablation method, however, these CNTs are made by the arc discharge.

On a glass substrate 301, the field emission cold cathode has a plurality of stripe-shaped conductive layers 302 which extend in the right to left direction in FIG. 23 in parallel to each other and which have a thickness of 0.5μm. There is deposited a CNT layer 303 having the same width on each of the conductive layers 302 to form cathode (emitter) lines 310. Additionally, SOG (Spin On Glass), or polyimide or acrylic resin is dispensed and applied (spin coated) to a thickness of 1.5 μm and 5 μm, respectively, so as to cover the entire surface of the glass substrate 301 containing the CNT layer 303, thereby being formed into a first insulating layer 304 and a second insulating layer 305. The first insulating layer 304 and the second insulating layer 305, which are sequentially deposited and have different compositions, constitute a gate insulating layer (a stacked (multi-layered) insulating layer 309).

On the second insulating layer 305, stripe-shaped gate electrode layers 306 having a thickness of 0.5 μm extend orthogonal to the cathode lines 310 and in parallel to each other to form gate lines 311. At the intersections of the cathode lines 310 and the gate lines 311, formed are gate openings 307 which have a predetermined diameter (e.g., 50 µm) and constitute electron emitting portions, allowing the CNT layer 303 exposed to the gate openings 307 to constitute emitters.

Above the aforementioned glass substrate 301 on which the electron emitting portions are formed, an anode panel onto which RGB (red, green, and blue) phosphors are applied is disposed opposite to the glass substrate 301 separated therefrom by a predetermined distance. This allows a flat image display device to be constituted which provides display operations by selectively applying voltages to the cathode lines 310 and the gate lines 311. On the other hand, the space between the glass substrate 301 and the anode panel is maintained under vacuum.

In the flat image display device having the field emission cold cathode configured as described above, since the gate electrode layer 306 is flattened due to the presence of the stacked structure of the first insulating layer 304 and the second insulating layer 305, it is possible to maintain stable electron emission for a long period of time without causing electron emission which is provided by other than a given pixel or uncontrollable with the gate electrode layer 306.

Here, explained is the processing for manufacturing the CNTs contained in the CNT layer 303 by the arc discharge method. First, a reactive container (not shown) is filled with a helium (He) gas at 66500 Pa (500 Torr) and two carbon bars (not shown) containing catalytic metal are opposed to each other at each of their top ends, thereby generating arc discharges between both the carbon bars. This allows a solid containing CNTs to be deposited on the surface of the carbon bar at the cathode side and on the inner wall of the reactive vessel, respectively. The arc discharge is performed, for example, by applying a voltage of 18V between both the carbon bars and allowing a current of 100 A to flow.

In the aforementioned solid deposited, contained are graphite particles having a diameter of about 10 to 100 nm, amorphous carbon, catalytic metal or the like in addition to CNTs. The CNTs obtained here are single-layer nanotubes of a diameter of 1 to 5 nm, a length of 0.5 to 100 µm, and an average length of about 2 µm. The CNTs fabricated using not the arc discharge method but the laser ablation method also have the same size in principle as those fabricated by the aforementioned arc discharge method.

Figure 24A:
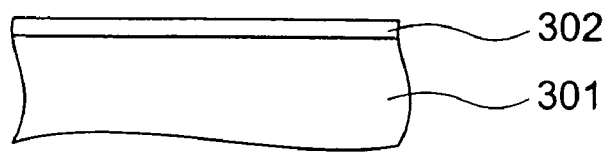
FIGS. 24A to 24F are sectional views each sequentially illustrating a process procedure of a fabrication method according to the eighth embodiment of the present invention.
Figure 24B:
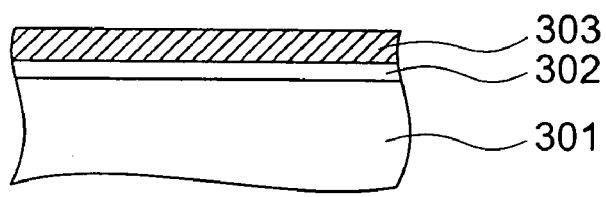

Referring to FIGS. 24A to 24F, the fabrication method according to the eighth embodiment will be explained. As shown in FIG. 24, the conductive layers 302 are formed on the glass substrate 301 by chemical vapor deposition (CVD) or the like, and then as shown in FIG. 24B, the CNT layer 303 is formed on the conductive layer 302. In this case, the CNTs produced as described above are scattered into ethanol or a binder for enhancing adherence to an underlying layer, and then deposited on the conductive layers 302 by a screen printing or spraying technique.

Figure 24C:
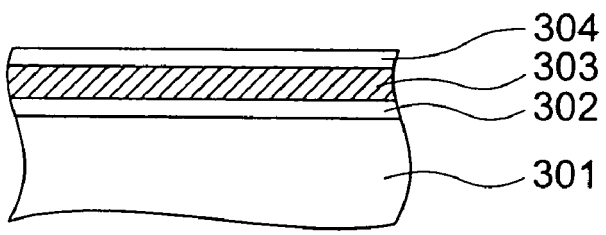
Figure 24D:
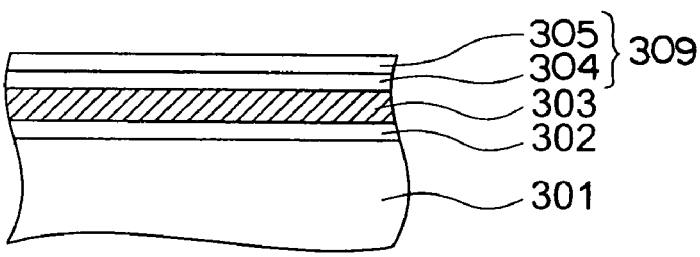
Figure 24E:
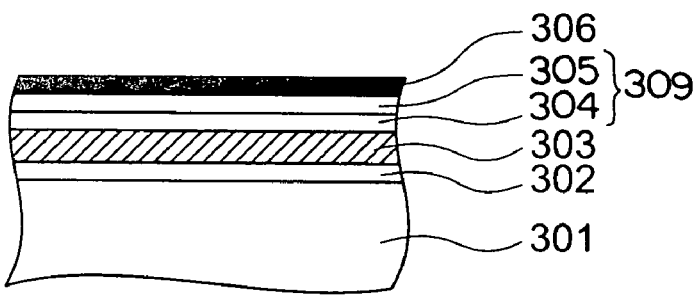

Then, as shown in FIG. 24C, the first insulating layer 304 is formed on the CNT layer 303. At this time, using a spin coater, SOG (Spin on Glass) is coated as the first insulating layer 304 in a thickness of 1.5 µm on the CNT layer 303, and thereafter baked at 400° C. in a nitrogen environment. Furthermore, as shown in FIG. 24D, using a spin coater, SOG is again coated in a thickness of 2 µm on the first insulating layer 304, and thereafter baked to form the second insulating layer 305. Subsequently, as shown in FIG. 24E, a film of metal such as aluminum is deposited by sputtering in a thickness of 0.5 µm on the second insulating layer 305 to form the gate electrode layer 306.

Figure 24F:
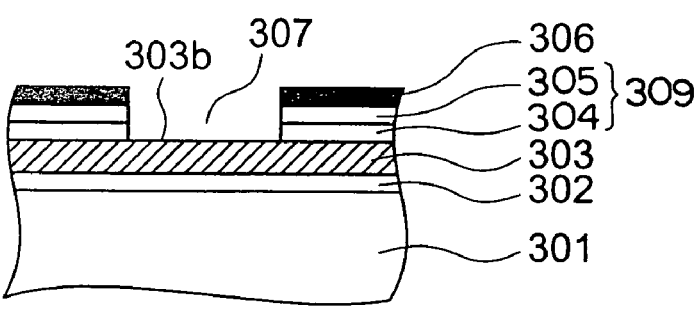

Furthermore, as shown in FIG. 24F, using a photolithographic technique, formed is the gate opening 307 which penetrates the gate electrode layer 306, the second insulating layer 305, and the first insulating layer 304 to expose a portion of the CNT layer 303. The CNT layer 303 exposed from the gate opening 307 constitutes an emitter 303b. Incidentally, it is possible to use a conductive substrate in place of the glass substrate 301. In this case, the conductive layers 302 becomes unnecessary.

Figure 24G:
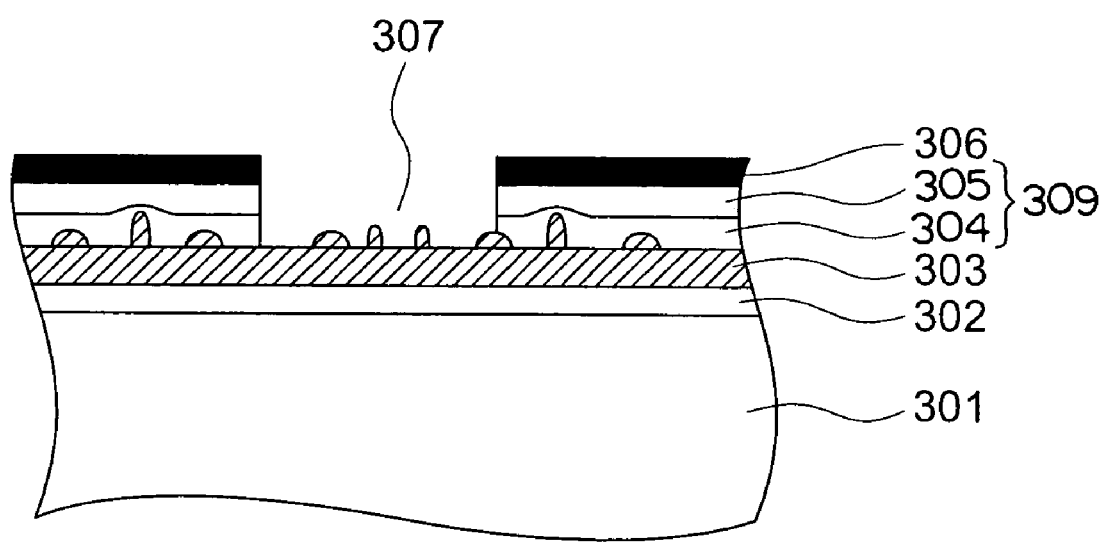
FIG. 24G is a sectional view illustrating a field emission cold cathode, in greater detail, fabricated by the fabrication method according to the eighth embodiment.

FIG. 24G illustrates a field emission cold cathode in greater detail which is fabricated by the fabrication method according to the eighth embodiment. The CNT layer 303 deposited by the aforementioned technique is observed to have CNT clusters (macroscopic irregularities) with irregularities of about 2 µm in average and irregularities (microscopic irregularities) of randomly projected CNTs. The largest microscopic irregularities measure 3 µm. The macroscopic irregularities can be reduced to 2 µm or less by refining the CNTs after having been produced or by splitting the CNTs mechanically or chemically in order to reduce the cohesion between the CNTs and other impurities and the cohesion between the CNTs.

The microscopic irregularities exhibit almost no variation and are about 2 µm at most. The first insulating layer 304 immediately above the CNT layer 303 is a coated film of a thickness of 1.5 µm, thus providing an excellent flatness. However, it is not possible to completely cover the CNT layer 303 only with the first insulating layer 304.

Subsequently, the second insulating layer 305 is coated in a thickness of 2 µm on the first insulating layer 304, thereby making it possible to enhance the insulation between the conductive layers 302 and the gate electrode layer 306 and as well implement the flatness of the second insulating layer 305 and the gate electrode layer 306. The thickness of the first insulating layer 304 was set at 1.5 µm here, but can be 0.2 µm or more and 2 µm or less to form an excellent insulating layer with no deficiency.

Figure 29:
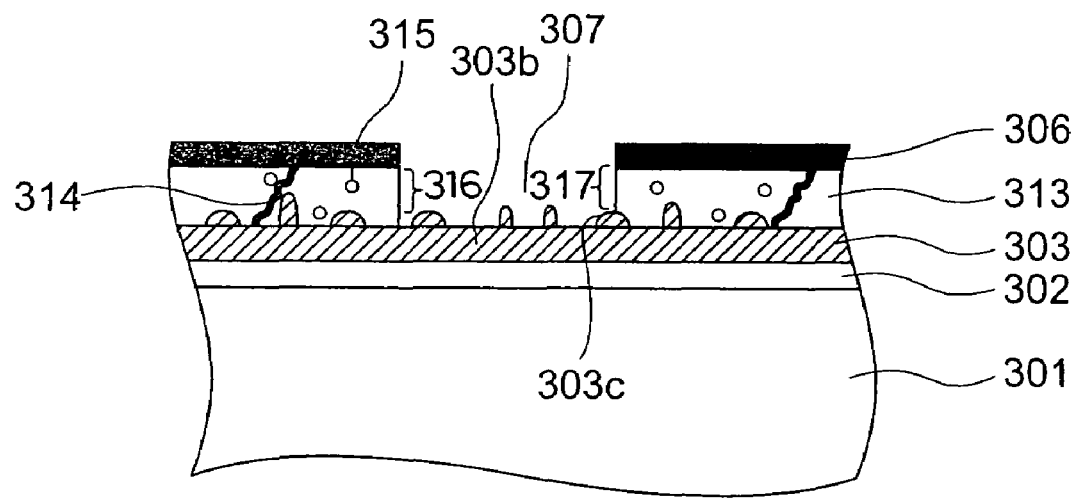
FIG. 29 is a sectional view illustrating a problem of a prior art field emission cold cathode.
Figure 30:
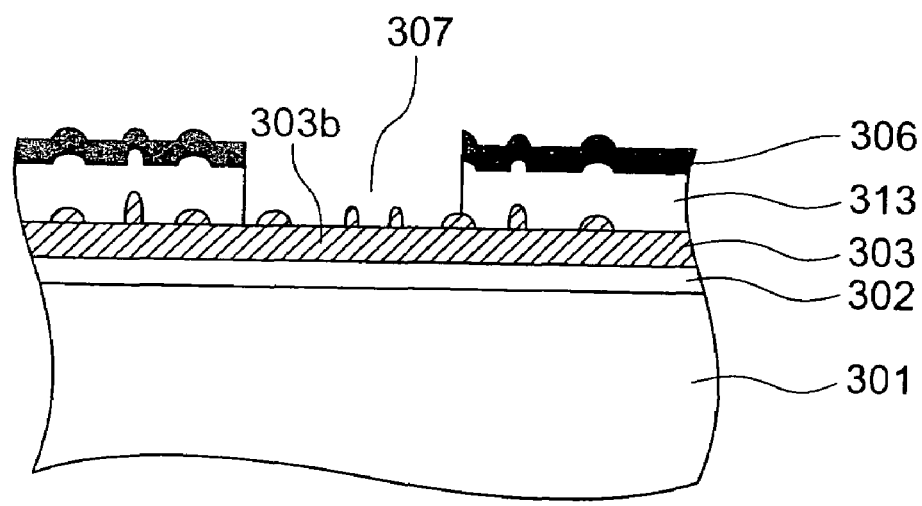
FIG. 30 is a sectional view illustrating a problem of a prior art field emission cold cathode.

In contrast to this, as shown in FIG. 29, coating an insulating layer of a thickness of 2 µm or more at a time would cause cracked portions 314 or air bubbles 315 to readily occur. This is because air bubbles remain unchanged which are left between fine irregularities in the CNT layer 303 or the air bubbles coagulate into each other to form cracks in the course of coating and baking the insulating material. On the other hand, forming an insulating layer of 0.2 µm or less causes the first insulating layer to be flattened insufficiently and deficiencies to be introduced upon forming the second insulating layer. Accordingly, the first insulating layer of 0.2 µm or less hardly provided the effects of the present invention.

The aforementioned deficiency is a phenomenon which is hardly found in ordinary semiconductor processes and which can be therefore said to be peculiar to a CNT layer having irregularities of the order of nanometers or micrometers. The deficiency introduced upon forming the insulating layer of 2 µm or more allows the electrode material to go into the cracked portions 314 (FIG. 29) in the course of forming the gate electrode layer 306, thereby causing a reduction in insulation. Furthermore, the air bubbles 315 having air in the atmosphere to be confined therein may expand upon operation of the field emission cold cathode in a vacuum, causing damage to the device.

In contrast to this, coating an insulating layer of 2 µm or less will provide a short distance between a portion at which an air bubble is generated and the surface so that the air bubble can easily reach the surface in the course of baking and is thus hardly confined, thereby making it possible to form an insulating layer having less deficiencies.

Accordingly, it is possible to coat the first insulating layer 304 in a thickness of 0.2 µm or more and 2 µm or less, thereby ensuring insulation without causing deficiencies in an insulating layer in the subsequent course of forming the insulating layer. Furthermore, since the gate electrode layer 306 can also be flattened, it is possible to suppress emission from the surface of the gate electrode due to an anode electric field.

Figure 28A:
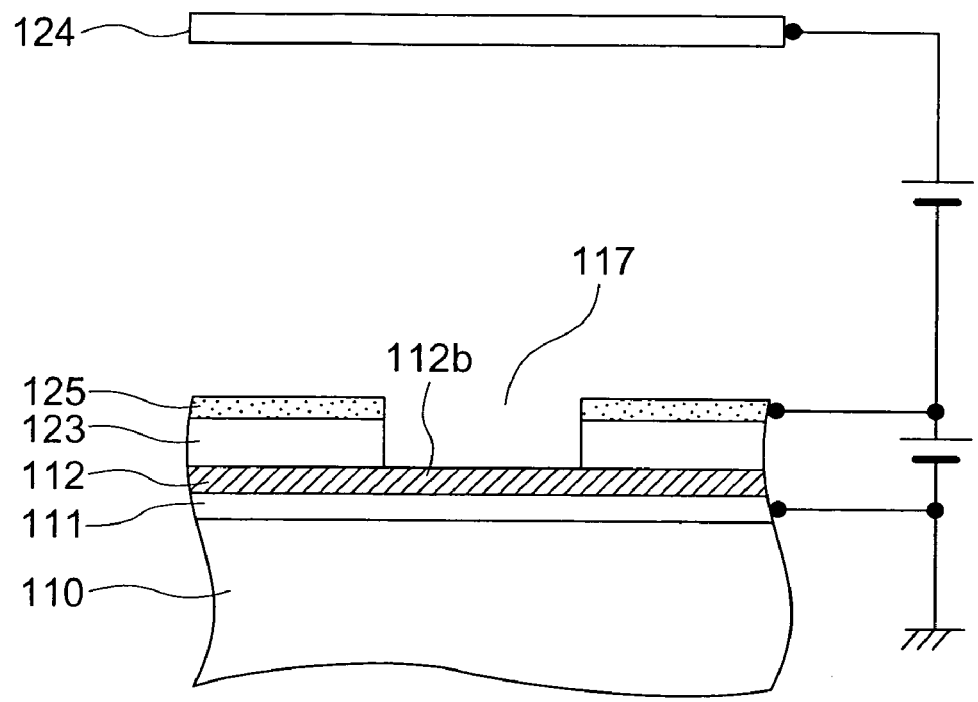
FIG. 28A is a schematic sectional view illustrating an example of a prior art triode structure.
Figure 28B:
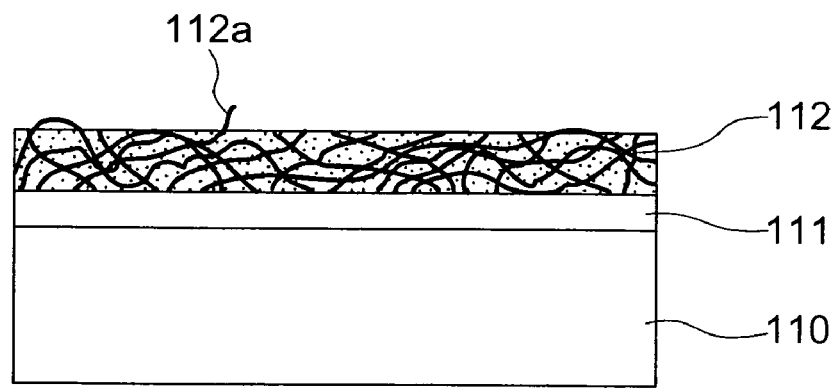
FIG. 28B is a sectional view illustrating a CNT film fabricated by a prior art method.

Incidentally, the first insulating layer 304 can also be coated with acrylic resin, epoxy resin, polyimide or the like to thereby provide the effects of the present invention. However, SOG has a low viscosity and an excellent wettability and was therefore used here. Furthermore, a coated film was used for the second insulating layer 305, however, since sharp projections are not formed as shown in FIG. 28 even by sputtering or vapor deposition such as CVD, it is also possible to employ these techniques.

Figure 25A:
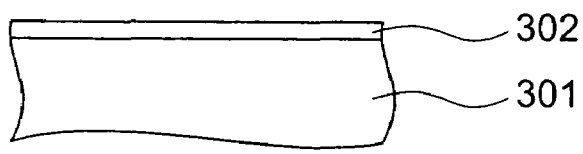
FIGS. 25A to 25G are sectional views each sequentially illustrating a process procedure of a fabrication method according to a ninth embodiment of the present invention.
Figure 25B:
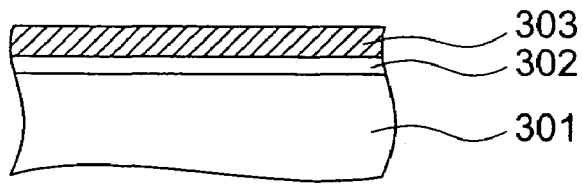

Referring to FIGS. 25A to 25I, a fabrication method according to a ninth embodiment of the present invention will be explained. As shown in FIGS. 25A and 25B, like the eighth embodiment, the conductive layer 302 and the CNT layer 303 are formed sequentially on the glass substrate 301.

Figure 25C:
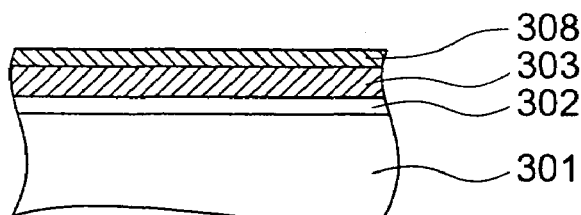
Figure 25D:
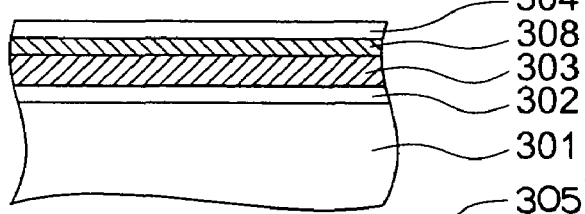

Then, as shown in FIG. 25C, an intermediate layer 308 is formed in a thickness of 200 to 600 nm by sputtering on the CNT layer 303. Thereafter, like the first embodiment, as shown in FIG. 25D, the first insulating layer 304 is deposited in a thickness of 0.2 µm or more and 2 µm or less by coating on the intermediate layer 308.

Figure 25E:
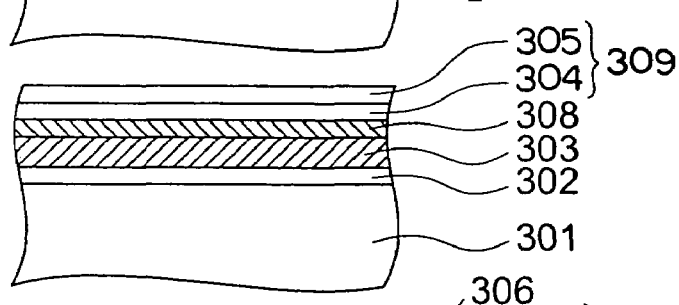
Figure 25F:
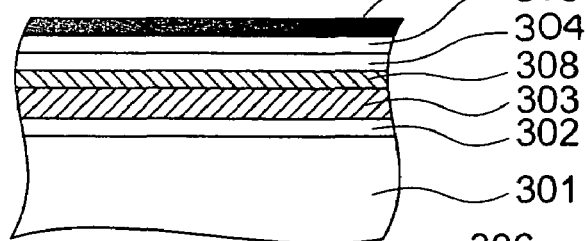
Figure 25G:
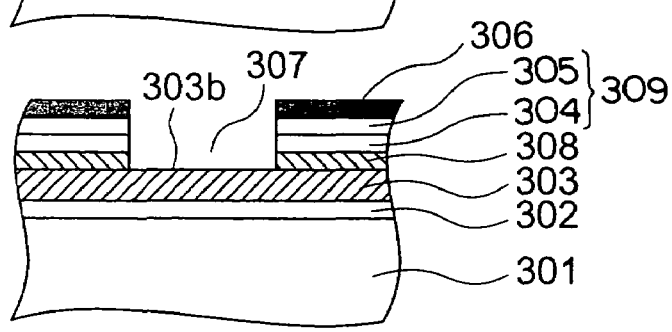

Subsequently, as shown in FIGS. 25E and 25F, the second insulating layer 305 and the gate electrode layer 306 are sequentially formed on the first insulating layer 304. Additionally, as shown in FIG. 25G, the gate electrode layer 306, the second insulating layer 305, the first insulating layer 304, and the intermediate layer 308 are removed by etching, thereby forming the gate opening 307. Upon being coated with an insulating material thereon, the intermediate layer 308 provides the effects of enhancing the wettability between the CNT layer 303 and the first insulating layer 304 as well as improving the adhesive strength between the CNT layer 303 and the first insulating layer 304. Suitable for the intermediate layer 308 are materials which have an excellent wettability with the first insulating layer 304 and can be deposited at a temperature or less at which the glass substrate 301 can resist heat. For example, the materials include a single metal such as aluminum or titanium, or a metal compound such as titanium nitride.

Figure 26:
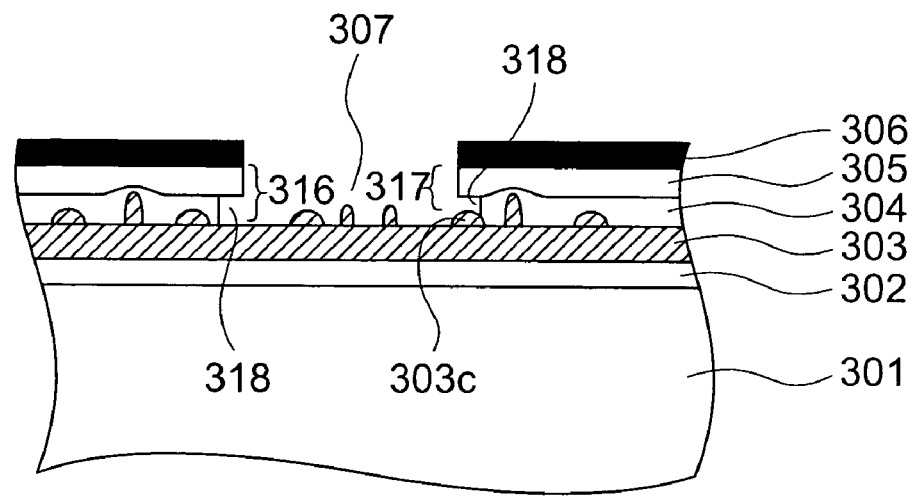
FIG. 26 is a sectional view illustrating the structure of a field emission cold cathode fabricated by a fabrication method according to a tenth embodiment of the present invention.

FIG. 26 is a sectional view illustrating the structure of a field emission cold cathode fabricated by a fabrication method according to a tenth embodiment of the present invention. This field emission cold cathode is almost the same as the field emission cold cathode fabricated by the method according to the ninth embodiment, but has a structure in which the opening diameter of the first insulating layer 304 is larger than the opening diameters of the gate electrode layer 306 and the second insulating layer 305.

In this embodiment, the first insulating layer 304 is formed to have a large opening diameter as described above and shoulder portions 318 are provided on the insulating layer made up of the first insulating layer 304 and the second insulating layer 305. Even in the presence of a CNT projection 303c near the inner circumferential edge of the gate opening 307, this allows the opening inner surface of the first insulating layer 304 to recess from the inner circumferential surface of the gate opening 307, thereby making the distance 17 between the lower edge surface of the gate electrode layer 306 and the surface of the emitter 303b larger than the case shown in FIG. 29. This makes it possible to substantially reduce the field intensity on the inner circumferential surface of the gate opening 307 and thus significantly decrease insulating defects, thereby preventing an electrical breakdown.

Furthermore, with an emitter using CNTs, local discharge during operation may scatter the CNTs on the emitter surface over the surfaces, exposed within the gate opening 307, of the first insulating layer 304 and the second insulating layer 305, causing absorbed gases or the insulating material to be re-emitted therein resulting in damage to the device. However, the field emission cold cathode according to this embodiment has the shoulder portions 318 on the inner circumferential surface of the insulating layer made up of the first insulating layer 304 and the second insulating layer 305. Accordingly, this makes it possible to trap the scattered CNTs at the shoulder portions 318 and suppress discharge as well, thereby preventing damage to the device.

Figure 27:
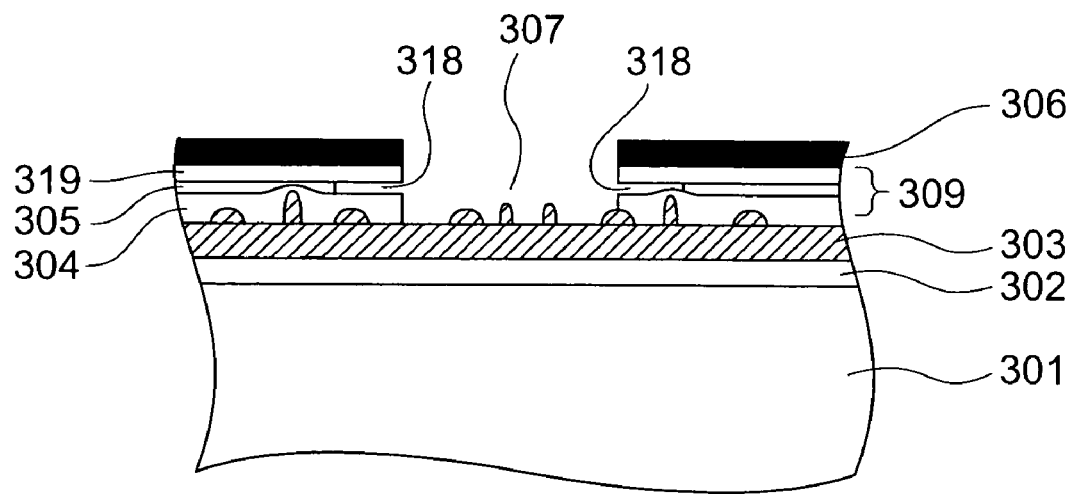
FIG. 27 is a sectional view illustrating the structure of a field emission cold cathode fabricated by a fabrication method according to an eleventh embodiment of the present invention.

FIG. 27 illustrates a field emission cold cathode fabricated by a fabrication method according to an eleventh embodiment of the present invention. The ninth and tenth embodiments include the examples of an insulating layer formed in a two-layer structure, however, this embodiment forms it in a multi-layered insulating layer having more than two layers, thereby providing an improved insulation property.

That is, the field emission cold cathode according to this embodiment includes stacked insulating layers 309 made up of the first insulating layer 304, the second insulating layer 305, and a third insulating layer 319 on the CNT layer 303. Accordingly, for example, forming the shoulder portions 318 with the opening diameter of the second insulating layer 305 located in the middle being larger than the gate opening diameter of the gate electrode layer 306 provides the same advantage as that of the field emission cold cathode fabricated by the fabrication method according to the eighth embodiment.

As described above, the insulating layer is formed of multiple layers and the opening diameter of at least one layer is made larger than the gate opening diameter of the gate electrode layer 306 to provide the shoulder portion 318, thus making it possible to significantly increase the distance 17 between the lower edge surface of the gate electrode layer 306 and the surface of the emitter 303b and thereby suppress an electrical breakdown. The structure with those shoulder portions 318 can also be applied to the second embodiment having the intermediate layer 308. In this case, the opening diameter of the intermediate layer 308 or the first insulating layer 304 is made larger than the opening diameter of the gate electrode layer 306.

Furthermore, the shoulder portion 318 can be easily formed by stacking in layers those insulating materials having different etching rates or resistances to chemicals. For example, in the three-layer structure shown in FIG. 27, SOG is coated in a thickness of 1.5 µm on the conductive layer 302 and thereafter polyimide is formed in a thickness of 1 µm on the SOG. Additionally, SOG is again coated in a thickness of 1 µm on the polyimide. Subsequently, using the photolithographic technique, the gate electrode layer 306 is provided with an opening and thereafter the uppermost layer of SOG (19) of the stacked insulating layers 309 is subjected to anisotropic dry etching or wet etching with fluorine acid.

Subsequently, the polyimide 5 is subjected to isotropic etching with oxygen plasma to make its opening diameter larger than the opening diameter of the gate electrode layer 306. The CNTs are gasified and etched with the oxygen plasma, in the case of which the lowermost layer of SOG 4, which is not provided with an opening yet, serves as a mask to thereby prevent the CNTs from being affected. Thereafter, the same etching as for the uppermost layer of SOG 19 is performed on the lowermost layer of SOG 4, thereby providing a stacked structure having the shoulder portion 318 on the inner surface of the gate opening 307.

The aforementioned eighth to eleventh embodiments can provide an emitter that produces stable uniform emission current while employing a CNT film and accomplishes excellent emission characteristics, a field emission cold cathode incorporating the emitter, and a flat image display device incorporating the field emission cold cathode.

It is possible to combine any one of the structures according to the fourth to seventh embodiments with any one of the structures according to the eighth to eleventh embodiments. In this case, the insulating film is formed in a multi-layer structure, thereby improving the flatness of the insulating film surface and enhancing the adhesion of the upper gate electrode to the insulating film. When the surface of the CNT film is processed with an adhesive sheet or the like under this condition, the adhesive sheet hardly causes the gate electrode to be stripped off, thereby making it possible to employ a sheet of high adhesive strength to result in an extended permissible range of adhesive strength.

Additionally, the insulating film formed in a multi-layer structure improves the flatness of the insulating film surface and makes it possible to form a flat insulating film even if the insulating film is thin. This means that a film thinner than the conventional single-layer insulating film can be made. The emitter formed in a structure of such a thin insulating film with the surface thereof processed using an adhesive sheet causes the sheet to come closer to the CNT film. This allows the sheet to contact with an increased area of the CNT film, and in particular, allows the sheet to cover even the peripheral portion of the emitter surface, thus enabling the sheet to implement upright alignment in a wider area.

In particular, the peripheral portion of the opening is in closer proximity to the gate electrode than the central portion of the opening and thus significantly affected by the electrode voltage, thereby providing better emission controllability. For this reason, particularly when the anode electrode exerts less effects, the gate voltage determines the amount of emission, thereby making it possible to drive at lower voltages.

In the foregoing, although the present invention was explained in accordance with its preferred embodiments, the CNT film and its fabrication method according to the present invention and the field emission cold cathode and the image display device incorporating the CNT film are not limited to the structures according to the aforementioned embodiments, but a CNT film and its fabrication method, for which various modifications and changes are made to the structures of the aforementioned embodiments, and the field emission cold cathode and the image display device incorporating the CNT film are also included in the range of the present invention.

What is claimed is:

1. A carbon nanotube (CNT) film, comprising:
   CNTs and particulate impurities, wherein said CNT film is formed as a stacked structure of a plurality of layers stacked in sequence, and the content ratio of said CNTs and said particulate impurities in each of said layers of said stacked structure is set independently of other layers.

2. The CNT film according to claim 1, wherein said particulate impurities have a function of a binder material for filling gaps between said CNTs, and further include another binder material other than said binder material.

3. The CNT film according to claim 2, wherein said another binder material is made of an organic substance.

4. The CNT film according to claim 3, wherein said organic substance is made of a material comprising at least one of acrylic, nitrocellulose, and polyimide resin.

5. The CNT film according to any one of claims 1 to 4, wherein said CNTs and said particulate impurities occupy said CNT film at a filling rate of 70% or more.

6. A field emission cold cathode characterized by employing the CNT film according to any one of claims 1 to 4.

7. A carbon nanotube (CNT) film, comprising:
   CNTs and particulate impurities, wherein an area ratio between said CNTs and the particulate impurities in cross section and surface structure is set within a range of 0.5:99.5 to 40:60, and wherein said particulate impurities comprise impurities obtained in conjunction with said CNTs upon fabricating said CNTs, and
   wherein said particulate impurities have a function of a binder material for filling gaps between said CNTs, and further include another binder material other than said binder material, and
   wherein said CNT film is formed as a stacked structure of a plurality of layers stacked in sequence, and the content ratio of said CNT, said particulate impurities, and said another binder material in each of said layers of said stacked structure is set independently of other layers.

8. The CNT film according to claim 7, wherein as to percentage contents of said CNTs, said particulate impurities and said another binder material, the percentage content of said CNTs is higher in an upper layer whereas the percentage contents of said particulate impurities and said another binder material are higher in a lower layer.

9. The CNT film according to claim 8, wherein the percentage content of CNTs in the uppermost layer is 80 to 90%, the percentage contents of other than CNTs in a layer other than said uppermost layer is 70 to 80%, and the percentage content of said another binder material is 60 to 70% in the lowermost layer.

10. A fabrication method for fabricating a CNT film, comprising:
    forming a CNT film including CNTs and particulate impurities wherein said CNT film is formed as a stacked structure of a plurality of layers stacked in sequence and wherein the CNT film includes at least one of the following: said particulate impurities functioning as a binder material, and another binder material other than said binder material, and wherein the content ratio of said CNTs and said particulate impurities in each of said layers of said stacked structure is set independently of other layers; and
    patterning CNTs, wherein at least one of said binder material and said other binder material included in said CNT film.

11. The fabrication method for the CNT film according to claim 10, wherein said binder material and said another binder material are left in conjunction with said CNTs in a CNT film arm which is left in the step of patterning said CNT film.

12. The fabrication method for the CNT film according to claim 10 or 11, wherein said CNTs and said particulate impurities are obtained in the same step at the same time and used for fabrication.

13. The fabrication method according to claim 12, wherein a field emission cold cathode is characterized by using said CNT film.

14. The fabrication method of claim 13, wherein said CNT film constitutes an electron emitting surface containing therein said CNTs and said particulate impurities, and said electron emitting surface does not contain particulate impurities having a particle diameter of more than 500 nm.

15. The fabrication method of claim 14, wherein a field emission image display device is characterized by the electron emitting cold cathode.

16. The fabrication method for the CNT film according to claim 10 or 11, wherein said CNTs and said particulate impurities are obtained in different steps and used for fabrication.

17. The fabrication method according to claim 16, wherein a field emission cold cathode is characterized by using said CNT film.

18. The fabrication method of claim 17, wherein said CNT film constitutes an electron emitting surface containing therein said CNTs and said particulate impurities, and said electron emitting surface does not contain particulate impurities having a particle diameter of more than 500 nm.

19. The fabrication method of claim 18, wherein a field emission image display device is characterized by the electron emitting cold cathode.

20. The fabrication method according to claim 10 or 11, further comprising:
aligning the surface of said CNT film in the upright direction.

21. A field emission cold cathode characterized by using said CNT film fabricated by the fabrication method for the CNT film according to claim 20.

22. A fabrication method for fabricating a CNT film, comprising:
performing arc discharge using a pair of carbon bars opposing each other in a chamber;
depositing deposits of CNTs and particulate impurities on each of a top plate, side plates, and a bottom plate within said chamber;
using said deposits to fabricate the CNT film;
collecting a top plate deposit and a side plate deposit which are deposited on the top plate and the side plates within said chamber;
producing a mixed material by mixing both said collected top plate deposit and said side plate deposit at a predetermined weight ratio; and
using said particulate impurities in said mixed material as a material for filling gaps between said CNTs in said mixed material.

23. The fabrication method for the CNT film according to claim 22, wherein contents of said CNTs and particulate impurities are adjusted by using said side plate deposit and said top plate deposit such that an area ratio between said CNTs and said particulate impurities in cross section and surface structure is satisfied within a range of 0.5:99.5 to 40:60.

24. The fabrication method according to any one of claims 10, 11 and 22 wherein a field emission cold cathode is characterized by using said CNT film.

25. The fabrication method of claim 24, wherein said CNT film constitutes an electron emitting surface containing therein said CNTs and said particulate impurities, and said electron emitting surface does not contain particulate impurities having a particle diameter of more than 500 nm.

26. The fabrication method of claim 25, wherein a field emission image display device is characterized by the electron emitting cold cathode.

27. A carbon nanotube (CNT) film, comprising:
CNTs and particulate impurities, wherein an area ratio between said CNTs and the particulate impurities in cross section and surface structure is set within a range of 0.5:99.5 to 40:60, and wherein said particulate impurities comprise impurities obtained in conjunction with said CNTs upon fabricating said CNT, and
wherein said particulate impurities have a function of a binder material for filling gaps between said CNTs, and further include another binder material other then said binder material, and
wherein said CNT film is formed as a stacked structure of a plurality of layers stacked in sequence, and the content ratio of said CNTs, said particulate impurities, and said another binder material in each of said layers of said stacked structure is set independently of other layers.

28. A field emission cold cathode characterized by employing the CNT film according to claim 27.

29. A carbon nanotube (CNT) film, comprising:
CNTs and particulate impurities, wherein an area ratio between said CNTs and the particulate impurities in cross section and surface structure is set within a range of 0.5:99.5 to 40:60, and wherein said particulate impurities comprise impurities obtained in conjunction with said CNTs upon fabricating said CNTs, and
wherein said particulate impurities have a function of a binder material for filling gaps between said CNTs, and farther including another binder material other than said binder material,
wherein said another binder material is made of an organic substance,
wherein said organic substance is made of a material comprising at least one of acrylic, nitrocellulose, and polyimide resin,
wherein said CNTs and said particulate impurities occupy said CNT film at a filling rate of 70% or more,
wherein said CNT film is formed as a stacked structure of a plurality of layers stacked in sequence, and the content ratio of said CNTs, said particulate impurities, and said another binder material in each of said layers of said stacked structure is set independently of the other layer or layers,
wherein as to percentage contents of said CNTs, said particulate impurities and said another binder material, the percentage content of said CNTs is higher in an upper layer whereas the percentage contents of said particulate impurities and said another binder material are higher in a lower layer, and
wherein the percentage content of CNTs in the uppermost layer is 80 to 90%, the percentage contents of other than CNTs in a layer other than said uppermost layer is 70 to 80%, and the percentage content of said another binder material is 60 to 70% in the lowermost layer.

30. A field emission cold cathode characterized by employing the CNT film according to claim 29.

* * * * *